US011053390B2

(12) United States Patent
Bao et al.

(10) Patent No.: US 11,053,390 B2
(45) Date of Patent: Jul. 6, 2021

(54) STRETCHABLE, TOUGH, AND SELF-HEALING ELASTOMER AND APPLICATIONS THEREOF

(71) Applicant: The Board of Trustees of the Leland Stanford Junior University, Stanford, CA (US)

(72) Inventors: Zhenan Bao, Stanford, CA (US); Jiheong Kang, Palo Alto, CA (US); Donghee Son, Palo Alto, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 71 days.

(21) Appl. No.: 16/155,536

(22) Filed: Oct. 9, 2018

(65) Prior Publication Data

US 2019/0106544 A1 Apr. 11, 2019

Related U.S. Application Data

(60) Provisional application No. 62/569,237, filed on Oct. 6, 2017.

(51) Int. Cl.

| | |
|---|---|
| ***C08L 83/14*** | (2006.01) |
| ***C08G 77/452*** | (2006.01) |
| ***C08L 83/04*** | (2006.01) |
| ***B29C 73/16*** | (2006.01) |
| ***B29C 73/28*** | (2006.01) |
| ***C08G 77/458*** | (2006.01) |
| ***C08G 18/61*** | (2006.01) |
| *B29K 83/00* | (2006.01) |
| *B29C 73/18* | (2006.01) |

(52) U.S. Cl.

CPC .............. *C08L 83/14* (2013.01); *B29C 73/16* (2013.01); *B29C 73/28* (2013.01); *C08G 18/61* (2013.01); *C08G 77/452* (2013.01); *C08G 77/458* (2013.01); *C08L 83/04* (2013.01); *B29C 73/18* (2013.01); *B29K 2083/00* (2013.01); *B29K 2995/0082* (2013.01); *B32B 2307/762* (2013.01); *C08L 2203/16* (2013.01)

(58) Field of Classification Search

None

See application file for complete search history.

(56) References Cited

U.S. PATENT DOCUMENTS

| | | | | |
|---|---|---|---|---|
| 5,786,070 | A * | 7/1998 | Higuchi | B32B 17/1077 428/220 |
| 7,618,260 | B2 | 11/2009 | Simon et al. | |
| 8,907,376 | B2 | 12/2014 | Mascaro et al. | |
| 9,184,496 | B2 | 11/2015 | Duwel et al. | |
| 9,293,821 | B2 | 3/2016 | Duwel et al. | |
| 9,454,181 | B2 | 9/2016 | Ilse et al. | |
| 2004/0007792 | A1* | 1/2004 | Harreld | C08G 77/452 264/36.1 |
| 2009/0240117 | A1 | 9/2009 | Chmiel et al. | |
| 2010/0238636 | A1 | 9/2010 | Mascaro et al. | |
| 2016/0094259 | A1 | 3/2016 | Hatanaka et al. | |
| 2018/0201710 | A1* | 7/2018 | Williams | C09D 133/10 |

OTHER PUBLICATIONS

"Dopamine-functionalized Poly(vinyl alcohol) Elastomer with Melt-processability and Self-healing Properties" authored by Li et al. and published in the Journal of Applied Polymer Science (2017) 134(28).*

White, S. R. et al. Autonomic healing of polymer composites. Nature 409, 794-797 (2001).

Chen, X. et al. A thermally re-mendable cross-linked polymeric material. Science 295, 1698-1702 (2002).

Toohey, K. S., Sottos, N. R., Lewis, J. A., Moore, J. S. & White, S. R. Self-healing materials with microvascular networks. Nature Mater. 6, 581-585 (2007).

2008 Cordier, P., Tournilhac, F., Soulie-Ziakovic, C. & Leibler, L. Self-healing and thermoreversible rubber from supramolecular assembly. Nature 451, 977-980 (2008).

Burnworth, M. et al. Optically healable supramolecular polymers. Nature 472, 334-337 (2011).

Kim, D-H. et al. Epidermal electronics. Science. 333, 836-843 (2011).

Zehe, S., Grosshauser, T. & Hermann, T. BRIX—An easy-to-use modular sensor and actuator prototyping toolkit. in 2012 IEEE International Conference on Pervasive Computing and Communications Workshops 817-822 (IEEE, 2012). doi:10.1109/PerComW.2012.6197624.

Sun, J. Y. et al. Highly stretchable and tough hydrogels. Nature 489, 133-136 (2012).

Chen, Y., Kushner, A. M., Williams, G. A. & Guan, Z. Multiphase design of autonomic self-healing thermoplastic elastomers. Nature Chem. 4, 467-472 (2012).

Blaiszik, B. J. et al. Autonomic restoration of electrical conductivity. Adv. Mater. 24, 398-401 (2012).

Kaltenbrunner, M. et al. An ultra-lightweight design for imperceptible plastic electronics. Nature 499, 458-463 (2013).

Sun, T. L. et al. Physical hydrogels composed of polyampholytes demonstrate high toughness and viscoelasticity. Nature Mater. 12, 932-937 (2013).

Wang, C. et al. Self-healing chemistry enables the stable operation of silicon microparticle anodes for high-energy lithium-ion batteries. Nature Chem. 5, 1042-1048 (2013).

(Continued)

*Primary Examiner* — Marc S Zimmer

(74) *Attorney, Agent, or Firm* — Crawford Maunu PLLC

(57) ABSTRACT

Various embodiments are directed to apparatuses and methods involving an elastomer material comprising a flexible polymer backbone with a particular ratio of at least first moieties and second moieties. The first moieties provide a first number of dynamic bonds resulting from interactions between the first moieties and the second moieties provide a second number of dynamic bonds resulting from interactions between the second moieties, the second number of dynamic bonds having a weaker bonding strength than the first number of dynamic bonds. The elastomer material, based on the ratio of the first moieties and second moieties, exhibits autonomous self-healing, a particular toughness, and is stretchable.

22 Claims, 42 Drawing Sheets
(37 of 42 Drawing Sheet(s) Filed in Color)

(56) References Cited

OTHER PUBLICATIONS

Dementyev, A. & Paradiso, J. A. SensorTape: Modular and Programmable 3D-Aware Dense Sensor Network on a Tape d. Proc. 28th Annu. ACM Symp. User Interface Softw. Technol.—UIST '15 649-658 (2015). doi:10.1145/2807442.2807507.
Grindy, S. C. et al. Control of hierarchical polymer mechanics with bioinspired metal-coordination dynamics. Nature Mater. 14, 1210-1216 (2015).
Truby, R. L. & Lewis, J. A. Printing soft matter in three dimensions. Nature 540, 371-378 (2016).
Patrick, J. et al. Polymers with autonomous life-cycle control. Nature. 540, 363-370 (2016).
Bai, W. et al. Smart organic two-dimensional materials based on a rational combination of non-covalent interactions. Angew .Chem. Int.Ed. 55, 10707-10711 (2016).
Zhang, Y. et al. Printing, folding and assembly methods for forming 3D mesostructures in advanced materials. Nat. Rev. Mater. 2, 17019 (2017).

* cited by examiner

PDMS-MPU

PDMS-IU

PDMS-MPU$_{0.2}$-IU$_{0.8}$

PDMS-MPU$_{0.3}$-IU$_{0.7}$

PDMS-MPU$_{0.4}$-IU$_{0.6}$

PDMS-MPU$_{0.5}$-IU$_{0.5}$

Polyprophylene oxide

Polyethylene oxide

Polyethylene

Polybutylene

Perfluoropolyether

Poly(ethylene-co-1,2-butylene)

Polydimethylsiloxane

230

Strong
crosslinking hydrogen bonding moiety

232

Moderate
crosslinking hydrogen bonding moiety

234

Weak
crosslinking hydrogen bonding moiety

Metal ion control

| Strong metal-ligand interactions | Moderate metal-ligand interactions | Weak metal-ligand interactions |
| --- | --- | --- |
| 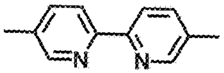 + $Zn^{2+}$ | 3 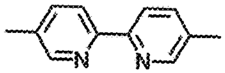 + $Fe^{2+}$ | 2  + $Eu^{3+}$ |

Ligand control

| Strong metal-ligand interactions | Moderate metal-ligand interactions | Weak metal-ligand interactions |
| --- | --- | --- |
| 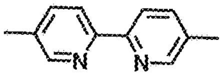 bipyridine | 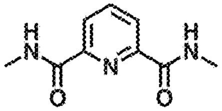 Pyridine-2,6-dicarboxamid | 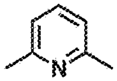 Pyridine 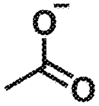 Carboxylate |

Counter anion control

| Strong metal-ligand interactions | Moderate metal-ligand interactions | Weak metal-ligand interactions |
| --- | --- | --- |
| $Cl^{-1}$ | $OTf^{-1}$ | $BF_4^{-1}$<br>$ClO_4^{-1}$ |

FIG. 2H

Before stretching

Stretched to 3,000%

Sample with notch

Stretched to 1,200%

Damaged

Healed at r.t

E GAIN (LIQUID METAL)

WITH PDMS-MPU$_{0.4}$-IU$_{0.6}$

E GAIN (LIQUID METAL)

WITH PDMS (SYLGARD 184)

STRETCHABLE, TOUGH, AND SELF-HEALING ELASTOMER AND APPLICATIONS THEREOF

SUMMARY

Aspects of various embodiments are directed to a stretchable, tough, and self-healing elastomer and applications thereof, including applications of wearable electronics.

In the following discussion, various implementations and applications are disclosed to provide an understanding of the instant disclosure by way of non-limiting example embodiments.

In certain example embodiments, aspects of the present disclosure are directed to various elastomer materials and polymer films formed using the elastomer material. The elastomer material can comprise and/or involve a flexible polymer backbone; exemplary polymers (non-limiting materials) in this regard include polydimethylsiloxane (PDMS), polyethyleneoxide (PEO), Perfluoropolyether (PFPE), polybutylene (PB), poly(ethylene-co-1-butylene), poly(butadiene), hydrogenated poly(butadiene), poly(ethylene oxide)-poly(propylene oxide) block copolymer or random copolymer, and poly(hydroxyalkanoate), with a particular ratio of at least a first type of moieties that provide a first number of dynamic bonds resulting from interactions between the first type of moieties (e.g., hydrogen or other bonding sites with relatively strong bonds) and a second type of moieties that provide a second number of dynamic bonds resulting from interactions between the second type of moieties (e.g., hydrogen or other bonding sites of a weaker bonding strength than the first number of hydrogen or other binding sides or with relatively weak bonds) in polymer chains, and films formed therefrom. As may be appreciated, dynamic bonds include or refer to bonds that can be reformed, once broken due to mechanical forces, at room temperature or elevated temperature, such as hydrogen bonds, metal-ligand bonds, guest-host interactions, and/or supramolecular interactions. Such films exhibit self-healing, are tough, and are stretchable, consistent with one more embodiments and/or one or more mechanisms described herein. In specific aspects, the polymer film can include a polydimethylsiloxane (PDMS) polymer backbone with a particular ratio of 4,4'-methylenebis(phenyl urea) (MPU) and isophorone bisurea (IU). In such aspects, the first moieties include 4,4'-methylenebis(phenyl urea) (MPU) and the second moieties include isophorone bisurea (IU), although embodiments are not so limited. The at least first moieties and second moieties can be spaced randomly or equally from another. For example, the polymer segment between the moieties can typically be between 1,000 Dalton to 25,000 Dalton, although embodiments in accordance with the present disclosure are not so limited.

More specific example embodiments are directed to methods/apparatuses comprising and/or involving use of the elastomer material to form a polymer film. The film is colorless and transparent, and exhibits autonomous self-healing and stretching of up to 1,200 percent strain without rupturing. In some specific aspects, the film can be stretched up to 3,000 percent and exhibits a Young's modulus of between 0.22 and 1.5 megapascal (MPa). In other specific and related aspects, the polymer film exhibits notch-insensitive stretching and a fracture energy of around 12,000 Joule per meter squared (J/m$^2$).

In more specific aspects, the mechanical properties of the elastomer material (e.g., PDMS-MPUx-IU1-x) is due to the different crosslink strength of the first and second moieties (or more moieties, in various embodiments), such as the different crosslink strength of MPU and IU. The polymer film can provide or otherwise include dynamic bonding resulting from interactions between the first moieties and interactions between the second moieties. More specifically, the first moieties provide a first number of dynamic bonds due to interactions between first moieties and the second moieties provide a second number of dynamic bonds due to interaction between the second moieties. In specific aspects, the polymer film can include a first number of dynamic bonds resulting from MPU-MPU interactions and a second number of dynamic bonds resulting from IU-IU interactions. The IU-IU inter-bonding can include bonding of a lower strength than the MPU-MPU inter-bonding. The polymer film can include different ratios of MPU and IU units, such as polymer films which include a ratio of MPU units to IU units of 0.4 to 0.6, 0.3 to 0.7 and/or 0.2 to 0.8. Furthermore, the polymer film can exhibit notch-insensitive stretching and a fracture energy of around 15,000 J/m$^2$.

The ratio of MPU and/or IU units in the polymer film can be adjusted to optimize mechanical properties of the film. For example, the ratio of MPU can be decreased to increase the fracture strain of the polymer film, and to decrease the Young's modulus and fracture energy. In other aspects, the ratio of MPU is increased to increase the Young's modulus and fracture energy. Further, polymer films formed of PDMS-MPU$_{0.2}$-IU$_{0.8}$ and PDMS-MPU$_{0.3}$-IU$_{0.7}$ can exhibit faster healing and higher self-healing efficiencies given the same healing time as a polymer film formed of PDMS-MPU$_{0.4}$-IU$_{0.6}$.

In related and more specific aspects, the polymer film exhibits autonomous self-healing in the presents of water, sweat, and/or artificial sweat, among other types of liquids. For example, the polymer film can be severed and the severed polymer film is healed in water for 24 hours. The resulting healed film can be stretched up to 1,100 percent strain without rupturing.

A number of related aspects are directed to an elastomer material comprising a flexible polymer backbone with a particular ratio of at least first moieties and second moieties. The first moieties provide a first number of dynamic bonds resulting from interactions between the first moieties. The second moieties provide a second number of dynamic bonds resulting from interactions between the second moieties, where the second number of dynamic bonds have a weaker bonding strength than the first number of dynamic bonds. In specific aspects, the first moieties form up to four hydrogen bonds with another of the first moieties and the second moieties form less than four (e.g., such as, up to two) hydrogen bonds with another of the second moieties. The elastomer material, based on the ratio of the at least first moieties and second moieties, exhibits autonomous self-healing, a particular toughness, and particular stretchability. For example, the elastomer material exhibits a Young's modulus of between 0.1 and 3.0 MPa and stretching of between 1,200 and 3,000 percent without rupturing. In other examples, the elastomer material can stretch up to 3,000 percent and exhibits a Young's modulus of between 0.22 and 1.5 MPa.

As previously described, the flexible polymer backbone is selected from the group consisting of: PDMS, PEO, PFPE, PB, poly(ethylene-co-1-butylene), poly(butadiene), hydrogenated poly(butadiene), polybutylene, poly(ethylene oxide)-poly(propylene oxide) block copolymer or random copolymer, and poly(hydroxyalkanoate). The first moieties can include MPU and the second moieties can include IU. In some related and more-specific aspects, the particular ratio of MPU moieties to IU moieties is selected from the group consisting of: 0.4 to 0.6, 0.3 to 0.7 and 0.2 to 0.8. Additionally, the elastomer material can include a supramolecular network formed as a polymer film configured and arranged to exhibit the autonomous self-healing and notch-insensitive stretching of 1,200-1,500 percent by self-recoverable energy dissipation in the film.

Related and more specific aspects are directed to a polymer film that includes a supramolecular network of elastomer material. Similarly to that described above, the elastomer material has a flexible polymer backbone with a particular ratio of at least first moieties and second moieties. The first moieties provide a first number of dynamic bonds resulting from interactions between the first moieties and the second moieties provide a second number of dynamic bonds resulting from interactions between the second moieties, the second number of dynamic bonds having a weaker bonding strength than the first number of dynamic bonds. The polymer film exhibits autonomous self-healing, a Young's modulus of between 0.1 and 3.0 MPa, and stretching of between 1,200 and 3,000 percent without rupturing. In related and more specific aspects, the polymer film is colorless and transparent, and the first moieties include MPU and the second moieties include IU, and the flexible polymer backbone is selected from the group consisting of: PDMS, PEO, PFPE, PB, poly(ethylene-co-1-butylene), poly (butadiene), hydrogenated poly(butadiene), polybutylene, poly(ethylene oxide)-poly(propylene oxide) block copolymer or random copolymer, and poly(hydroxyalkanoate).

The polymer film exhibits mechanical properties including the self-healing, the Young's modulus and the stretching due to different crosslink strength of the first and second numbers of dynamic bonds. In a number of specific aspects, polymer film is configured and arranged to be stretched up to 3,000 percent and exhibits a Young's modulus of between 0.22 and 1.5 and/or exhibits notch-insensitive stretching and a fracture energy of around 15,000 $J/m^2$. The polymer film can exhibit the autonomous self-healing in the presence of liquid (water, sweat, and/or in the presents of artificial sweat).

Other aspects are directed to methods of forming the elastomer material/polymer film. The elastomer material can be formed by dissolving PDMS-MPUx-IU1-x in $CHCl_3$ and stirring while heating to form a viscous solution and cooling the viscous solution to room temperature. The viscous solution is then poured into a substrate and dried to form a polymer film, which can be removed from the substrate. The polymer film can be further processed, such as solution processing or molding and bonding at elevated temperatures or room temperature.

Another related method can include selecting a ratio of at least a first moiety and a second moiety based on one or more designated mechanical properties, forming a viscous solution that includes a flexible polymer and the ratio of the at least first moiety and the second moiety and from the viscous solution, forming a polymer film includes a supramolecular network of elastomer material. The elastomer material having a flexible polymer backbone that includes the flexible polymer with a particular ratio of first moieties and second moieties. The first moieties providing a first number of dynamic bonds resulting from interactions between the first moieties and the second moieties providing a second number of dynamic bonds resulting from interactions between the second moieties, the second number of dynamic bonds having a weaker bonding strength than the first number of dynamic bonds. The formed polymer film exhibits autonomous self-healing, a Young's modulus of between 0.1 and 3.0 MPa, and stretching of between 1,200 and 3,000 percent without rupturing. As previously described, selecting the ratio of first moieties and second moieties in the polymer film sets mechanical properties of the polymer film. For example, a decrease in the first moiety increases a fracture strain and decreases the Young's modulus and fracture energy. An increase in the first moiety increases the Young's modulus and fracture energy of the polymer film. In a number of related aspects, the method further includes healing the severed polymer film in water (for 24 hours), wherein the healed polymer film is configured and arranged to stretch up to 1,100 percent without rupturing.

In related specific aspects, the polymer film is used to form bulk films, three-dimensional self-healable objects, wearable electronics, robotic applications, self-healable electrode, self-healable capacitive strain sensor, an array of strain sensors.

Various specific aspects are directed to using elastomer material, disclosed herein, in the application of a wearable circuitry. As with the remarkable network of sensitive diverse sensors provided by human skin, specific aspects of the present disclosure are applicable for tactile sensing, health monitoring, and temperature sensing. Consistent with various embodiments, wearable circuitry including electronic sensors (e.g., force and otherwise) are formed using the elastomer of the present disclosure and are able to convert mechanical stimuli into signals, which are then interpreted as beneficial to the particular application. As with human skin, particular embodiments include electronic skin (e-skin) devices which mimic properties of human skin for applications such as wearable devices, artificial prosthetics, health monitoring and smart robots. In this context, e-skin is an artificial skin that mimics properties of skin using surface-interfacing structures which are integrated with electronics (e.g., electronic circuitry).

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which:

FIGS. 2A-2H illustrate example properties of films formed using the elastomer material, in accordance with various embodiments;

FIG. 17B illustrates that the liquid metal cannot be bladed uniformly onto conventional PDMS film because of bad wetting, in accordance with various embodiments;

Figure 1A:
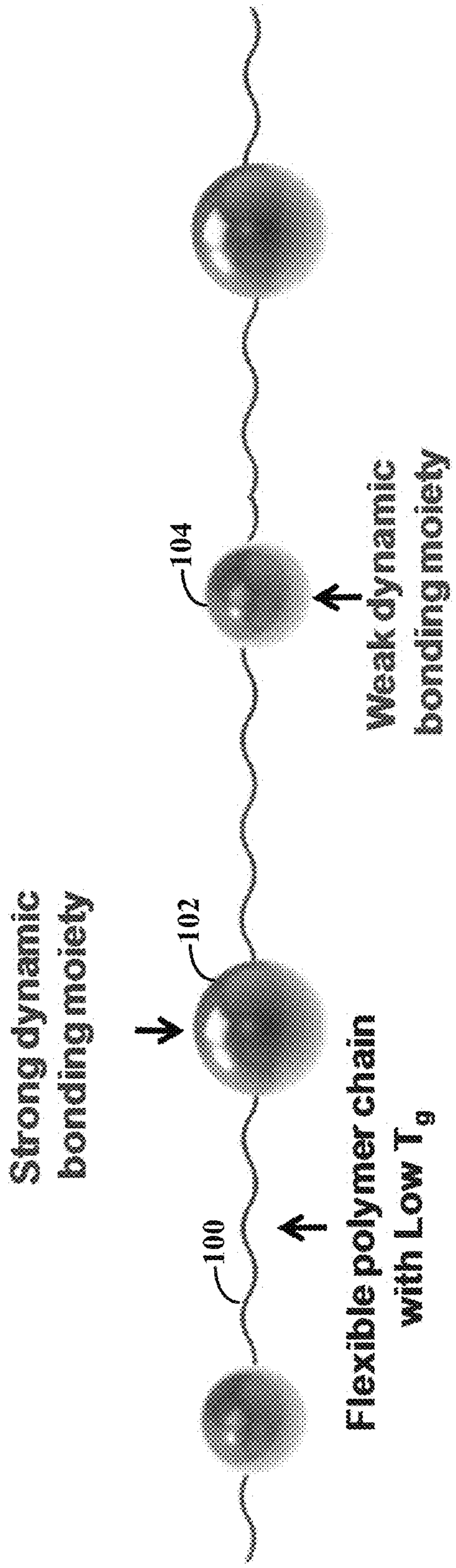
FIG. 1A shows an example of an elastomer material, in accordance with various embodiments.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to variety of different elastomers that are tough, stretchable, and self-healing including elastomers that can self-heal in the presence of liquid, and methods involving use of such elastomers to form electronic circuitry. In certain implementations, aspects of the present disclosure have been shown to be beneficial when used in the context of wearable circuits, such as skin-like tactile sensor, but it will be appreciated that the instant disclosure is not necessarily so limited. Various aspects may be appreciated through the following discussion of non-limiting examples which use exemplary contexts.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

Particular example embodiments are directed to a stretchable, self-healing, and mechanically tough elastomer, which can be used in a variety of electronic applications. In specific embodiments, the elastomer can include a self-healing silicon material with a fracture energy of around 12,000 Joule per meter squared (J/$m^2$) and that is crosslinked (e.g., covalently or non-covalently) through multiple strength dynamic bonding interactions. The elastomer can include a supramolecular network formed in film and that realizes autonomous self-healing and notch-insensitive stretching up to 1,200 or even up to 3,000 percent due to self-recoverable energy dissipation. The elastomer material can be used for the fabrication of various stretchable electronics. In addition, exceptional toughness of self-healing material allows for facile implantation of electronic components on soft surfaces by suturing. Electronic circuits formed using the elastomer, such as wearable circuitry, can be malleable, intuitively programmable, and adaptive to the rapidly changing social and mechanical norms due to the stretchability and toughness of the elastomer.

In accordance with various embodiments, the elastomer material is self-healing. Surprisingly, the self-healing of the elastomer can take place in water in accordance with various specific embodiments. The self-healing of the elastomer can be achieved by tuning the ratio of strong and weak crosslinking dynamic bonds in the supramolecular structure that exhibits superior mechanical properties in stretchability, toughness and self-healability (as further illustrated herein by FIGS. 2A-2H). As further explained herein, the different strong and weak crosslinking dynamic bonds are due to interactions between different moieties. Various embodiments include different elastomers formed of polydimethylsiloxane (PDMS) polymers with various ratios of 4,4'-methylenebis(phenyl urea) (MPU) and isophorone bisurea units (IU) (as further illustrated by FIGS. 1A-1C). PDMS and dynamic bonds are chosen based on their biocompatible and containment of no toxic elements, therefore, making the resulting elastomer material an ideal carrier for wearable electronics and biomedical applications. In specific embodiments, each of the PDMS-MPUx-IU1-x polymers form colorless and transparent films (see, e.g., FIGS. 5A-5B). The films can be stretched to sixteen times their original length at a loading rate of 20 mm/min (200 percent/min) without rupturing (e.g., see, FIGS. 3A-3D). The polymer films, surprisingly, can achieve notch-insensitive stretching up to 1,200 percent strain, demonstrating an exceptional toughness (see, e.g., FIGS. 3E-3F and FIGS. 6A-6C). Other previously formed and typical PDMS substrates rupture at less than 200 percent strain. Further, other commonly used substrates, such as polyurethane and styrene-ethylene-butylene styrene (SEBS) rupture at 700 percent and 280 percent strain, respectively. Moreover, the above-described elastomer material, formed as a film, can achieve notch-insensitive stretching at more than 150 percent strain, indicating higher toughness than other material and fracture intolerance to tear (see, e.g., Table 1). Notch-insensitive stretching, as used herein, includes or refers to stretching of a polymer film having a notch therein. Although embodiments are not so limited and can include a different types of polymer backbones and types and/or numbers of different moieties, as further described herein.

Turning now to the figures, FIG. 1A shows an example of an elastomer material, consistent with embodiments of the present disclosure. The elastomer material 101 has a flexible polymer backbone 100 with a particular ratio of first moieties 102 and second moieties 104. Based on the particular ratio of first and second moieties 102, 104, the elastomer material 101 exhibits autonomous self-healing, a particular toughness, and is stretchable. For example, the elastomer material can exhibit a Young's modulus of between 0.1 and 3.0 megapascal (MPa), stretching of between 1,200 and 3,000 percent without rupturing and/or fracture energy of between 12,000 to 15,000 Joule per meter squared ($J/m^2$). Additionally, the elastomer material can self-heal, and after healing, can exhibit notch-insensitive stretching of between 1,200 to 1,500 percent.

As illustrated, the elastomer material 101 includes a flexible polymer backbone with a low glass transition temperature (Tg). As used herein, low Tg can include Tg values that are less zero degrees Celsius (C). The polymers include a particular ratio of at least first moieties (e.g., strong dynamic bonding moiety) and second moieties (e.g., weak dynamic bonding moiety) having a lesser crosslink strength than the first moieties. The flexible polymer backbone 100 can include polydimethylsiloxane (PDMS) polyethyleneoxide (PEO), Perfluoropolyether (PFPE), polybutylene (PB), poly(ethylene-co-1-butylene), poly(butadiene), hydrogenated poly(butadiene), polybutylene, poly(ethylene oxide)-poly(propylene oxide) block copolymer or random copolymer, or poly(hydroxyalkanoate).

The first moieties 102 and second moieties 104 can covalently bond to other first and second moiety units. For example, the first moieties 102 provide a first number of dynamic bonds resulting from interactions between the first moieties 102 and the second moieties 104 provide a second number of dynamic bonds resulting from interactions between the second moieties 104. Dynamic bonds and/or bonding, as used herein, include or refer to bonds (e.g., bonding) that can be reformed, once broken due to mechanical forces, at room temperature or elevated temperature. Examples of dynamic bonding include hydrogen bonding, metal-ligand bonding, guest-host interactions, and supramolecular interactions. As a specific example, the first moieties can form aggregation or crystallites that are nanometers or larger. The second number of dynamic bonds, as further illustrated herein, have a weaker bonding strength than the first number of dynamic bonds. That is, the second moieties have a weaker crosslink strength than the first moieties (e.g., easier to break). As an example, the first moieties 102 form up to four dynamic (e.g., hydrogen) bonds with another of the first moieties and the second moieties 104 form less than four dynamic bonds (e.g., up to two hydrogen bonds) with another of the second moieties. The at least first moieties and second moieties can be spaced randomly or equally from another within the polymer backbone. For example, the polymer segment between the moieties can typically be between 1,000 Dalton to 25,000 Dalton, although embodiments are not so limited.

In specific embodiments, the first moieties 102 include 4,4'-methylenebis(phenyl urea) (MPU) and the second moieties 104 include isophorone bisurea (IU). Different ratios of the first moieties 102 and second moieties 104 can provide different features exhibited by the resulting elastomer material 101. For example, the ratio can be selected based on one or more designated (e.g., desired or intended) mechanical properties of a resulting elastomer material and/or film formed therefrom. In some embodiments, the particular ratio of MPU moieties to IU moieties is selected from the group consisting of: 0.4 to 0.6, 0.3 to 0.7 and 0.2 to 0.8. The ratio can be adjusted to set mechanical properties such as fracture strain, fracture energy, and Young's modulus. As specific examples, the elastomer material 101 can stretch up to 3,000 percent and exhibits a Young's modulus of between 0.22 and 1.5 MPa and/or exhibits autonomous self-healing and notch-insensitive stretching of 1,200-1,500 percent by self-recoverable energy dissipation.

Figure 1B:
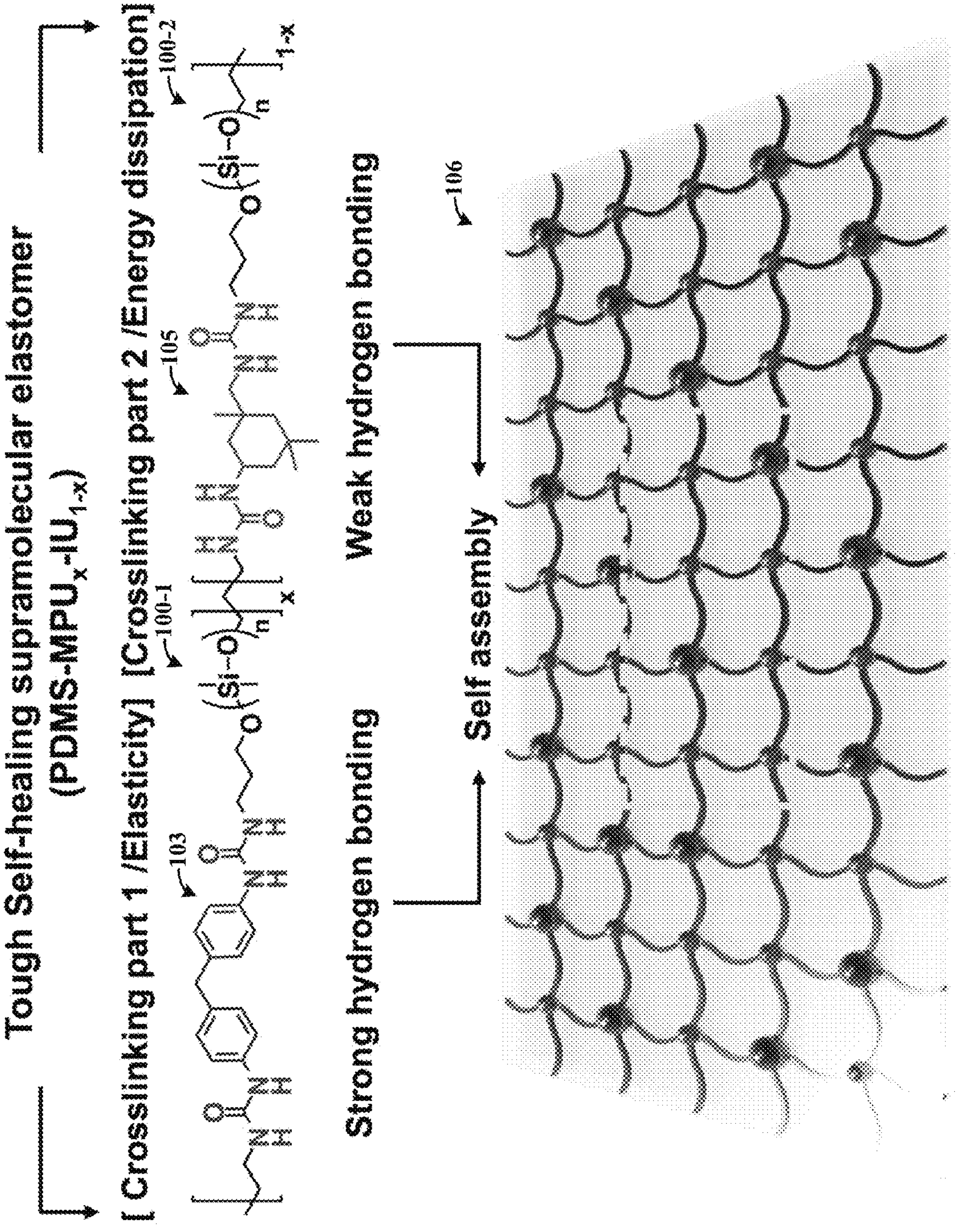
FIG. 1B shows an example of an elastomer material and the supramolecular network formed as a polymer film from the elastomer material, in accordance with various embodiments.

In a number of embodiments, as further illustrated by FIG. 1B, the elastomer material 101 can include or be used to form a polymer film. The polymer film includes a supramolecular network of the elastomer material 101, as described above and including the various moieties and flexible polymer backbones. The polymer film can be colorless and transparent, although embodiments are not so limited. The polymer film can exhibits autonomous self-healing, a Young's modulus of between 0.1 and 3.0 MPa, and stretching of between 1,200 and 3,000 percent without rupturing. In specific embodiments, the polymer film exhibits the autonomous self-healing and notch-insensitive stretching of 1,200-1,500 percent by self-recoverable energy dissipation in the film. In other specific embodiments, the polymer film can be stretched up to 3,000 percent and exhibits a Young's modulus of between 0.22 and 1.5 MPa, exhibits notch-insensitive stretching and/or a fracture energy of around 15,000 J/m2.

As previously described, the polymer film exhibits mechanical properties including the self-healing, the Young's modulus and the stretching due to different crosslink strength of the first and second numbers of dynamic bonds. In various embodiments, polymer film exhibit the autonomous self-healing in the presence of liquid, such as water, sweat, and/or in the presents of artificial sweat. As further illustrated and described herein, the elastomer material 101 and/or polymer film can be used to forms three-dimensional self-healable objects, wearable electronics, robotic applications, self-healable electrode, self-healable capacitive strain sensor, and/or an array of strain sensors.

FIG. 1B shows an example of an elastomer material and the supramolecular network formed as a polymer film from the elastomer material, consistent with embodiments of the present disclosure. As previously described, the elastomer material can include a supramolecular network formed as a polymer film 106 and that realizes autonomous self-healing, stretching, and is tough. The elastomer material includes, in specific embodiments, a PDMS 100-1, 100-2 with a particular ratio of at least first and second moieties, such as the illustrated MPU and IU units 103, 105. In specific embodiments, the ratio of MPU and IU units 103, 105 can be adjusted, as further illustrated herein. Although embodiments are not so limited and can include a variety of different flexible polymer backbones, and different units that provide the different crosslink strengths, as further illustrated herein. As may be appreciated, the term "unit" is sometimes herein interchangeably used to refer to a moiety. Additionally, and in accordance with various embodiments, the flexible polymer backbone can include more than two different types of moieties, such as first, second, and third moieties.

More specifically, FIG. 1B illustrates the chemical structure of PDMS-MPUx-IU1-x and the supramolecular structure therein. It is believed that the mechanical properties of the elastomer material (e.g., PDMS-MPUx-IU1-x) is due to the different crosslink strength of the moieties MPU and IU 103, 105. The MPU and IU units can provide different strength dynamic bonding. A first type of dynamic bonding can include covalent bonds to hydrogens resulting from MPU-MPU interactions and a second type of dynamic bonding can include a bond of lower strength than the first type of dynamic bonding that results from IU-IU interactions. For example, the MPU units (e.g., MPU 103) within the supramolecular structure provide a first number of hydrogen bonds resulting from respective interactions between the MPU units (e.g., four hydrogen bonds between two MPU units). The IU units (e.g., IU 105) within the supramolecular structure provide a second number of hydrogen bonds resulting from respective interactions between the IU units (e.g., two hydrogen bonds between two IU units).

A particular embodiment of elastomer includes a PDMS-$MPU_{0.4}$-$IU_{0.6}$ film which includes ratio of MPU units to IU units of 0.4 to 0.6. In experimental embodiments, the PDMS-$MPU_{0.4}$-$IU_{0.6}$ film can dissipate strain energy efficiently, as shown by the observed pronounced hysteresis in the loading and unloading curves (see, e.g., FIGS. 7A-7B). If the polymer film is first allowed to rest for 30 minutes and stretched again, the stress-strain curves can recover completely (see, e.g., FIGS. 7A-7B). Surprisingly, the PDMS-$MPU_{0.4}$-$IU_{0.6}$ film exhibits notch-insensitive stretching and a high fracture energy (around 12,000 J/m2) among reported intrinsically tough materials as well as self-healing polymers (see, e.g., FIGS. 3E-G, 3N and FIGS. 8A-8B).

The mechanical properties of PDMS-MPU-IU can depend on the ratio of MPU and IU units. In various experimental embodiments, when the ratio of MPU units in the polymer is decreased, the fracture strain of the polymer film is increased, and the Young's modulus and fracture energy are decreased (see, e.g., FIGS. 3C, 3D, 3G and Table 1). For high mechanical strength, a higher MPU-MPU crosslinking density is used. It is believed that the formation of the supramolecular structure in the polymer film is driven by the combination of stronger MPU-MPU bonds, and the weaker MPU-IU or IU-IU bonds, as illustrated by FIG. 1B.

In other specific experimental embodiments, in $CHCl_3$ solution, the MPU units are observed to interact primarily with the MPU unit rather than the IU unit, which can be confirmed by both concentration dependent viscosity measurements and nuclear magnetic resonance (NMR) measurements (see, e.g., FIGS. 9A-10E). Such a pre-crosslinked polymer network by MPU-MPU interactions in $CHCl_3$ solution gives rise to a supramolecular structure in polymer film with both strong bonds and weak bonds upon removal of the solvent. The resulting supramolecular structure is stretchable and has a high fracture energy (see, e.g., FIG. 2A). When a notched sample is stretched, the strong bonds are believed to be sufficient to block the induced crack propagation while the weak bonds simultaneously break and dissipate strain energy. It is believed that the breakage of the weak bonds is able to reduce the stress concentration on the strong bonds in the notch (see, e.g., FIG. 2C). Moreover, since the MPU and IU units are covalently linked by flexible PDMS, the above process can synergistically take place (see, e.g., FIG. 3G).

Accordingly, the illustrated elastomer material 103, 100-1, 105, 100-2 can be used to form a polymer film 106 that is self-healing, tough, and stretchable. The polymer film is capable of autonomous self-healing even when immersed in water. As a specific example and further illustrated herein, it is observed that the scar on a cut polymer film 106 (PDMS-$MPU_{0.4}$-$IU_{0.6}$) can almost disappear after healing at room temperature for three days (see, e.g., FIGS. 3I-3J). The healed polymer film 106 is again able to be stretched to 1,500 percent after 48 hours with self-healing efficiency of 78 percent (see, e.g., FIG. 3H and Table 1). Polymers with lower MPU ratios, such as PDMS-$MPU_{0.2}$-$IU_{0.8}$ and PDMS-$MPU_{0.3}$-$IU_{0.7}$, show faster healing and higher self-healing efficiencies given the same healing time (see, e.g., Table 1). This observed ambient self-healing property can be attributed to the abundant dynamic hydrogen bonds within the elastomer material and the low glass transition temperature (Tg) (<0° C.) of the PDMS backbone (see, e.g., FIG. 11).

As previously described, the self-healing of the elastomer material (e.g., PDMS-$MPU_{0.4}$-$IU_{0.6}$) is water-insensitive. When the severed polymer film is healed in water for 24 hours, the resulting film can be stretched up to 1,100 percent strain (see, e.g., FIGS. 3K-3M and FIGS. 12A-12E). Importantly, there is no significant water uptake into the polymer film (see, e.g., 12A-12E). It is believed that the hydrophobicity of the polymer backbone (PDMS) may increase the enthalpy gain for hydrogen bonding formation, which is responsible for self-healing. The resulting enthalpy gain may exceed entropy gain by hydration of hydrogen bonding units (which will lead to self-healing failure). Such elastomers can be used for water-insensitive self-healing polymers based on broadly used hydrogen bonding systems.

The mechanical and self-healing properties of the elastomer material (e.g., PDMS-$MPU_{0.4}$-$IU_{0.6}$) in accordance with the present disclosure, allows the material to be processed in various ways. Example processing includes solution processing or molding and bonding at elevated temperatures and even room temperature (see, e.g., FIGS. 13A-13B). For example, two sheets of PDMS-$MPU_{0.4}$-$IU_{0.6}$ films can be bonded together giving mechanical properties similar as the bulk film (see, e.g., FIGS. 14A-14F). Further, PDMS-$MPU_{0.4}$-$IU_{0.6}$ blocks can be readily attached to PDMS-$MPU_{0.4}$-$IU_{0.6}$ substrate with robust interface even under large applied biaxial strain (see, e.g., FIGS. 4A and 14A-14F). Additionally, using the elastomer material, three-dimensional (3D) self-healable objects can be formed, such as self-healing flower and boat (see, e.g., FIG. 4B and FIGS. 14A-14F). Moreover, the tough self-healing film can be sutured on soft animal skin surfaces without rupturing (see, e.g., FIGS. 4C-4D). Combing with its self-healing property in water, this material is especially useful as a substrate for attaching electronics onto soft surfaces (see, e.g., FIG. 4E).

Figure 1C:
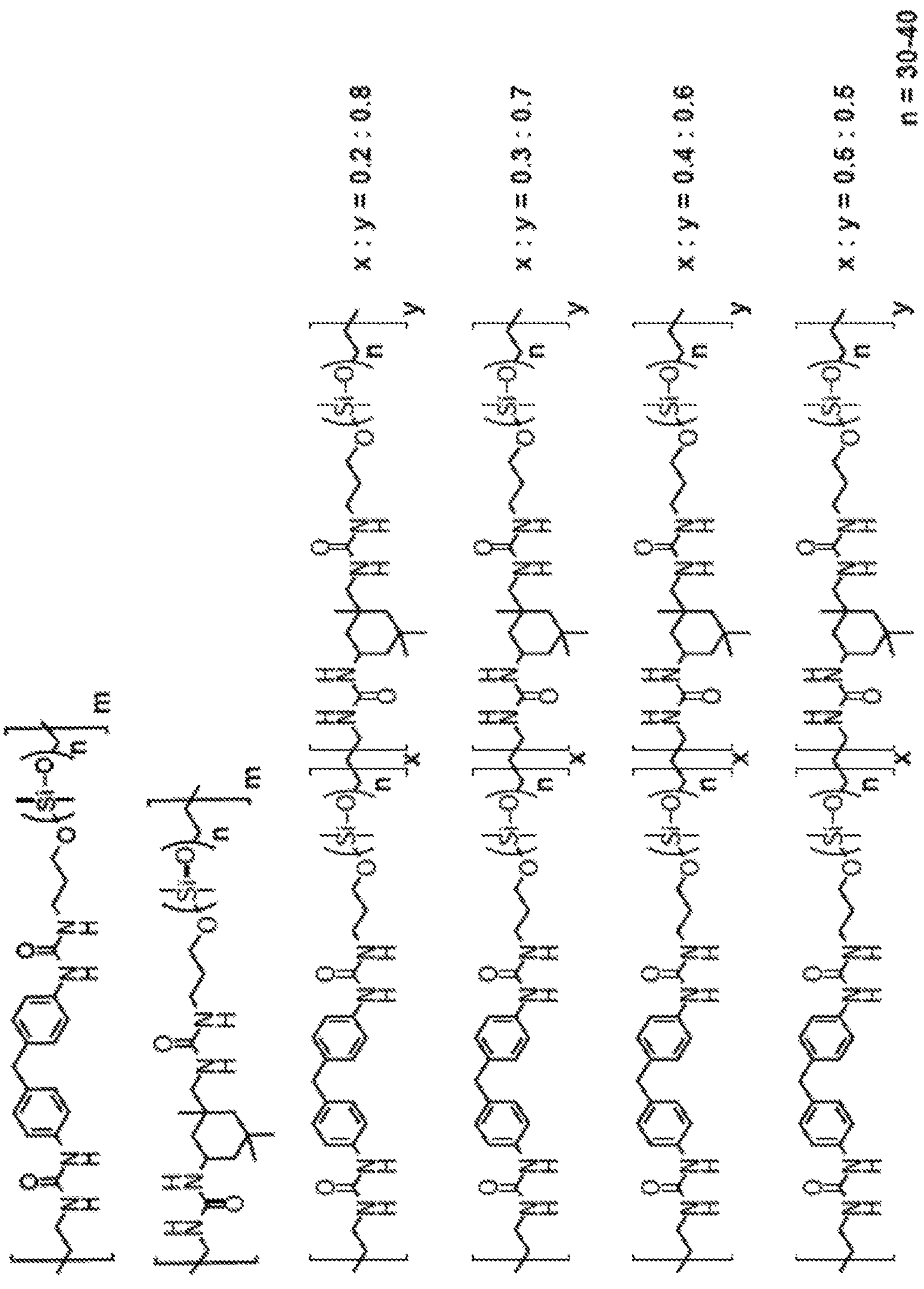
FIG. 1C illustrates examples of different chemical structures of polymers synthesized and characterized herein, in accordance with various embodiments.

FIG. 1C illustrates examples of different chemical structures of polymers synthesized and characterized herein. Further details of processes for synthesizing the various polymers is provided herein.

Figure 1D:
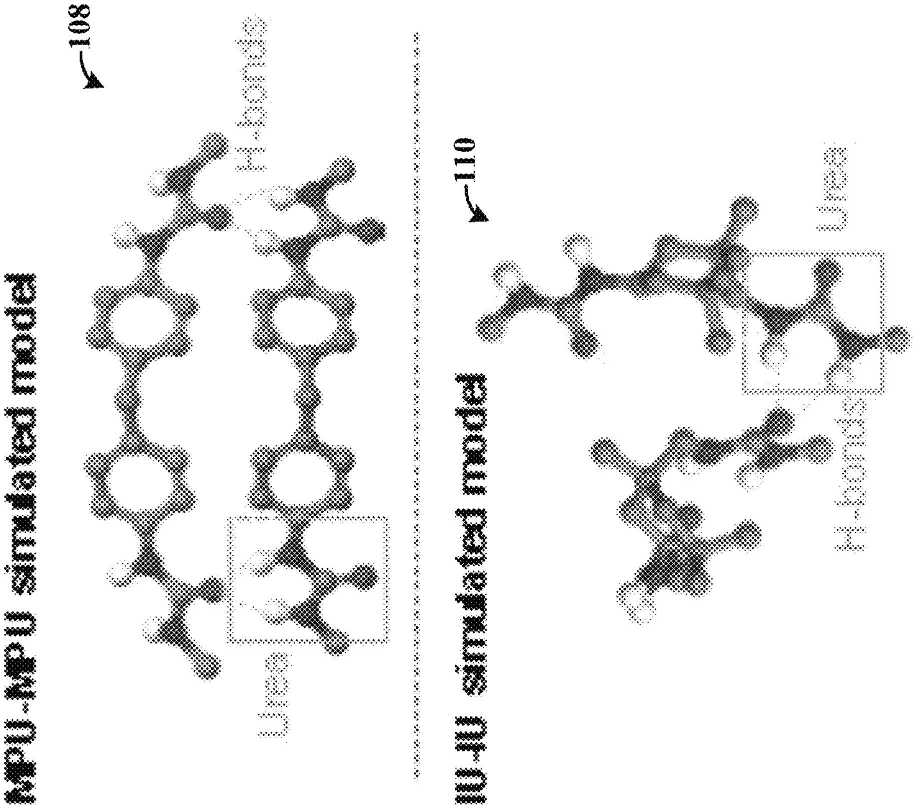
FIG. 1D illustrates a simulated dimer model of MPU-MPU and IU-IU, in accordance with various embodiments.

FIG. 1D illustrates a simulated dimer model of MPU-MPU 108 (top) and IU-IU 110 (bottom), respectively. Calculations for example experimental embodiments can be performed with the Gaussian 09 program package, where structural optimizations are carried out at the B31YP/6-31g (d) level followed by frequency calculation at the same level, affording the structures on the next page with zero imaginary frequencies. For MPU-MPU interaction, a maximum of four hydrogen bonds can form. By contrast, IU can form a maximum of two hydrogen bonds with a counter IU. Accordingly, this supports that the MPU-MPU interaction is stronger than IU-IU interaction and imparts elasticity. Particularly, the IU-IU dimer model can be unstable due to its dynamic motion.

Although the embodiments described above, such as those illustrated by FIGS. 1A-1D, illustrate a polymer backbone with two moieties that each form hydrogen bonds, embodiments are not so limited. For example, the polymer backbone can include more than two moieties and/or one or more of the two or more moieties can form dynamic bonds other than hydrogen bonds, such as metal-ligand bonding, guest-host interactions, and/or supramolecular interactions. Additional examples of moieties and resulting dynamic bonds are further illustrated herein by FIG. 2G and FIG. 2H.

Figure 2C:
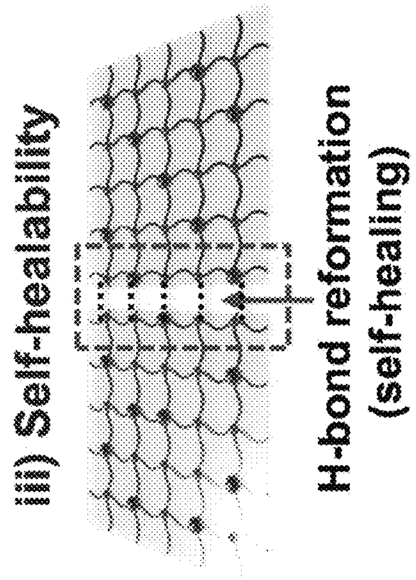
Figure 2B:
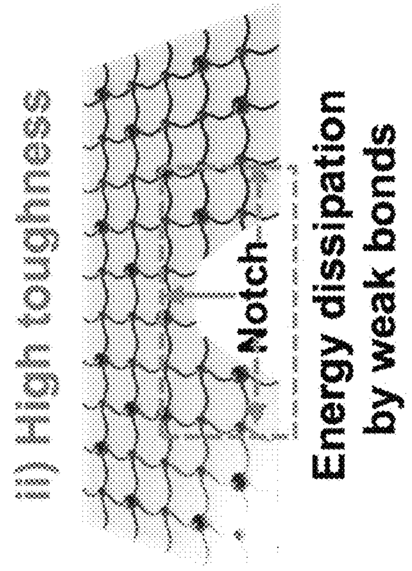
Figure 2A:
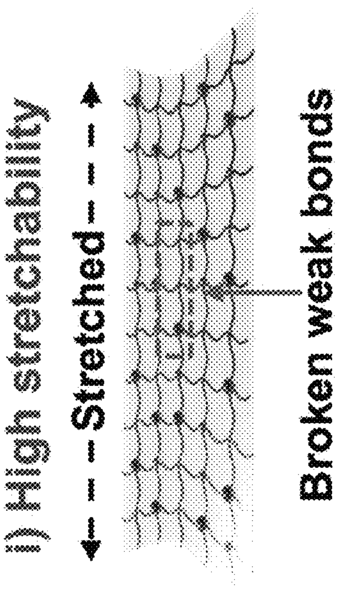

FIGS. 2A-2H illustrate example properties of polymer films formed using the elastomer material, in accordance with various embodiments. FIG. 2A is a schematic of a stretched polymer film in accordance with embodiments. FIG. 2B illustrates a notched polymer film (e.g., the toughness of the film) and FIG. 2C illustrates self-healing of the polymer film in accordance with various embodiments.

Figure 2D:
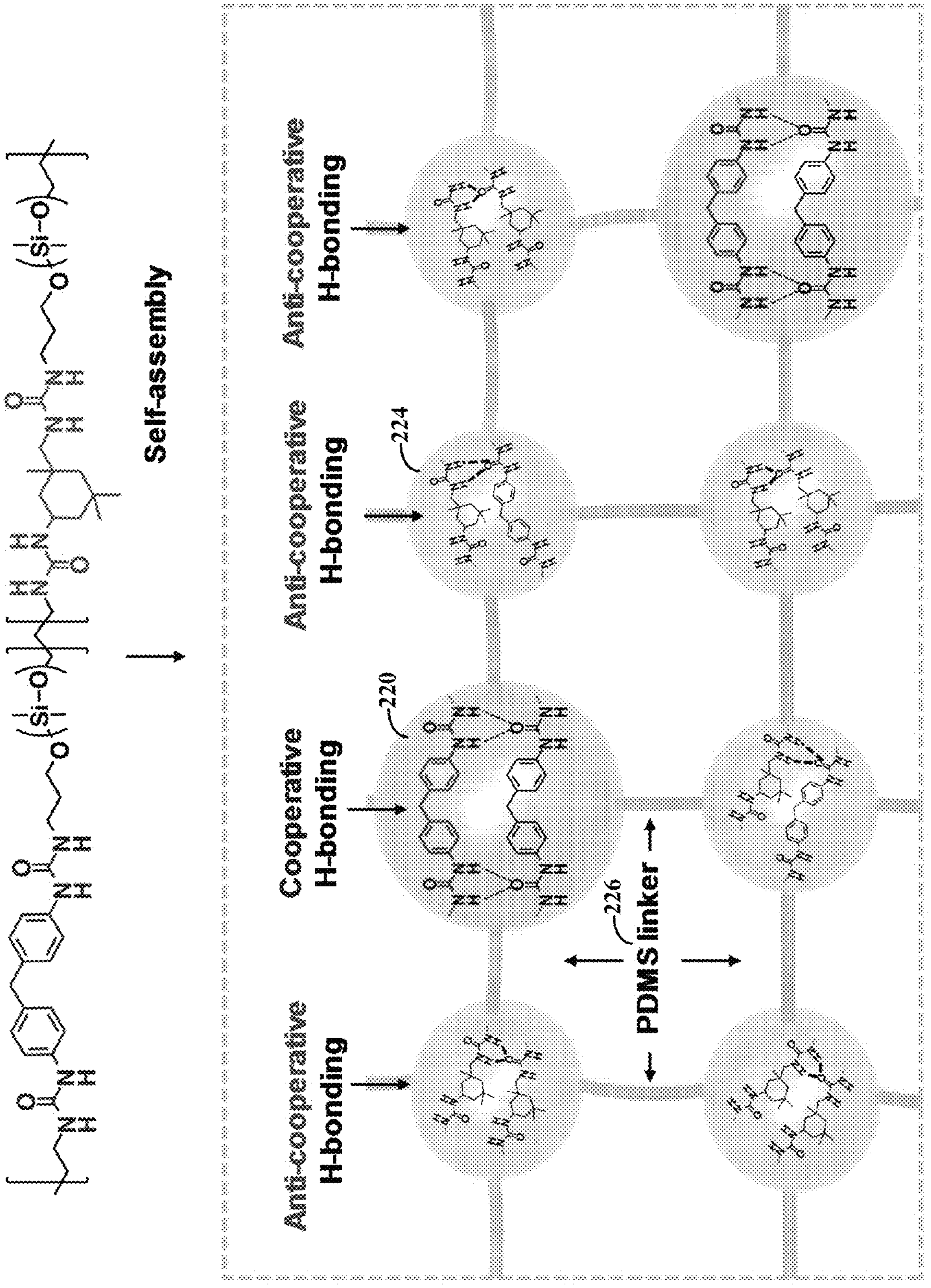

FIG. 2D illustrates an example dynamic bonding combinations for strong bond and weak bond, respectively. As previously described, a variety of different flexible polymer backbones and different types of moieties 220, 224 (e.g., bonding units) can be used. Example flexible polymer backbones 226 include polydimethylsiloxane (PDMS) polyethyleneoxide (PEO), Perfluoropolyether (PFPE), polybutylene (PB), poly(ethylene-co-1-butylene), poly(butadiene), hydrogenated poly(butadiene), polybutylene, poly(ethylene oxide)-poly(propylene oxide) block copolymer or random copolymer, and poly(hydroxyalkanoate).

Figure 2E:
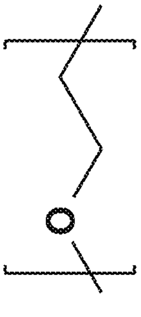
Figure 2E:
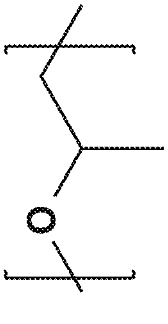
Figure 2E:
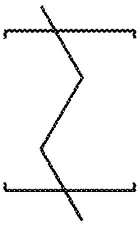
Figure 2E:
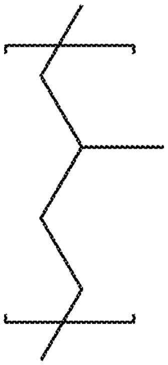
Figure 2E:
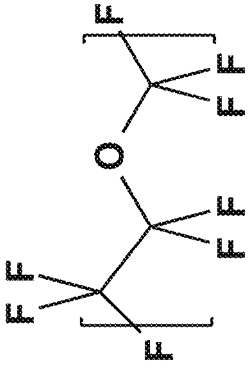
Figure 2E:
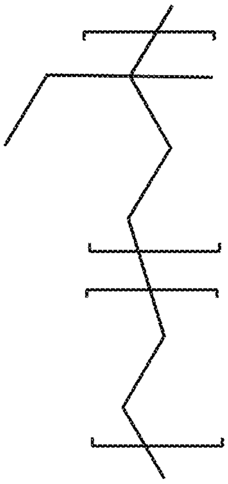
Figure 2E:
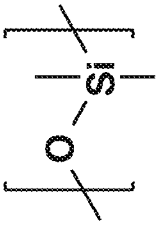

FIG. 2E illustrates examples of different types of flexible polymer backbones. As illustrated, the polymer backbone can include PDMS, PEO, Polyethylene, PFPE, PB, poly (ethylene-co-1-butylene) and/or Polydimethylsiloxane, among other types of polymer backbones, such as poly (butadiene), hydrogenated poly(butadiene), polybutylene, poly(ethylene oxide)-poly(propylene oxide) block copolymer or random copolymer, poly(hydroxyalkanoate).

Figure 2F:
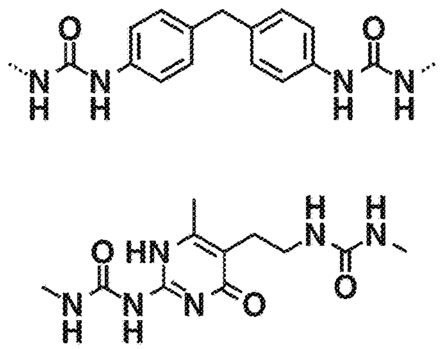
Figure 2F:
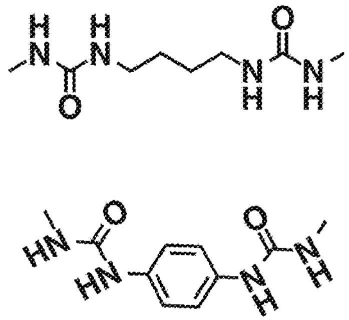
Figure 2F:
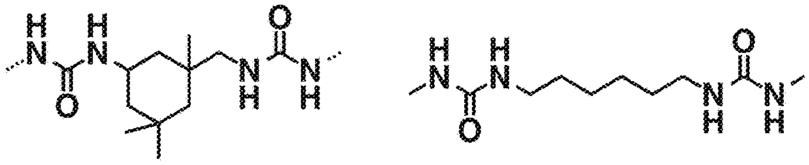

FIG. 2F illustrates different types of moieties 230, 232, 234, which can also be referred to as bonding sites. The different moieties 230, 232, 234 can have different strengths of crosslinking.

In accordance with a number of embodiments, various methods are directed to forming the elastomer material and/or polymer film. An example method includes selecting a ratio of at least a first moiety and a second moiety based on one or more designated mechanical properties. As previously described, the particular ratio can be selected to set mechanical properties of the resulting polymer film. For example, a decrease in the first moiety increases a fracture strain and decreases the Young's modulus and fracture energy. An increase in the first moiety increases the Young's modulus and fracture energy of the polymer film. The method further includes forming a viscous solution that includes a flexible polymer and the ratio of the at least first moiety and the second moiety, and from the viscous solution, forming a polymer film includes a supramolecular network of elastomer material. As previously described, the elastomer material has a flexible polymer backbone that includes the flexible polymer with the particular ratio of the at least first moieties and second moieties. The first moieties provide a first number of dynamic bonds resulting from interactions between the first moieties and the second moieties provide a second number of dynamic bonds resulting from interactions between the second moieties, with the second number of dynamic bonds having a weaker bonding strength than the first number of dynamic bonds. The formed polymer film exhibits autonomous self-healing, a particular Young's modulus, and stretching based on the selected ratio of first moieties and second moieties. For example, the polymer film can exhibit a Young's modulus of between 0.1 and 3.0 MPa, and stretching between 1,200 and 3,000 percent. In a number of embodiments, the polymer film is severed and the method further includes healing the severed polymer film in water (e.g., for 24 hours), wherein the healed polymer film can be stretched up to 1,100 percent without rupturing.

Figure 2G:
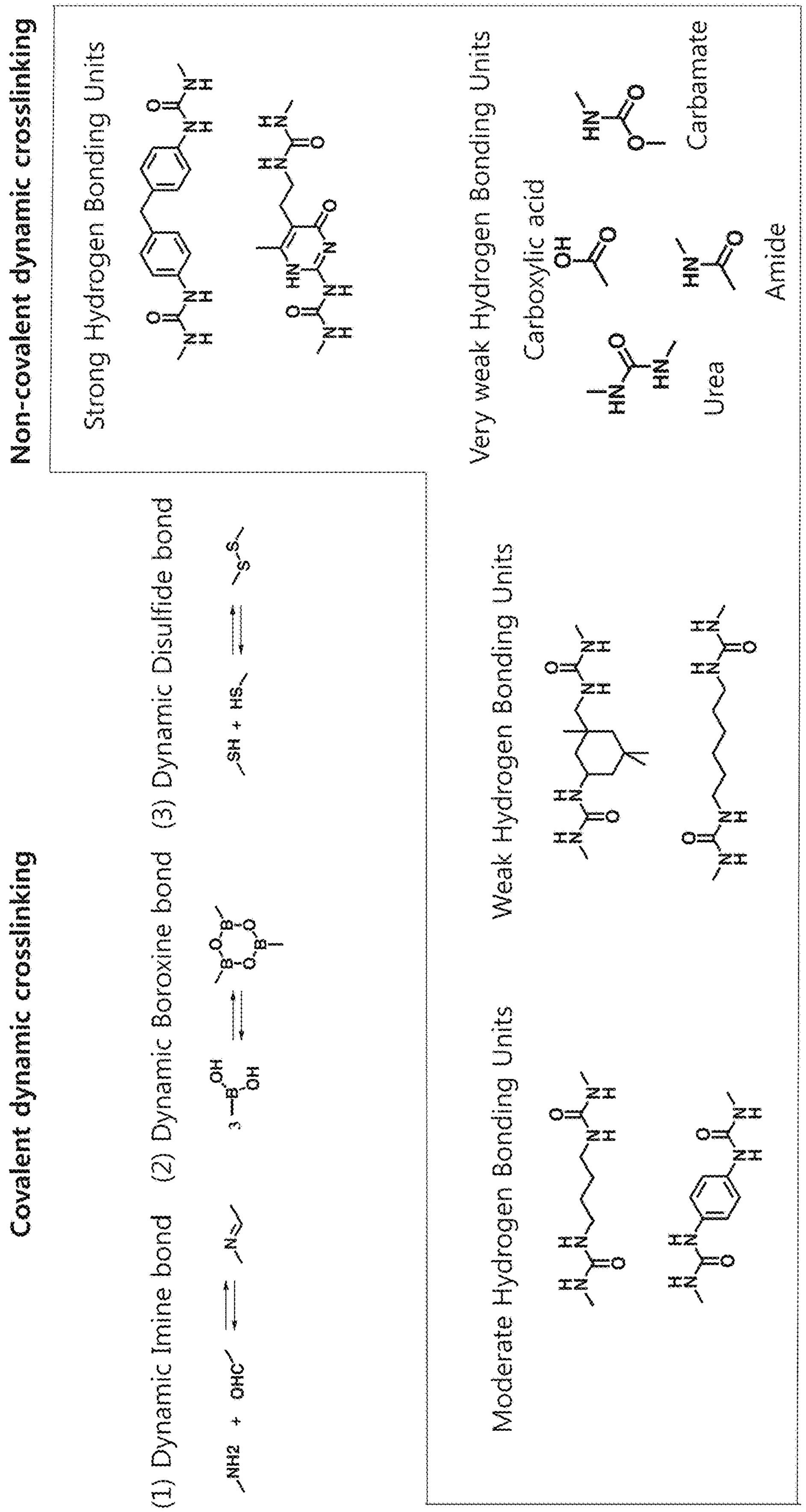

FIG. 2G illustrates examples of different moieties and dynamic bonding, in accordance with various embodiments. The dynamic bonding can be covalent or non-covalent, such as hydrogen bonding, metal-ligand bonding, guest-host interaction, and supramolecular interaction.

FIG. 2H illustrates examples of different moieties and tuning of respective dynamic bonding strength, in accordance with various embodiments. In accordance with various embodiments, the polymer backbone can include three or more different moieties. In specific embodiments, the three (or more) moieties can be selected from those illustrated by FIGS. 2D, 2F, and 2G-2H. At least two of the three or more different moieties have the different crosslinking dynamic bonding strength. The third (or more) moieties can have a similar crosslinking dynamic bonding strength as one of the first or second moieties or a different strength, such as a bonding strength that is between the bonding strength of the first moieties and the second moieties.

Figure 3A:
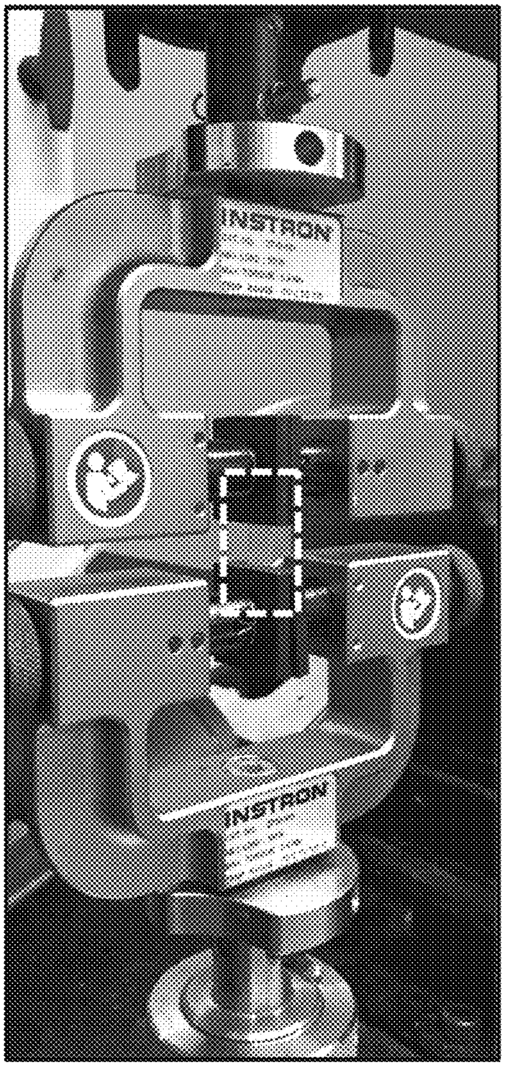
FIGS. 3A-3N illustrate example properties of polymer films formed using the elastomer material, in accordance with various embodiments.
Figure 3B:
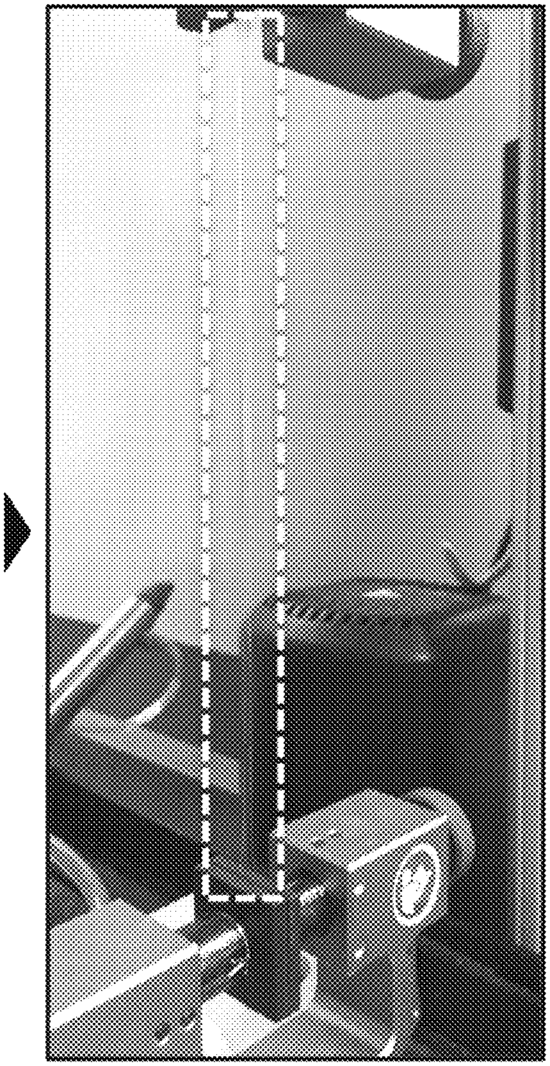
Figure 3C:
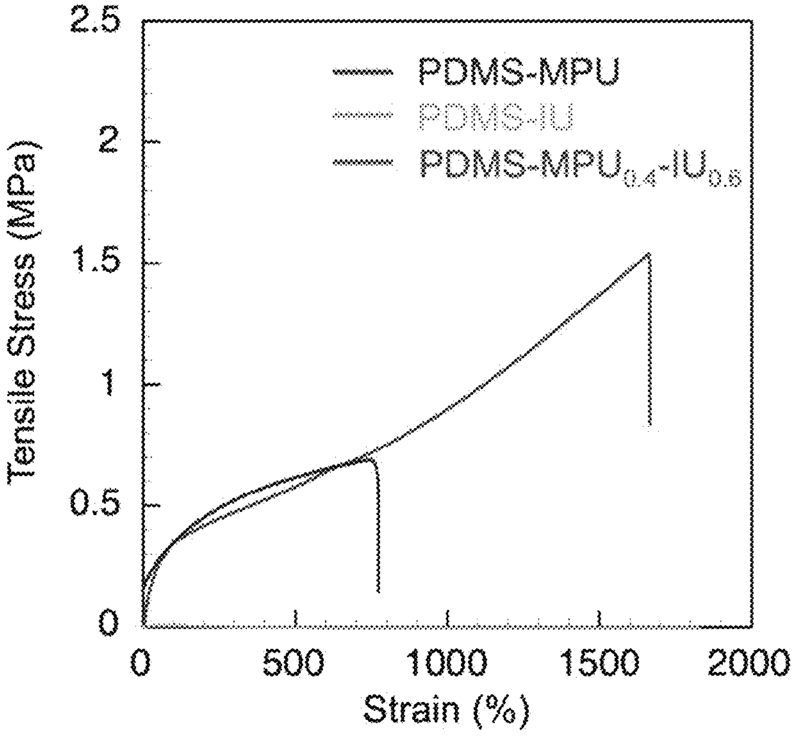
Figure 3D:
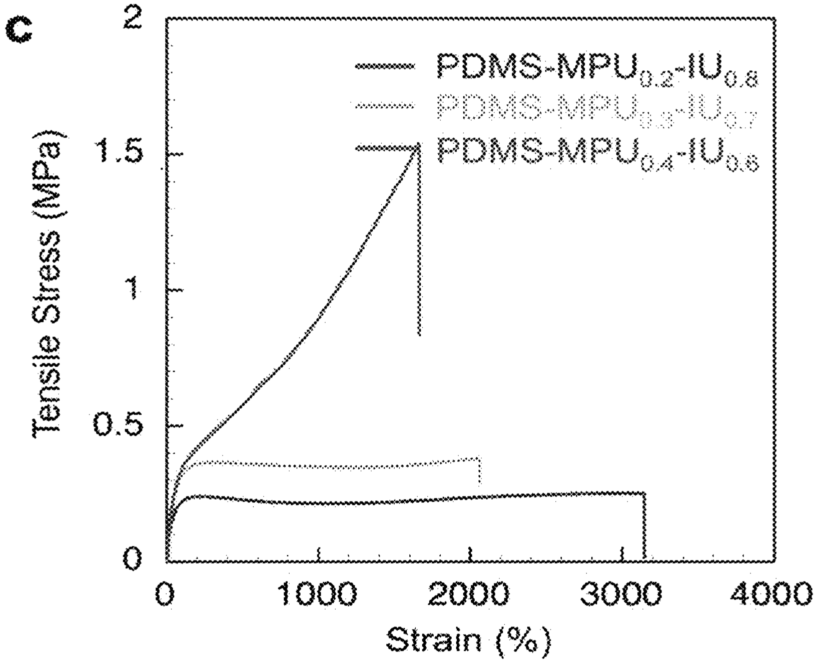
Figure 3E:
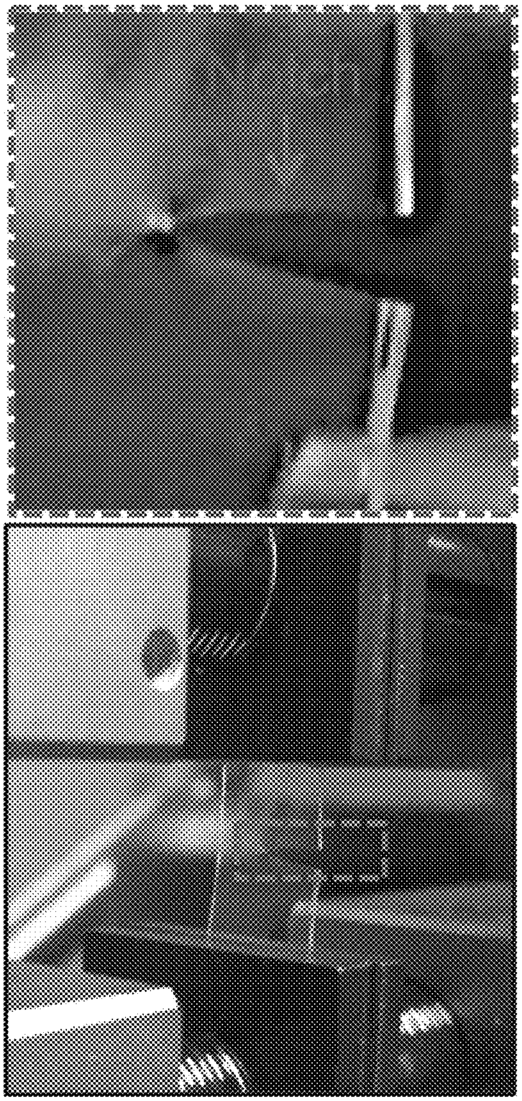
Figure 3F:
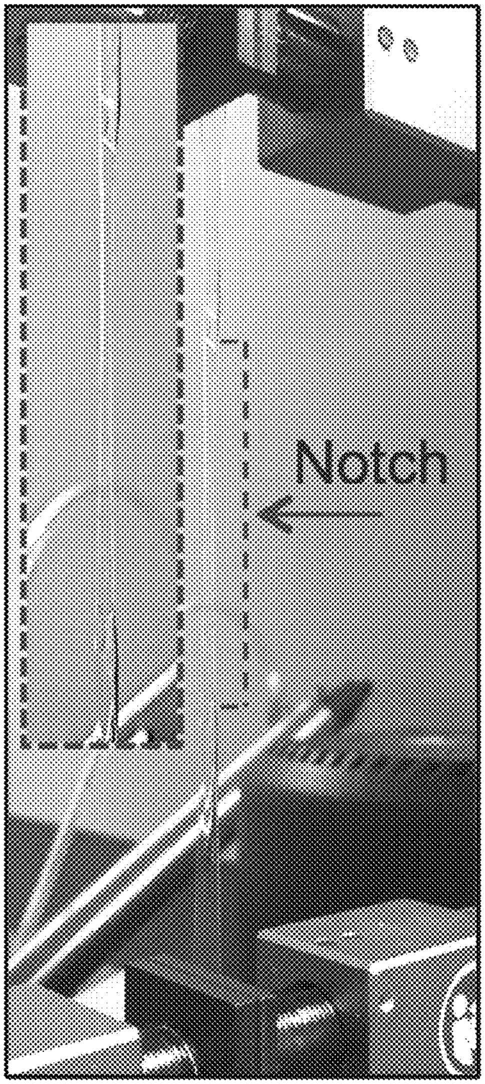
Figure 3G:
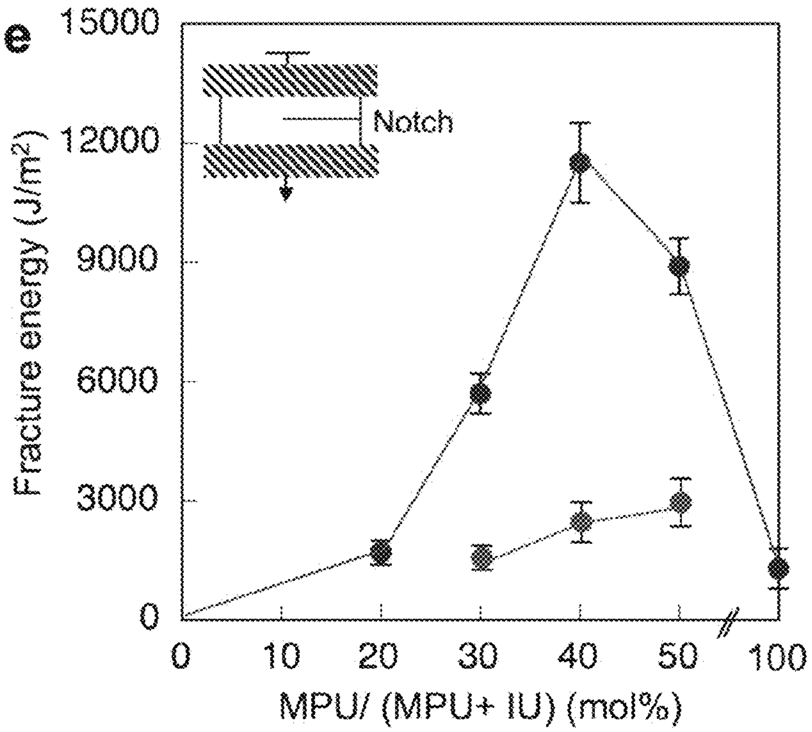
Figure 3H:
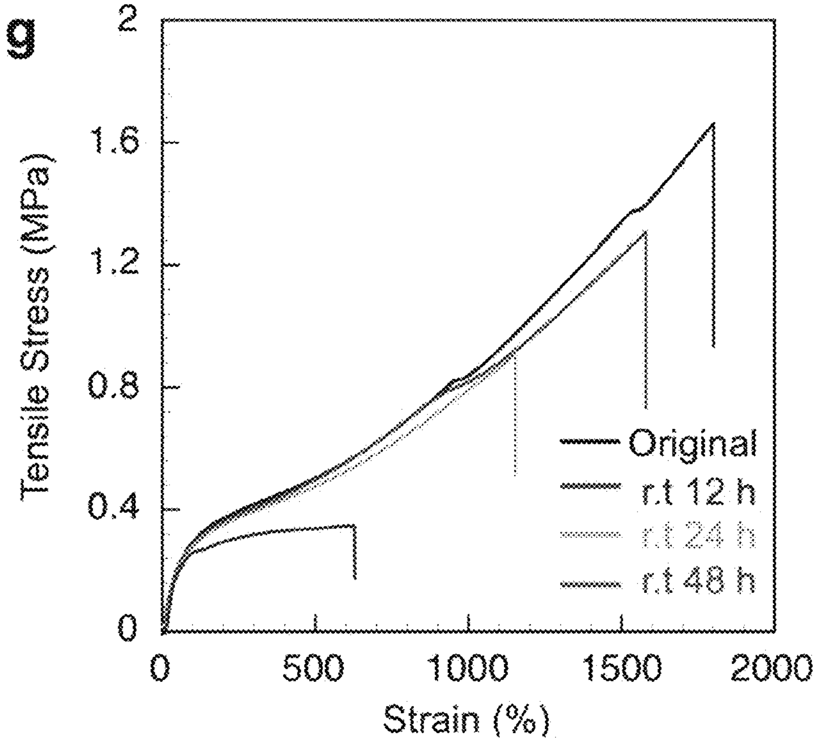
Figure 3I:
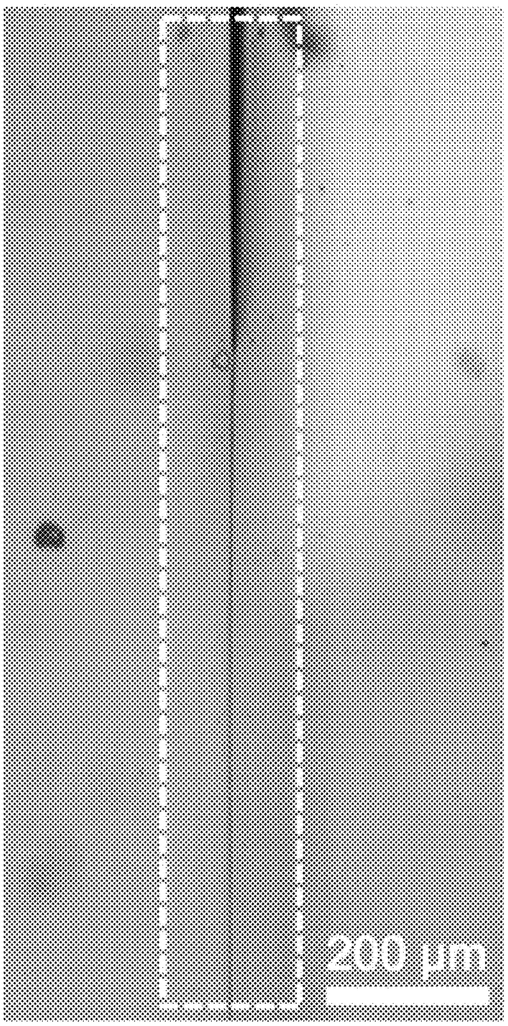
Figure 3J:
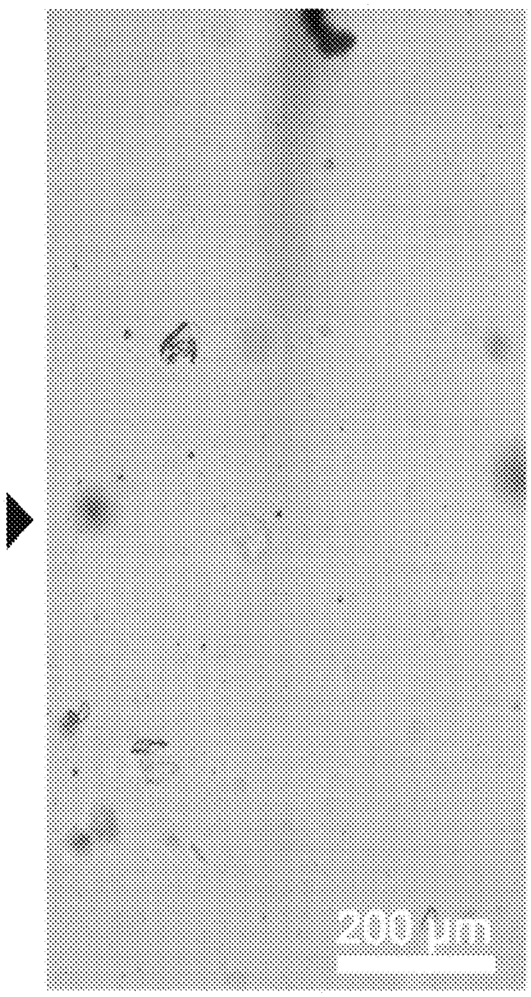
Figure 3K:
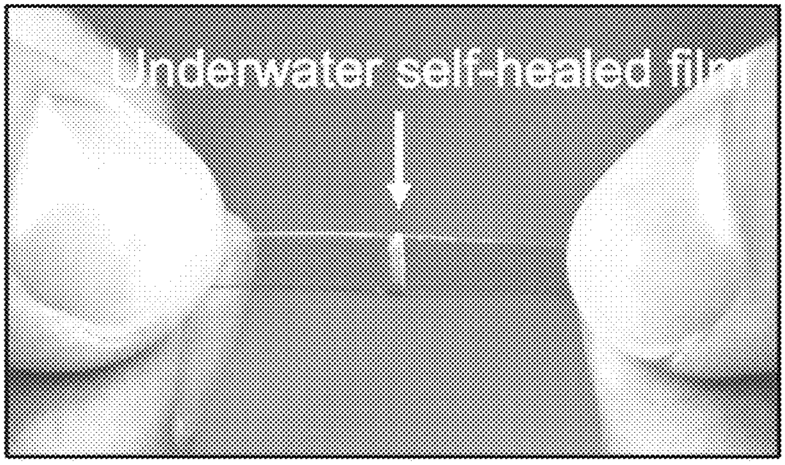
Figure 3L:
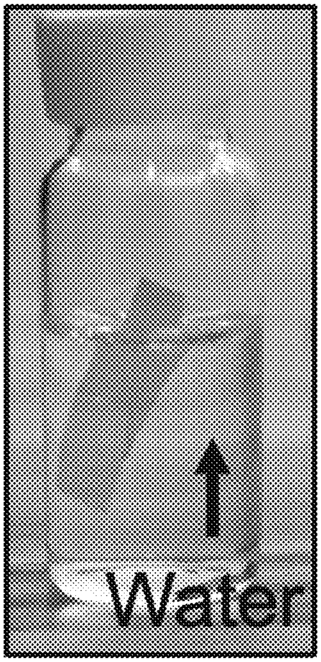
Figure 3M:
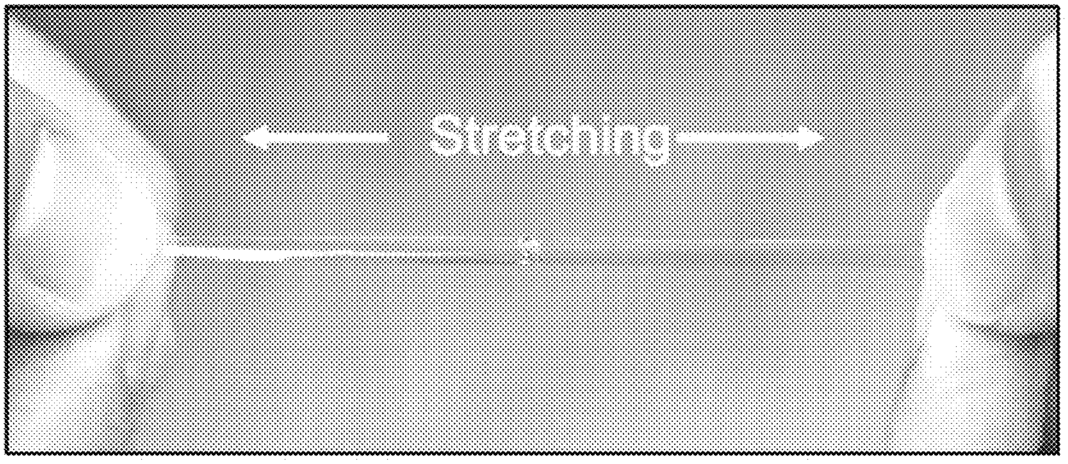
Figure 3N:
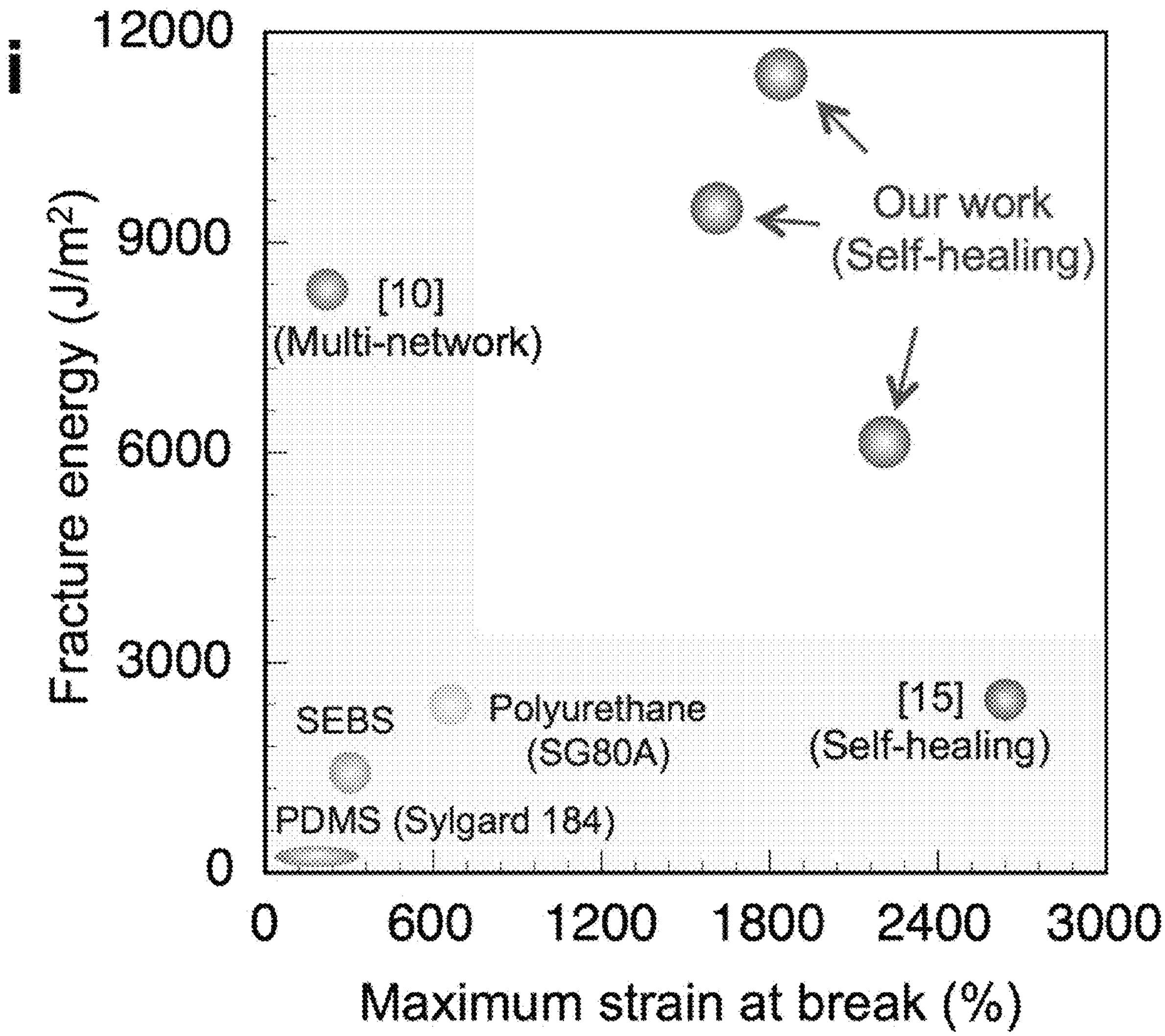

FIGS. 3A-3N illustrate example properties of polymer films formed using the elastomer material, in accordance with various embodiments.

FIGS. 3A-3B illustrate an example of the stretchability of polymer films, in accordance with various embodiments. In specific example embodiments, the polymer films can be stretched to sixteen times its original length at a loading rate of 20 mm/min (200 percent/min) without rupturing. In more specific embodiments, the polymer films can be stretched up to 3,000 percent. Mechanical and self-healing properties of PDMS-MPUx-IU1-x polymer film. For example, FIG. 3A illustrate PDMS-$MPU_{0.2}$-$IU_{0.8}$ polymer film before stretching and FIG. 3B shows stretchability at 3,000 percent stretching in an Instron machine.

FIGS. 3C-3D illustrate different stress-strain curves of the films prepared with PDMS-MPU (blue), PDMS-IU (orange) and PDMS-$MPU_{0.4}$-$IU_{0.6}$ (red) with a sample width of 5 mm, thickness of 0.4-0.5 mm and length of 10 mm at a loading rate of 20 mm $min^{-1}$. Stress-strain curves of the films prepared with PDMS-$MPU_{0.2}$-$IU_{0.8}$ (blue), PDMS-$MPU_{0.3}$-$IU_{0.7}$ (orange) and PDMS-$MPU_{0.4}$-$IU_{0.6}$ (red) with a sample width of 5 mm, thickness of 0.4-0.5 mm, length of 10 mm and loading rate of 20 mm $min^{-1}$. As illustrated, the Young's modulus of the PDMS-MPU film can be measured to be 0.98 MPa from its low-strain region and its strain at break is 750 percent. In contrast, PDMS-IU film is not elastic and can undergo continuous plastic deformation upon applied strain. Further, as described above, the polymer films can be stretched up to 3,000 percent.

The mechanical properties of PDMS-MPU-IU can depend on the ratio of the different crosslinked units or types of moieties, such as the MPU and IU units. In various experimental embodiments, when the ratio of MPU units in the polymer is decreased, the fracture strain of the polymer film is increased, and the Young's modulus and fracture energy are decreased (see FIGS. 3C-3D, as well as Table 1 below). In various related and experimental embodiments, a comparison of the polymer films illustrated by FIG. 1B can be made. For example:

TABLE 1

| | Young's modulus $(MPa)_a$ | Strain at break $(\%)_a$ | Fracture energy $(J/m_2)_b$ | Self-healing Efficiency (%) after 48 $h_c$ |
|---|---|---|---|---|
| PDMS-IU | 0.12 ± 0.03 | NA | NA | NA |
| PDMS-MPU | 0.98 ± 0.13 | 728 ± 104 | 1331 ± 130 | 17 ± 5 |
| PDMS-$MPU_{0.3}$-$IU_{0.7}$ | 0.43 ± 0.08 | 2182 ± 180 | 5730 ± 190 | 86 ± 8 |
| PDMS-$MPU_{0.4}$-$IU_{0.6a}$ | 0.62 ± 0.06 | 1735 ± 107 | 11480 ± 710 | 72 ± 12 |
| PDMS-$MPU_{0.5}$-$IU_{0.5}$ | 0.71 ± 0.11 | 1475 ± 129 | 8803 ± 380 | 41 ± 11 |
| PDMS (Sylgard 184) | 0.41 ± 0.10 | 170 ± 15 | 84 ± 12 | NA |
| Polyurethane (SG80A) | 1.73 ± 0.13 | 710 ± 30 | 2280 ± 410 | NA |
| SEBS | 3.83 ± 0.31 | 330 ± 20 | 1360 ± 200 | NA |

For above described table, the sample size is 5 mm (width), 10 mm (gauge length) and 0.4-0.5 (thickness); Stretching speed: 50 mm/min. For b the sample size is 40 mm (width), 5 mm (gauge length) and 0.4-0.5 (thickness); 20 mm single-edge notch; Stretching speed: 50 mm/min. Self-healing experiments are done at ambient temperature on Teflon substrate. Error bars show standard deviation; sample size n=5. Mechanical properties of PDMS (Sylgard 184), Polyurethane (SG80A) and SEBS are characterized as well. Thermoplastic polyurethane (SG80A) and SEBS films are prepared on OTS-treated substrate from chloroform solution and toluene solution, respectively.

The Young's modulus of the PDMS-MPU film can be measured to be 0.98 MPa from its low-strain region and its strain at break is 750 percent (see, e.g., FIG. 3C and Table 1). In contrast, PDMS-IU film is not elastic and can undergo continuous plastic deformation upon applied strain (see, e.g., FIGS. 3C-3D and Table 1). The MPU units are able to form quadruple hydrogen bonding in a cooperative manner with counter MPU units whereas the IU units can only form maximum dual hydrogen bonding with another IU unit due to the steric hindrance from the isophorone moieties (see, e.g., FIGS. 3E-3F and as further illustrated by FIG. 1C). The multivalent effect hence results in MPU-MPU interaction being much stronger than IU-IU interaction, such that the MPU-MPU crosslinking can better hold the elastomer together to impart elasticity. As may be appreciated, embodiments are not limited to hydrogen bonding, to two different types of moieties and/or to moieties that exhibit four dynamic bonds and two dynamic bonds. The polymer backbones, in accordance with the various embodiments and variations described herein, have two (or more) different moieties. At least two of the different moieties exhibit different strength dynamic bonding, one of which is easier to break.

FIGS. 3E-3F illustrate an experimental example of the notch insensitivity of the polymer film. For example, FIG. 3E illustrates a notched-PDMS-$MPU_{0.4}$-$IU_{0.6}$ polymer film before stretching and FIG. 3F illustrates after 1,200 percent stretching in an Instron machine showing that the film is notch-insensitive.

The polymer films, surprisingly, are able to achieve notch-insensitive stretching up to 1,200 percent strain, demonstrating their toughness. Other previously formed and typical PDMS substrates rupture at less than 200 percent strain (see, Table 1). The MPU units are able to form quadruple hydrogen bonding in a cooperative manner with counter MPU units whereas the IU units can only form maximum dual hydrogen bonding with another IU unit due to the steric hindrance from the isophorone moieties (as further illustrated by FIG. 1C).

FIG. 3G illustrates the fracture energy of the polymer film with the notch as illustrated by FIGS. 3E-3F. More specifically FIG. 3G illustrates the fracture energy as a function of molar ratio of MPU and IU units in polymer (PDMS-MPUx-IU1-x., blue) and blended film (PDMS-MPU and PDMS-IU, red). Moreover, since the MPU and IU units are covalently linked by flexible PDMS, the above process can synergistically take place.

FIG. 3H illustrates example stress-strain curves of a polymer film healed at room temperature (r.t.) for different lengths of time showing an increase of the stretching ability when the film is allowed to heal for longer. In specific embodiments, the healed polymer film is again stretched to 1,500 percent after 48 hours with self-healing efficiency of 78 percent.

FIGS. 3I-3J illustrate an example of a polymer film self-healing at room temperature. More specifically, FIGS. 3I-3J include optical microscope images of damaged and healed PDMS-$MPU_{0.4}$-$IU_{0.6}$ film showing disappearance of the scar after healing at 20° C. for 3 days. As illustrated, the scar on a cut polymer film (PDMS-$MPU_{0.4}$-$IU_{0.6}$) almost disappears after healing at room temperature for three days FIGS. 3K-3M illustrate an example of a polymer film self-healing in the presence of water. Self-healing of THE PDMS-$MPU_{0.4}$-$IU_{0.6}$ film can even take place under water. A PDMS-$MPU_{0.4}$-$IU_{0.6}$ film can be bisected to two pieces, stained by pink and blue ink from color pen, respectively and as illustrated by FIG. 3K, and put together under water for self-healing, as illustrated by FIG. 3L. After 24 hours, the polymer film is stretched as illustrated by FIG. 3M. In specific experimental embodiments, when the severed polymer films is healed in water for 24 hours, the resulting film can be stretched up to 1,100 percent strain.

FIG. 3N illustrates an example comparison of the polymer material to other types of material. As illustrated, the polymer films exhibits notch-insensitive stretching and a high fracture energy (around 12,000 J/m2) among reported intrinsically tough materials as well as self-healing polymers.

A number of embodiments are directed to a polymer films formed of a flexible polymer backbone (with low transition temperature) having a particular ratio of a first moieties (e.g., provide strong dynamic bonding) and a second moieties (e.g., weak bonding) that has a lower crosslink dynamic bonding strength than the first moieties. The polymer backbone can include PDMS, PEO, PFPE, PB, poly(ethylene-co-1-butylene), poly(butadiene), hydrogenated poly(butadiene), polybutylene, poly(ethylene oxide)-poly(propylene oxide) block copolymer or random copolymer, and poly (hydroxyalkanoate), among other types of flexible polymer backbones. The resulting polymer film can be stretchable, self-healable, and mechanically tough. For example, the polymer film can exhibit a Young's modulus that is tunable from 0.1 MPa to 3.0 MPa (and in specific embodiments, from 0.1 to 1.5 MPa). The stretching range of the polymer film when un-notched can have a strain at break of up to 3,000 percent (which is also the fracture strain) and when notched can have a strain at break of up to 2,000 percent.

The fracture energy can be up to 15,000 $J/m^2$. In some embodiments, the first moieties can provide a number of dynamic bonds resulting from interactions between the first moieties and that have a crosslinking strength that is at least two times higher than a crosslinking strength of the second moieties. For example, the strength of MPU-MPU is at least two times higher than that of IU-IU since MPU-MPU has two more H-bonds than IU-IU. The transmittance of the polymer film can be at least (or around) 98 percent in the range of 400 nm-1000 nm. The self-healing efficiency of the polymer film can depend on healing temperature and time. At 25° C., as an example, self-healing efficiency can be reached to 75 percent after 48 hours. At 60° C., self-healing efficiency can be reached to almost 100 percent after 6 hours.

Experimental/More Detailed Embodiments

Various embodiments are directed to a supramolecular stretchable, tough and self-healable polymer film, constructed via a mixture of strong and weak crosslinking dynamic bonds. The resulting polymer possesses a combination of exceptional mechanical properties, e.g., stretchability, toughness and autonomous self-healability in water. This unique combination of properties enables fabrication of a variety of 2D and 3D structures, capacitive strain sensing e-skin and stretchable modular electronic systems with high toughness, stretchability and robustness against damage. The molecular design is simple and is applicable to various polymer structures.

In various specific experimental embodiments, the PDMS-MPUx-IU1-x polymer films can be formed by dissolving 3-5 grams (g) of PDMS-MPUx-IU1-x in 15 mL-20 mL $CHCl_3$ and stirred at 50° C. Resultant viscous solution are stirred for more than three hours and ware subsequently gradually cooled down to room temperature. The resultant solution is poured onto OTS-treated silicon substrates (e.g., four inches) and dried at room temperature for six hours followed by drying at 80° C. under reduced pressure (about 100 torr) for three hours. Polymer films are then peeled off after cutting in certain dimensions and ready for mechanical testing.

The resulting polymer films can be tested to identify various properties of the films. Mechanical tensile-stress experiments can be performed using an Instron 5565 instrument. At least three samples are tested for each type of polymer film. Tensile experiments are performed at ambient conditions with samples with width of five mm, thickness of around 0.5 mm, length of ten mm and controlled strain-rate of twenty mm/mm. For determination of fracture energy, the procedures of pure-shear test is described by Ducrot, E. et al., "Toughening elastomers with sacrificial bonds and watching them break," Science 344, 186-189 (2014) and Sun, J. Y. et al., "Highly stretchable and tough hydrogels," Nature 489, 133-136 (2012), each of which are incorporated herein in their entirety for their teachings. A sample with a length of five mm, a thickness of 0.5 mm, and a width of forty mm can be used. For a notched sample, a notch of twenty mm length is made in the middle of a strip of film with a strain-rate of fifty mm/mm. For self-healing tests, the polymer films are cut into two pieces and then the cut surfaces are put in contact. The polymer films are then healed at room temperatures for different periods. The healed polymer films are then stretched. The healing efficiency can be defined as the ratio of strain at break between healed film and original film. Values of the Young's modulus, maximum strain at break, and healing efficiencies are determined according to data of at least three trials.

For various experimental and more detail embodiments, Bis(3-aminopropyl) terminated poly(dimethylsiloxane) ($H_2N$-PDMS-$NH_2$, Mn=5000-7000) is purchased from Gelest. The remaining chemicals and solvents are purchased from Sigma-Aldrich. All chemicals used as received without further purification. NMR ($^1H$ and $^{13}C$) spectra can be recorded on a Varian Mercury 400 NMR spectrometer in deuterated solvents at room temperature. Infrared spectra are recorded with a Horiba Jobin-Yvon Fluorolog-3 fluorometer. Absorption spectra were recorded on an Agilent Cary 6000i UV/Vis/NIR Spectrophotometer. Analytical gel permeation chromatography (GPC) experiments can be performed on a Malvern VE2001 GPC solvent/sample Module with three ViscoGEL™ IMBHMW-3078 columns. The calibration can be based on polystyrene standards with narrow molecular weight distribution. Differential Scanning Calorimetry (DSC) experiments are performed using a Model Q2000 from TA Instruments. The temperature range can be −90 to 150° C., at a heating and cooling speed of 10° C./min. Dynamic mechanical analysis measurement is carried out on dynamic mechanical Analyzer TA Instrument Q800 (strain rate of 0.01 mm/mm; frequency sweeps at 0.1-10 Hz; Temperature: −90-10° C.). Viscosity measurements can be carried out on an Ares G2 rheometer with an Advanced Peltier System (APS) as the bottom plate and a 40 mm cone as the top geometry. The shear rate sweep is performed from 1 l/s to 1000 l/s. All solutions are Newtonian. The chips for modular electronics are ordered from Mouser electronics.

In specific experimental embodiments, the PDMS-$MPU_{0.4}$-$IU_{0.6}$ polymer can be synthesized by adding $Et_3N$ (10 mL) to a solution of $H_2N$-PDMS-$NH_2$ (100 g, Mn=5000-7000, 1 eq) in anhydrous $CHCl_3$ (400 mL) at 0° C. under argon atmosphere. After stirring for 1 hour, a mixture solution ($CHCl_3$) of 4,4'-Methylenebis(phenyl isocyanate) (2.0 g, 0.4 eq) and Isophorone diisocyanate (2.7 g, 0.6 eq.) is added dropwise. The resulting mixture is stirred for 1 hour while the temperature is kept at 0° C. with ice water. The solution is then allowed to warm to room temperature and stirred for 4 days. After reaction, MeOH (15 mL) is added for complete removal of remained isocyanate and stirred for 30 minutes. Then, solution is concentrated to ½ of its volume and 60 mL MeOH is poured into it to precipitate. White precipitate-like viscous liquid appeared and the mixture is settled for 30 minutes. The upper clear solution is then decanted. 100 mL $CHCl_3$ is added to dissolve the product. The dissolution-precipitation-decantation process is repeated for three times and the final product is subjected to vacuum evaporation to remove the solvent and trace of $Et_3N$. A yield of 65 g (63 percent) is obtained with a molecular weight according to GPC of: Mw=103,400; Mn=65,000 (Đ=1.6)$^1H$ NMR (400 MHz, d5-THF): δ 7.33 (d, J=8.0 Hz, 4H), 6.97 (d, J=8.0 Hz, 4H), 3.77 (s, 2H), 0.01 (b, 1325H). $^{13}C$ NMR (400 MHz, $CDCl_3$): δ 158.78, 139.18, 137.31, 125.34.

As previously discussed and illustrated by FIG. 1B, PDMS-MPU, PDMS-IU, PDMS-$MPU_{0.2}$-$IU_{0.6}$, PDMS-$MPU_{0.3}$-$IU_{0.7}$, and PDMS-$MPU_{0.5}$-$IU_{0.5}$ are synthesized using different mixing molar ratio of 4,4'-Methylenebis (phenylisocyanate) and Isophorone diisocyanate according to the same procedure as that used for PDMS-$MPU_{0.4}$-$IU_{0.6}$. For PDMS-MPUx-IU1-x, mixture of 4,4'-Methylenebis (phenyl isocyanate) (x eq) and Isophorone diisocyanate (1-x eq.) is used.

For PDMS-MPU, in various experimental embodiments, resulting molecular weight according to GPC includes: Mw=99,000; Mn=71,000 (Đ=1.4)$^1H$ NMR (400 MHz, d5-THF): δ 7.33 (d, J=8.0 Hz, 4H), 6.97 (d, J=8.0 Hz, 4H), 3.77 (s, 2H), 0.01 (b, 520H). For PDMS-IU resulting molecular weight according to GPC include: Mw=123,000; Mn=68,000 (Đ=1.8)$^1$H NMR (400 MHz, $CDCl_3$): δ 7.15 (b, 2H), 6.91 (b, J=8.0 Hz, 2H), 3.48 (d, J=9 Hz, 4H), 1.71 (m, 4H), 0.63 (d, J=9 Hz, 4H), 0.01 (b, 545H). For PDMS-MPU0.2-IU0.8 resulting molecular weight according to GPC include: Mw=112,000; Mn=84,000 (Đ=1.3) $^1$H NMR (400 MHz, d5-THF): δ 7.33 (d, J=8.0 Hz, 4H), 6.97 (d, J=8.0 Hz, 4H), 3.77 (s, 2H), 0.01 (b, 2531H). For PDMS-MPU0.3-IU0.7 resulting molecular weight according to GPC includes: Mw=116,000; Mn=73,000 (Đ=1.6)$^1$H NMR (400 MHz, d5-THF): δ 7.33 (d, J=8.0 Hz, 4H), 6.97 (d, J=8.0 Hz, 4H), 3.77 (s, 2H), 0.01 (b, 1633H). For PDMS-$MPU_{0.5}$-$IU_{0.5}$ resulting molecular weight according to GPC includes: Mw=99,000; Mn=69,000 (Đ=1.4)$^1$H NMR (400 MHz, d5-THF): δ 7.33 (d, J=8.0 Hz, 4H), 6.97 (d, J=8.0 Hz, 4H), 3.77 (s, 2H), 0.01 (b, 1011H).

Figure 4A:
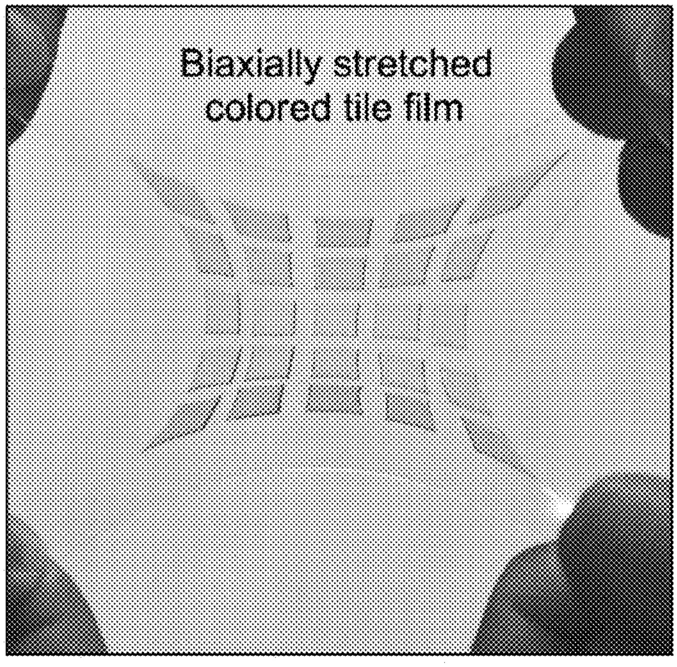
FIGS. 4A-4O illustrate example properties of films formed using the elastomer material, in accordance with various embodiments.
Figure 4B:
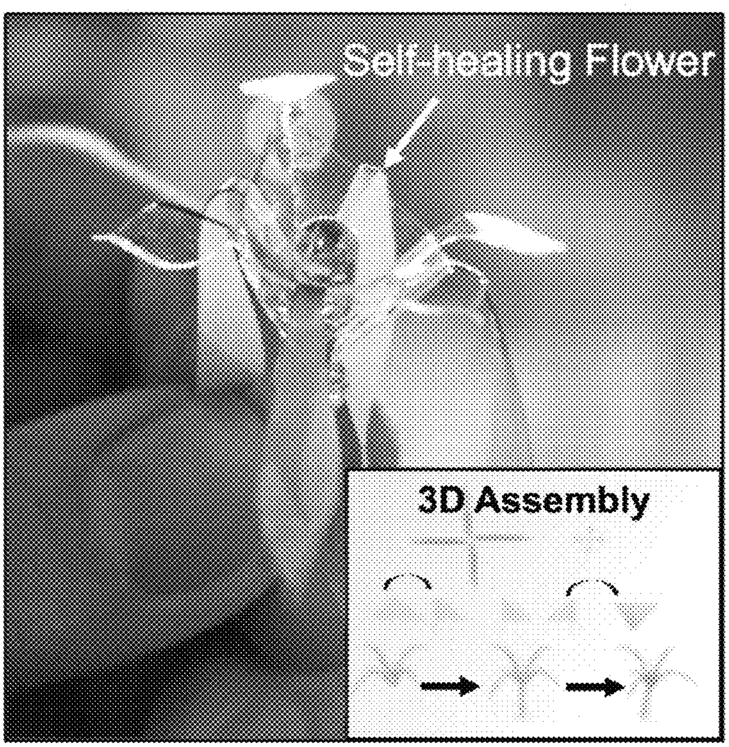
Figure 4C:
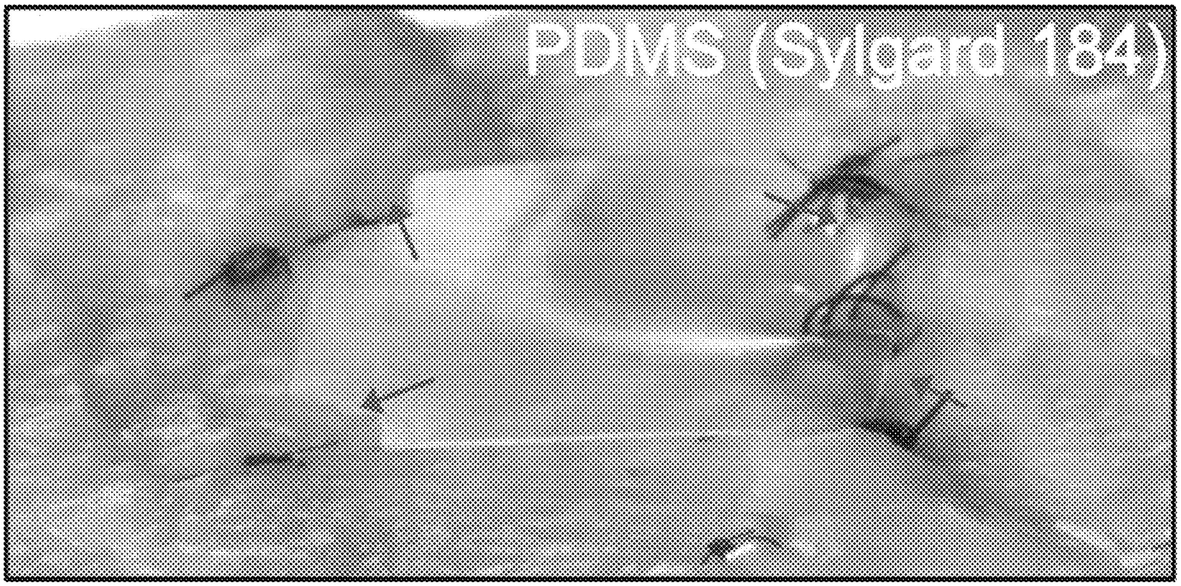
Figure 4D:
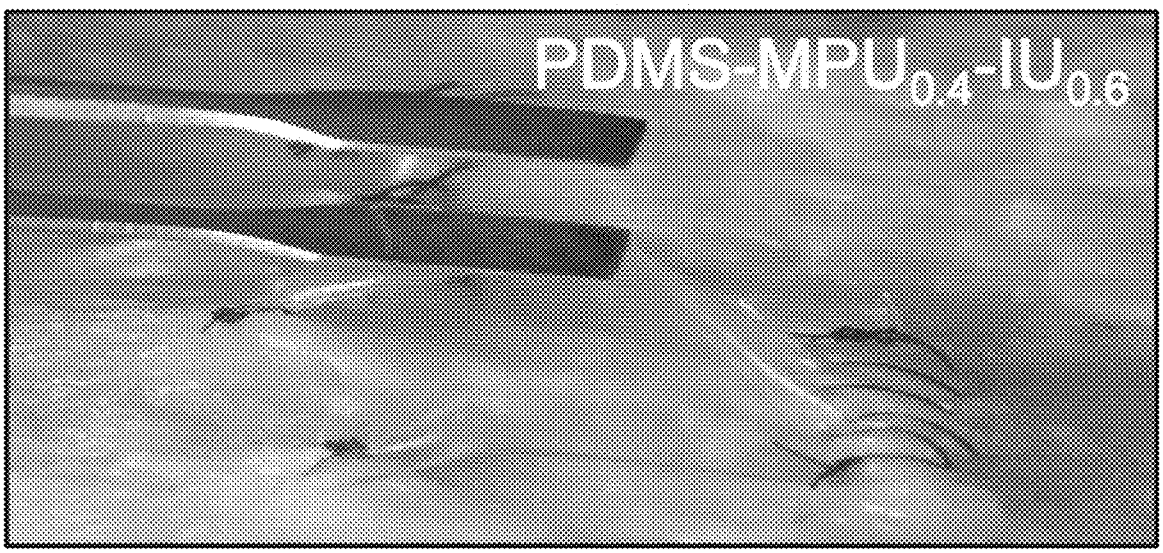
Figure 4E:
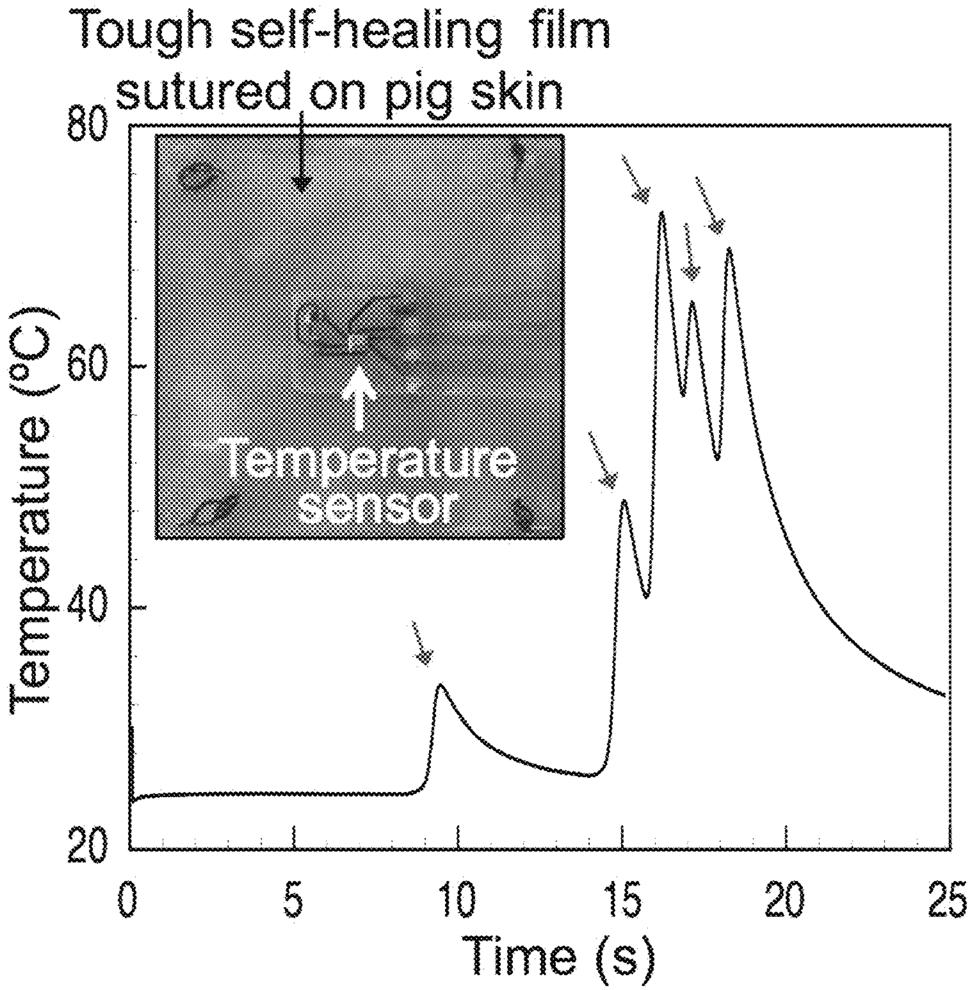
Figure 4F:
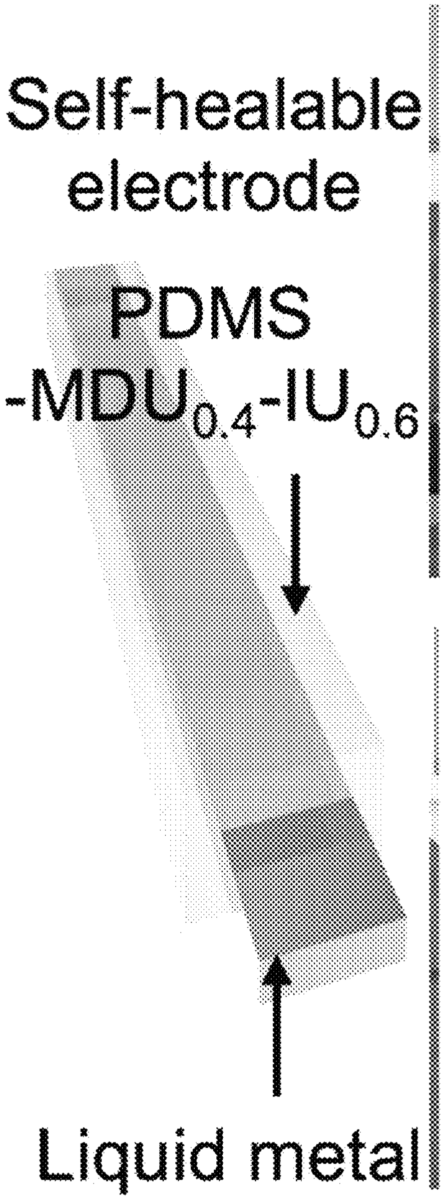
Figure 4G:
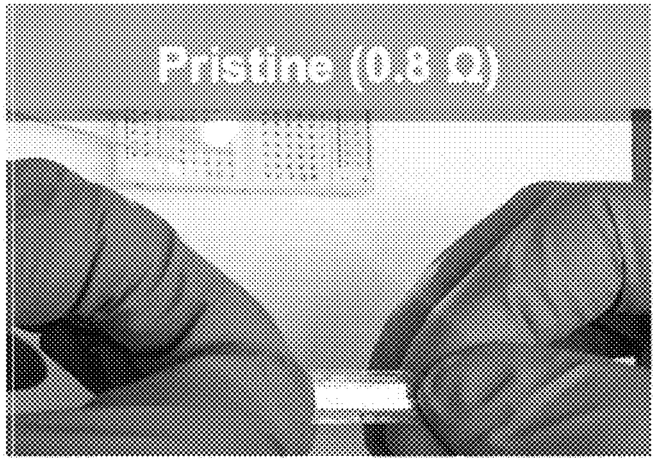
Figure 4H:
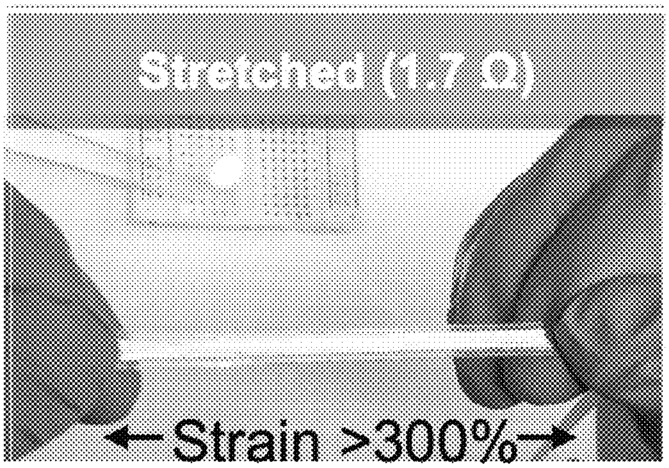
Figure 4I:
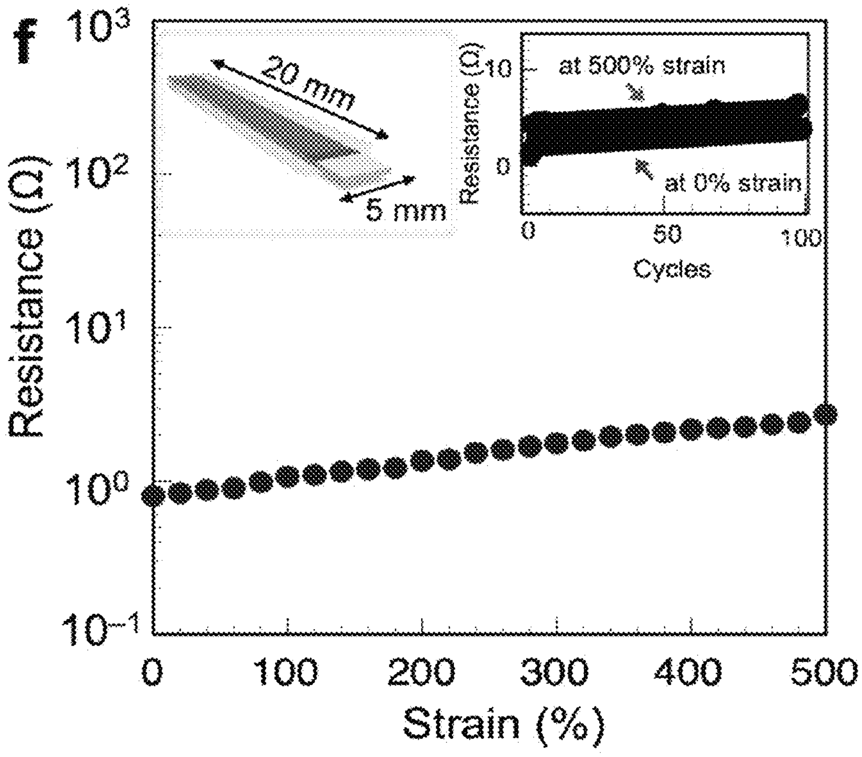
Figure 4J:
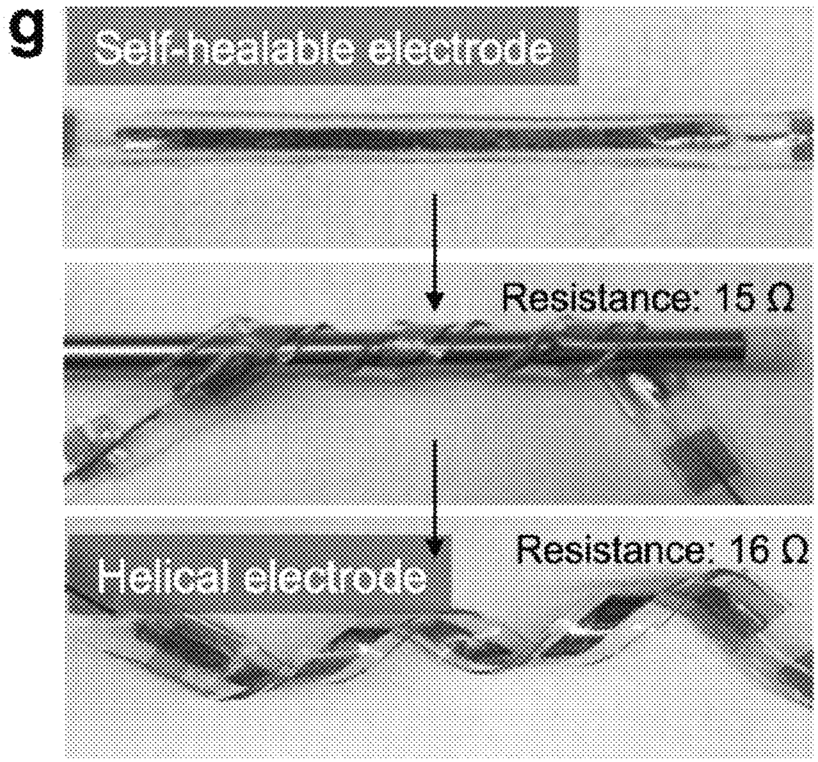
Figure 4K:
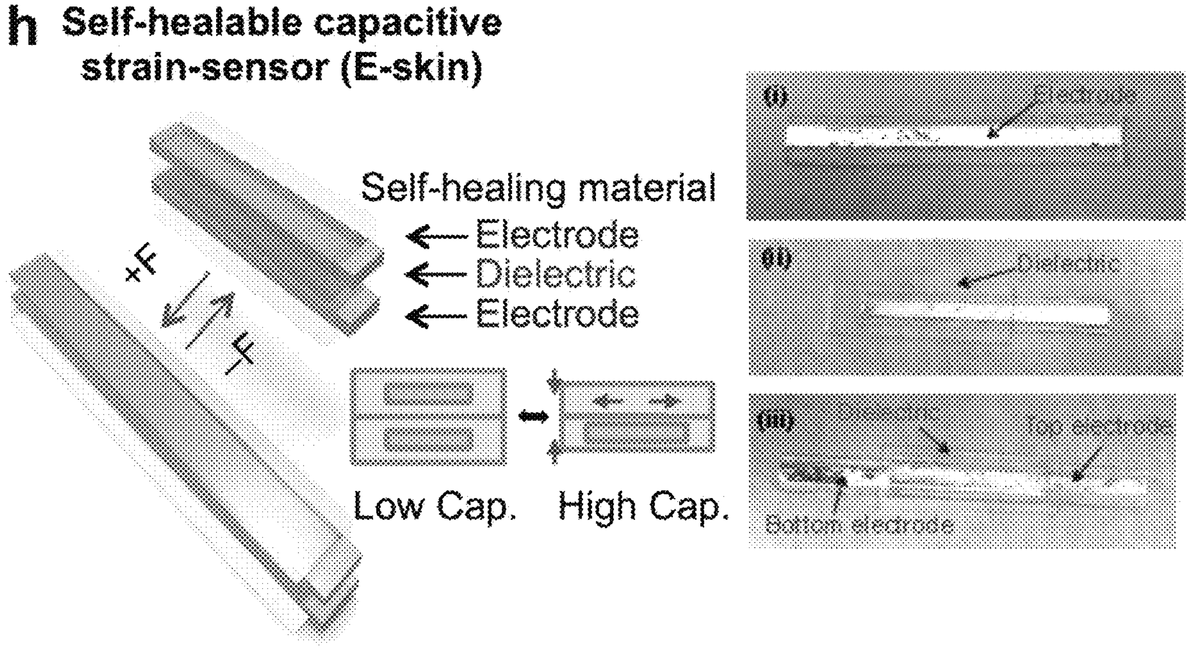
Figure 4L:
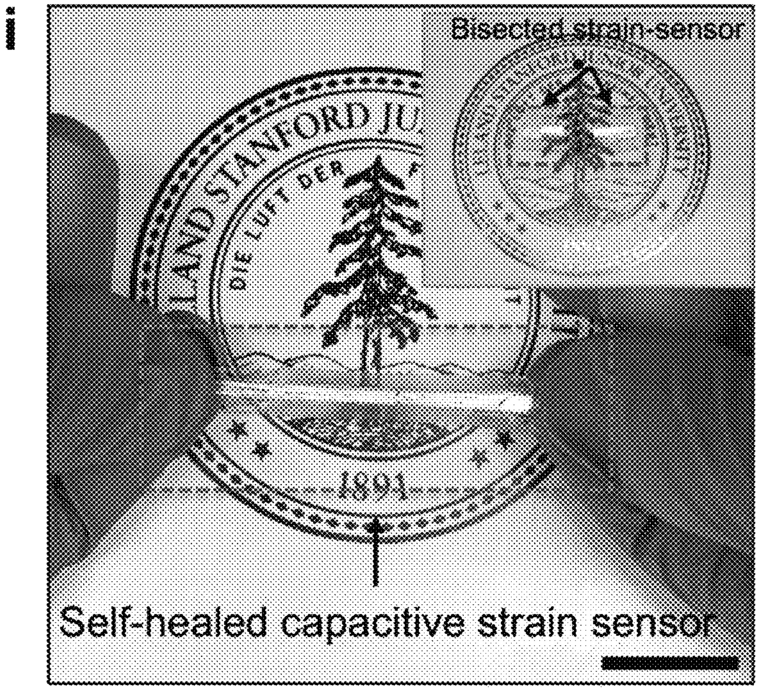
Figure 4M:
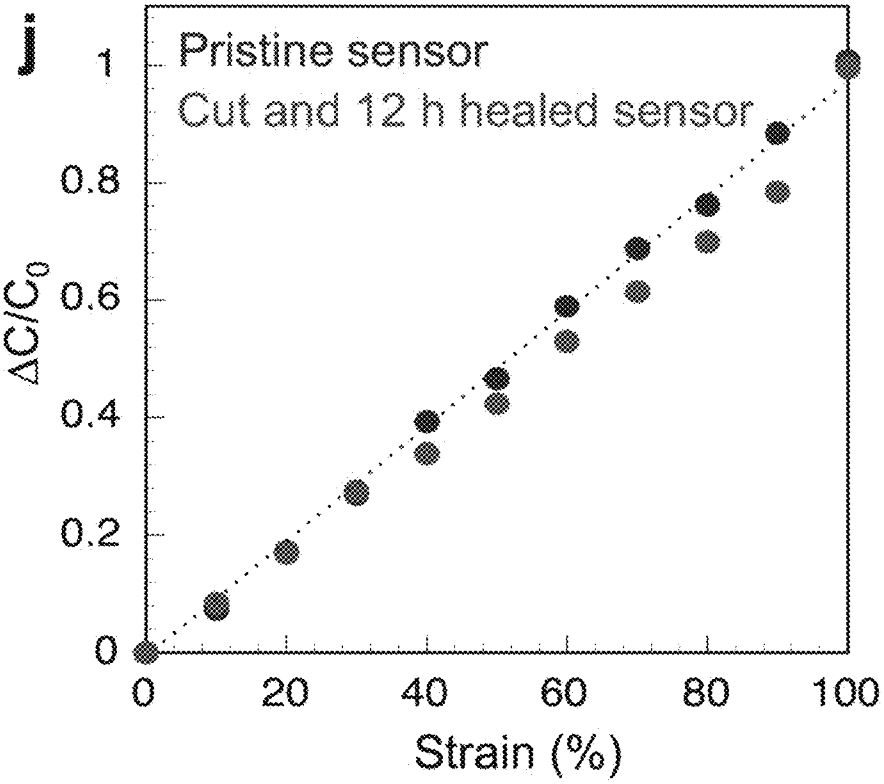
Figure 4N:
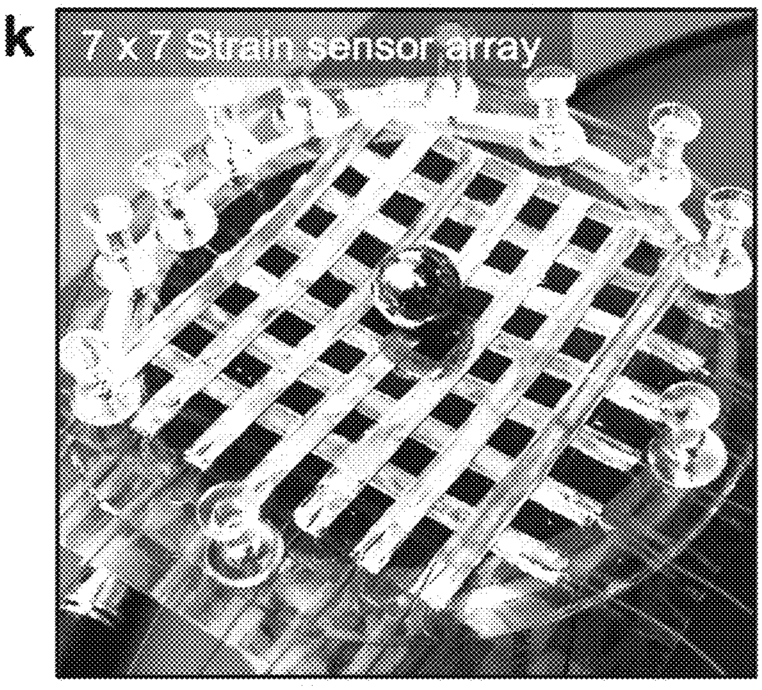
Figure 4O:
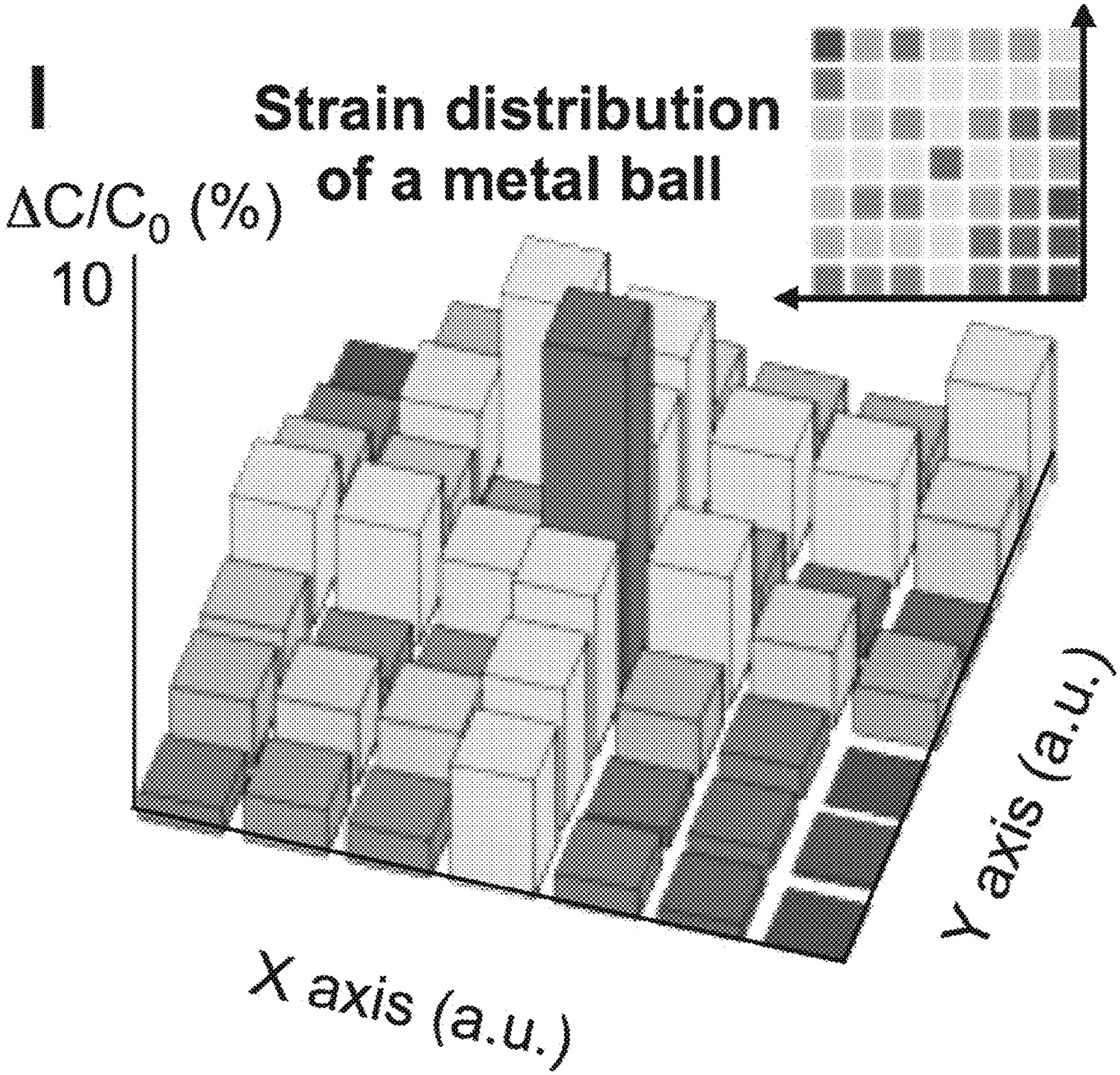

FIGS. 4A-4O illustrate example properties of films formed using the elastomer material, in accordance with various embodiments.

FIG. 4A illustrates an example of a film formed of different colored tiles, as further described herein in connection with FIGS. 14A-14F. PDMS-$MPU_{0.4}$-$IU_{0.6}$ blocks can be readily attached to PDMS-$MPU_{0.4}$-$IU_{0.6}$ substrate with a robust interface even under (large) applied biaxial strain. To generate a self-healing thermoplastic elastomer for a self-healable electronic skin, in accordance with an experimental embodiment, twenty-five pieces of film blocks are prepared with five different colors. The blocks are attached to a PDMS-$MPU_{0.4}$-IU0.6 film substrate and allowed to bond at room temperature for 6 hours with a gently applied pressure. The resulting patterned film is biaxially stretched without any delamination.

FIG. 4B illustrates an example of a 3D structure formed using the elastomer material, in accordance with various embodiments. More specifically, FIG. 4B is an optical image of a flower made by bonding various pieces at 50° C. with a green LED (left) and schematic illustration of 3D assembly for flower (inset). The leaves were stained by alkylated-DPP dye.

FIGS. 4C-4D illustrate examples of the ability to suture the self-healing polymer film onto animal skin surfaces without rupturing the polymer film, in accordance with various embodiments. For example, FIG. 4C illustrates an optical image of suturing test of PDMS Sylgard 184 on a pig inner skin and FIG. 4D illustrates an optical image of suturing PDMS-$MPU_{0.4}$-$IU_{0.6}$ film on pig inner skin. Red arrows indicated rupture of PDMS due to its poor fracture toughness while the exceptional toughness of PDMS-$MPU_{0.4}$-$IU_{0.6}$ results in successful sutures that are robust and stable even under stretching.

FIG. 4E illustrates an example of the self-healing polymer film sutured on the surface of pig skin, in accordance with various embodiments. The polymer can be used to form various electronics. For example, sensing circuitry, such as a temperature senor, strain sensor, capacitance sensor and other types of sensor can be formed using the polymer film. FIG. 4E illustrates a temperature sensor formed using the self-healing polymer film and that is then sutured on a surface of pig skin. Temperature changes can be induced by a heat gun in experimental embodiments. Combing with its self-healing property in water, this material is especially useful as a substrate for attaching electronics onto soft surfaces.

FIGS. 4F-4H illustrate an example of a self-healable electrode formed using the elastomer material, in accordance with various embodiments. For example, FIG. 4F is a schematic illustration of self-healing electrode. FIG. 4G illustrates an optical image of self-healing electrode equipped with an LED lamp before stretching and FIG. 4H illustrates an optical image of the self-healing electrode after stretching.

Taking advantage of these features, various experiment embodiments include the fabrication of stretchable and autonomous self-healing electrodes with liquid metal EGaIn as a conductive layer and PDMS-$MPU_{0.4}$-$IU_{0.6}$ as the encapsulation and supporting layer EGaIn can be used for fabricating stretchable and self-healing electrodes. Encapsulation of EGaIn in PDMS as a layer form is challenging due to poor wetting of the polar EGaIn liquid on the highly hydrophobic PDMS surface. In contrast, EGaIn exhibits good wetting properties on PDMS-$MPU_{0.4}$-$IU_{0.6}$ films, which is believed to be due to the interactions between urea groups and native oxide layer (see, e.g., FIGS. 15A-15B, 16, and 17A-17B). This electrode exhibits high stretchability (e.g., at least 500 percent) with stable (e.g., at least 100 cycles) and low resistance (see, e.g., FIGS. 4G-4I). Importantly, this electrode is self-healable, i.e. can be repeatedly connected after cutting, at room-temperature.

The self-healing electrode can be fabricated by taking advantage of the moldable feature of the polymer at high temperature and its bonding property. A wafer-sized polymer film with 0.8 mm thickness on OTS-treated silicon substrate is prepared. The polymer film on substrate is pressed by Teflon mold at 80° C. and allowed to rest for two hours. Then, after removing the Teflon mold, successful patterns with periodic polymer walls are confirmed and liquid metal alloy (EGaIn) is bladed onto the pattern by using small piece of polymer film and other polymer film with 0.3 mm thickness is subsequently put on patterned film with liquid metal as an encapsulation layer. The bonding process involves annealing at room temperature for six hours after applying gentle pressure to keep the two pieces in good contact; robust self-healing electrode can be obtained with a stable interface. Gentle pressure, as used herein, can include or refer to around 1 kilopascal (kPa) of pressure and/or a pressure sufficient to make physical contact between two films. The electronic skin is fabricated by sandwiching a dielectric layer with two self-healing electrodes, in which the thickness of the dielectric layer is 330 μm.

In a number of experimental embodiments, the electrode is cut. When the electrode is cut into two pieces and put together for self-healing, the electrical conductivity can recover instantaneously when two broken pieces are put in contact. After nine hours of healing at ambient condition, the electrical and mechanical properties of the self-healed electrode are almost identical to the original one (see, e.g., FIGS. 18A-18D). Furthermore, the electrode can be molded into 3D structures owing to its thermoplastic property (see, e.g., FIG. 4J). Accordingly, various embodiments are directed to an ambient self-healing electrode formed of an elastomer in accordance with the various embodiments. The ambient self-healing electrode exhibits a stretchability of at least 500 percent and can be up to 1,200 percent and low resistance of around 3 ohm, although the electrical resistance can depend on the dimension of the conductive line and can be observed to be a stable and reversible resistance of up to 500 percent (see, e.g., FIG. 4I and FIGS. 18A-18D).

FIG. 4I illustrates an example of electrical resistance as a function of strain with self-healing electrode and electrical resistance under cyclic stretching, in accordance with various embodiments.

FIG. 4J illustrates an example of molding a self-healable electrode, in accordance with various embodiments. For example, the optical images show the possibility to change shape of the self-healing electrode by taking advantage of its thermoplastic property. The self-healing electrode has a flat linear shape (top). It is wrapped around a rod (middle) and is held at this configuration at 50° C. for 30 minutes. After removal of the rod, the electrode maintains the helical shape without the template (bottom).

In other experimental and more detailed embodiments, a fully self-healing e-skin (capacitive strain sensor) is demonstrated which exhibits high resistance to constant mechanical damage and complete room temperature self-healability even after complete cutting (see, e.g., FIGS. 4H, 19A-19C, 20, 21A-21B, and 22A-22C).

FIG. 4K illustrates an example of a self-healable capacitive strain sensor formed using the elastomer material, in accordance with various embodiments. A strain sensor can be fabricated by bonding two self-healing electrodes, as described above in connection with FIGS. 4F-4H. For example, as illustrated by the right side of FIG. 4K, a self-healable capacitive strain sensor can be formed by preparing two electrodes, attaching a dielectric layer to one of the electrodes, and attaching the other electrode as a counter electrode resulting the sandwich structure illustrated by the left side of FIG. 4K. In specific embodiments, the strain sensor is fabricated based on bonding between layers through the stack and annealing at room temperature for at least six hours.

FIG. 4L illustrates an example a self-healing of the capacitive strain sensor illustrated by FIG. 4K, in accordance with various embodiments. More specifically, FIG. 4L includes optical images of the cut strain sensor (inset) and that the healed strain-sensor maintains high stretchability, such as up to 500 percent for sensing that is reversible and stable. By increasing the healing time, the healed strain-sensor can stably operate at up to 400 percent strain.

FIG. 4M illustrates example electrical capabilities of a self-healed sensor as compared to a pristine sensor, in accordance with various embodiments. As illustrated, the capacitance change remains relatively the same when comparing stretching of an original (has not self-healed) sensor and with a healed sensor after damaged (e.g., 9 hours after healing).

Various embodiments include forming an array of strain sensors, as previously described. FIG. 4N illustrates and example of a strain sensor array, in accordance with various embodiments. For example, FIG. 4N illustrates an optical image of a 7×7 strain-sensor array detecting the presence of a metal ball.

FIG. 4O illustrates the strain distribution as illustrated by FIG. 4N, in accordance with various embodiments. More specific, illustrated is a map of the strain distribution based on the change in capacitance by the weight of the metal ball (e.g., around 30 g in weight).

Figure 5A:
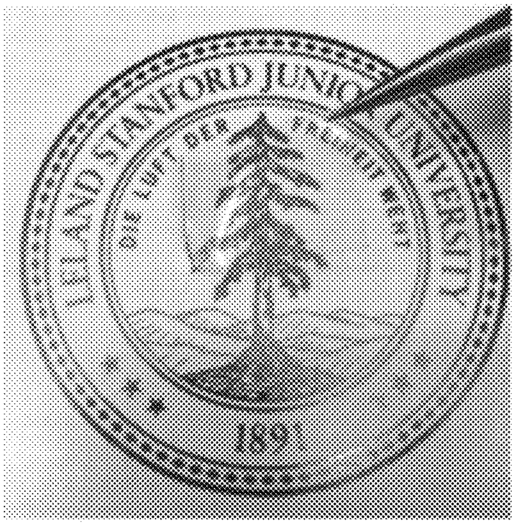
FIGS. 5A-5B illustrate transmittance of an example polymer film, in accordance with various embodiments.
Figure 5B:
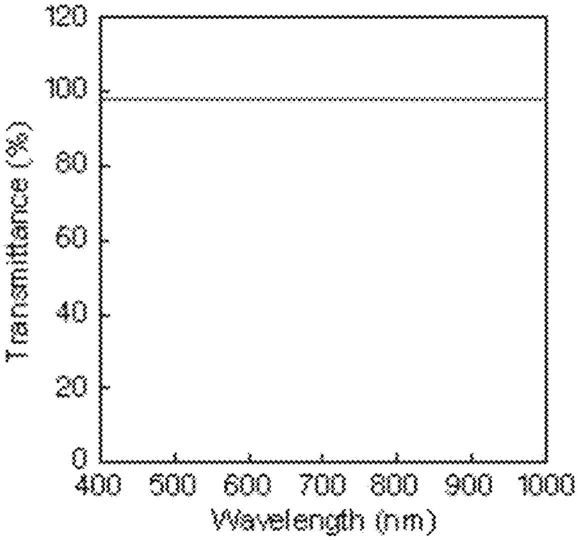

FIGS. 5A-5B illustrate transmittance of an example polymer film, in accordance with various embodiments. FIG. 5A illustrates an optical image of PDMS-$MPU_{0.4}$-$IU_{0.6}$. FIG. 5B illustrates transmittance of the PDMS-$MPU_{0.4}$-$IU_{0.6}$ polymer film illustrated by FIG. 5A in the wavelength range of 400-1000 nm. The example polymer film (e.g., a 0.55 mm thick polymer film) shows a 98 percent average transmittance in the visible range, illustrating that the polymer film is transparent with high optical quality.

Figure 6:
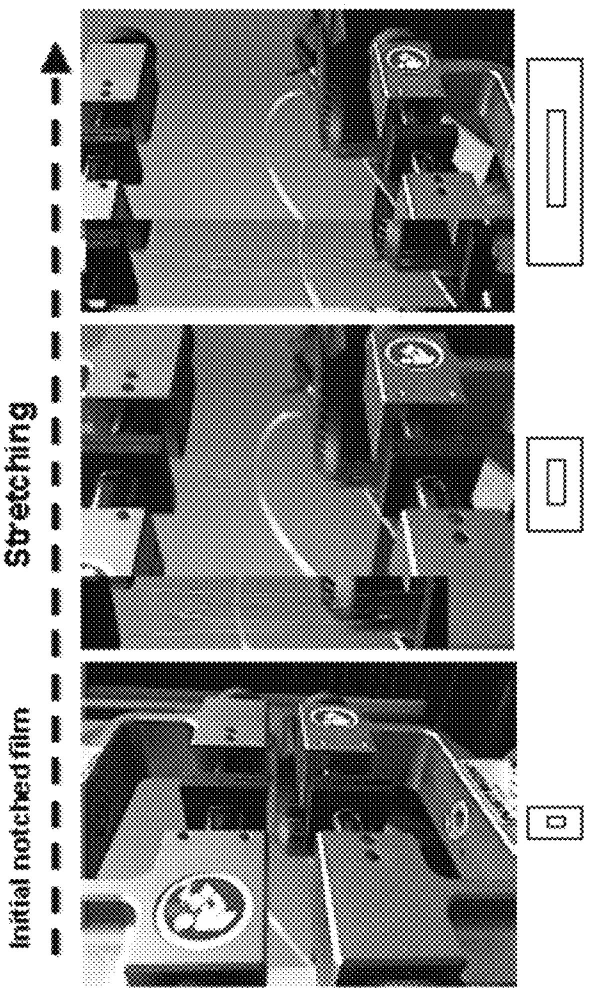
FIG. 6 illustrates an experimental result of testing the notch sensitivity and stretchability of an example polymer film, in accordance with various embodiments.

FIG. 6 illustrates an experimental results of testing the notch sensitivity and stretchability of an example polymer film, in accordance with various embodiments. A notch (5 mm×5 mm) is made in a PDMS-$MPU_{0.4}$-$IU_{0.6}$ polymer film with 0.5 mm thickness, 15 mm length and 15 mm width (left) and the film is stretched at the loading rate of 50 mm/min. The notch is blunted and remain stable (middle and right).

Figure 7A:
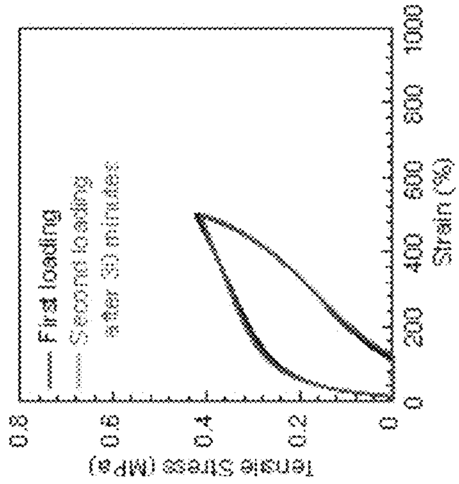
FIGS. 7A-7B illustrate example stress curves of an example polymer film, in accordance with various embodiments.
Figure 7B:
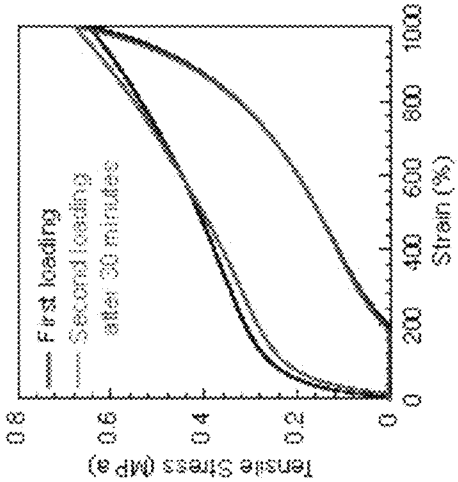

FIGS. 7A-7B illustrate example stress curves of an example polymer film, in accordance with various embodiments. For example, the stress-strain curves illustrated by FIGS. 7A-7B are of a PDMS-$MPU_{0.4}$-$IU_{0.6}$ polymer film under cyclic stress-strain curve (up to 500 percent strain) at first loading (black) and second loading (blue) after 30 minutes rest, as illustrated by FIG. 7A, cyclic stress-strain curve (up to 1,000 percent strain) at first loading (black) and second loading (blue) after 30 minutes rest, as illustrated by FIG. 7B. The polymer film has a thickness of 0.53 mm, length of 10 mm and width of 5 mm is stretched at a loading rate of 50 mm/min.

Figure 8A:
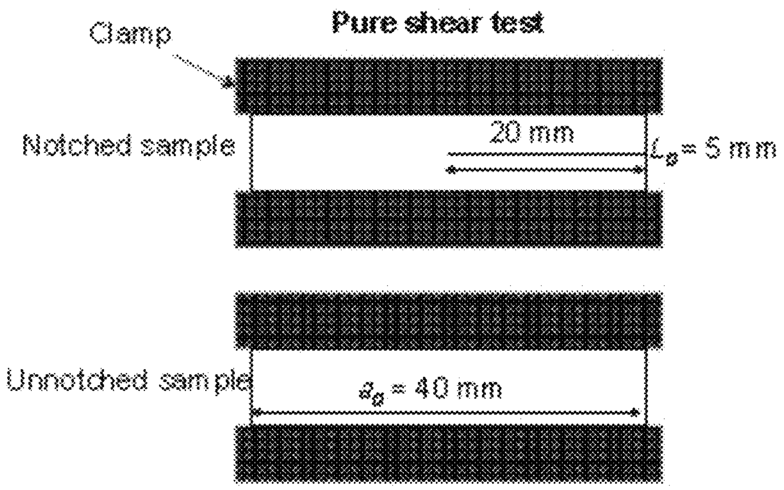
FIGS. 8A-8B illustrate example stress applied to a notched polymer film and unnotched polymer film, in accordance with various embodiments.
Figure 8B:
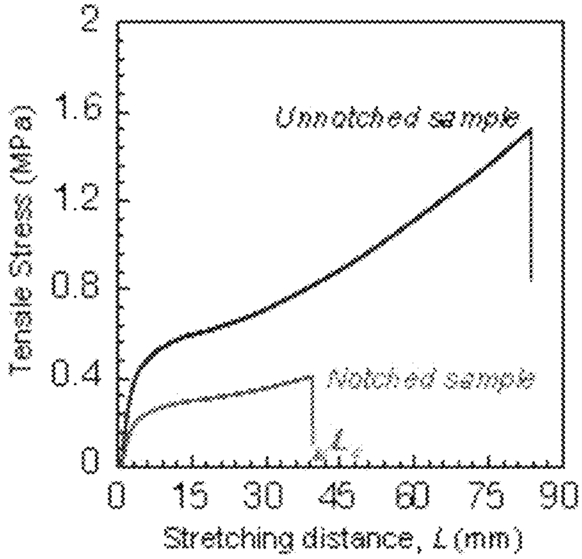

FIGS. 8A-8B illustrate example stress applied to a notched polymer film and unnotched polymer film, in accordance with various embodiments. FIG. 8A illustrates the geometry of unnotched and notched samples for pure shear test. The sample thickness can be $b_0$=0.52 mm. FIG. 8B illustrates the resulting tress-extension curves of the unnotched and notched PDMS-$MPU_{0.4}$-$IU_{0.6}$ polymer film. The fracture energy is calculated as $U(L_c)/(a_0 \times b_0)$. $L_c$ is the distance between the clamps when crack starts to propagate.

Figure 9A:
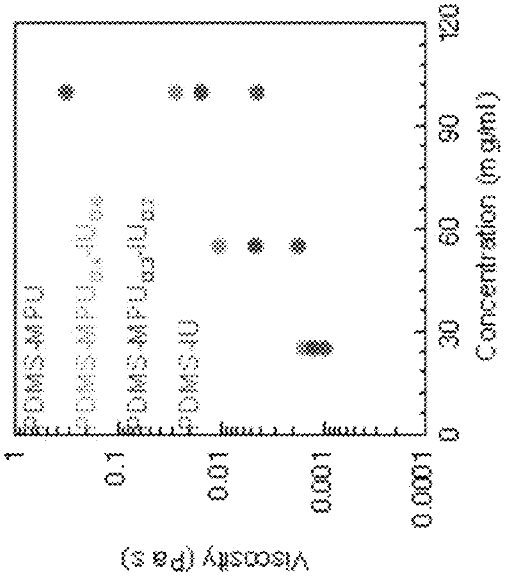
FIGS. 9A-9B illustrate example viscosity of polymer films, in accordance with various embodiments.
Figure 9B:
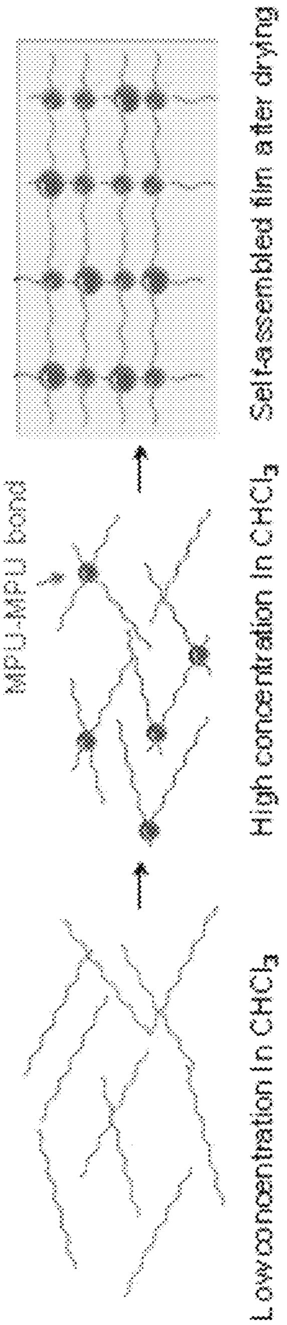

FIGS. 9A-9B illustrate example viscosity of polymer films, in accordance with various embodiments. For example, FIG. 9A illustrates viscosity measurements of PDMS-MPU, PDMS-$MPU_{0.4}$-$IU_{0.6}$, PDMS-$MPU_{0.3}$-$IU_{0.7}$ and PDMS-IU with various concentrations in $CHCl_3$. As the MPU portion increases in the polymer, viscosity of samples increases because of formation of MPU-MPU bond in solution. Concentration dependency shows non-linearity in viscosity. FIG. 9B is a schematic illustration of the self-assembly process of PDMS-MPU-IU from solution to solid state.

Figure 10A:
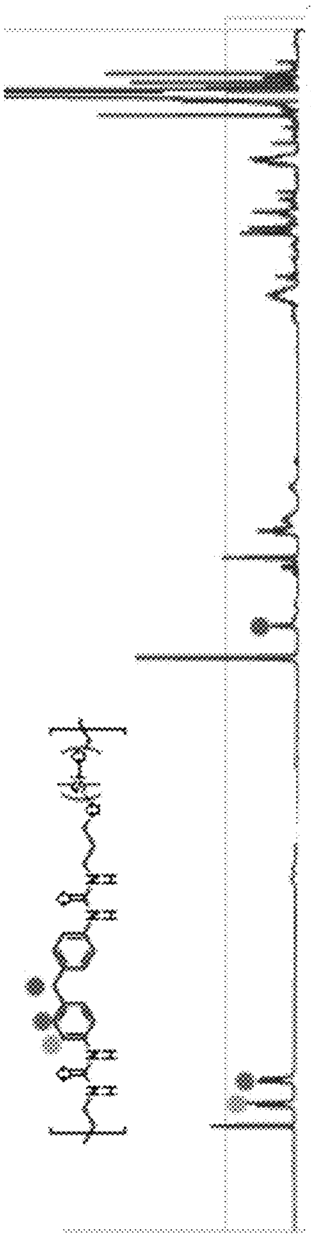
FIGS. 10A-10E illustrate example spectrometry results of various polymer films, in accordance with various embodiments.
Figure 10B:
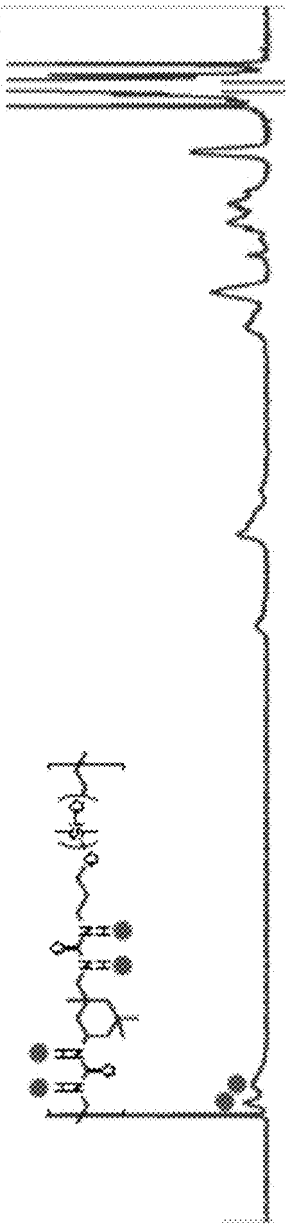
Figure 10C:
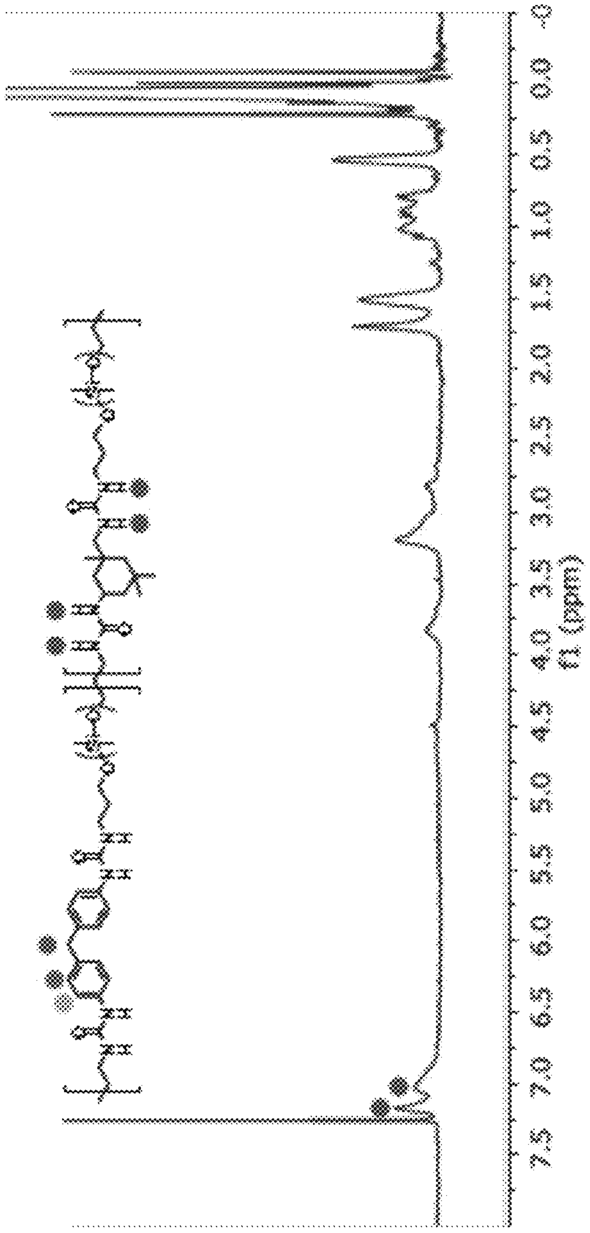
Figure 10D:
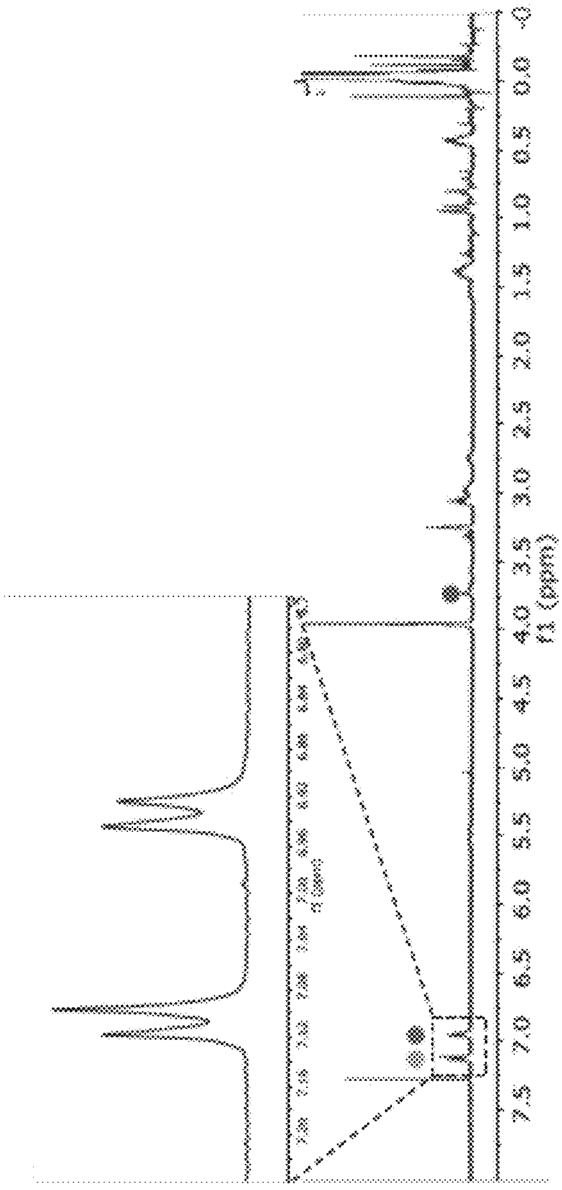
Figure 10E:
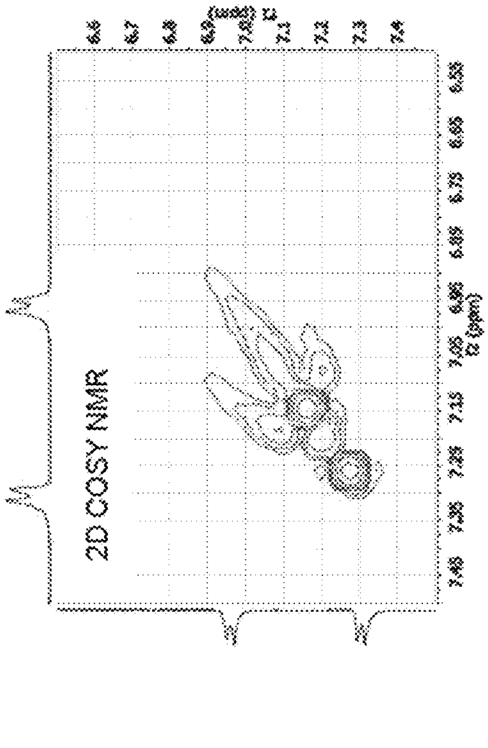

FIGS. 10A-10E illustrate example spectrometry results of various polymer films, in accordance with various embodiments. FIG. 10A illustrates a proton NMR spectrum of PDMS-MPU in $CDCl_3$ (80 percent)+MeOD (20 percent). FIG. 10B illustrates a proton NMR spectrum of PDMS-IU in $CDCl_3$. FIG. 10C illustrates a proton NMR spectrum of PDMS-$MPU_{0.4}$-$IU_{0.6}$ in $CDCl_3$. FIG. 10D illustrates a proton NMR spectrum and FIG. 10E illustrates a 2D NMR spectrum of PDMS-$MPU_{0.4}$-$IU_{0.6}$ in $CDCl_3$ (80 percent)+ MeOD (20 percent) at concentration of 50 mg/ml. In $CDCl_3$, as illustrated, peaks of MPU units are not seen, suggesting that polymer chains are pre-crosslinked in solution state. Upon the addition of MeOD to disrupt hydrogen-bonding, MPU peaks are observed. 2D COSY NMR support the proton peak assignments.

Figure 11:
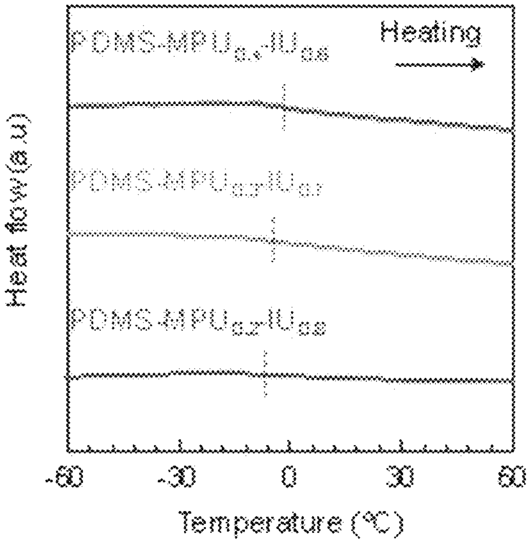
FIG. 11 illustrates an example differential scanning calorimetry thermal analysis of PDMS-$MPU_{0.4}$-$IU_{0.6}$, PDMS-$MPU_{0.3}$-$IU_{0.7}$ and PDMS-$MPU_{0.2}$-$IU_{0.8}$, in accordance with various embodiments.

FIG. 11 illustrates an example differential scanning calorimetry (DSC) thermal analysis of PDMS-$MPU_{0.4}$-$IU_{0.6}$ (red), PDMS-$MPU_{0.3}$-$IU_{0.7}$ (orange) and PDMS-$MPU_{0.2}$-$IU_{0.8}$ (blue), in accordance with various embodiments.

Figures 12A, 12B, 12C, 12D, 12E:
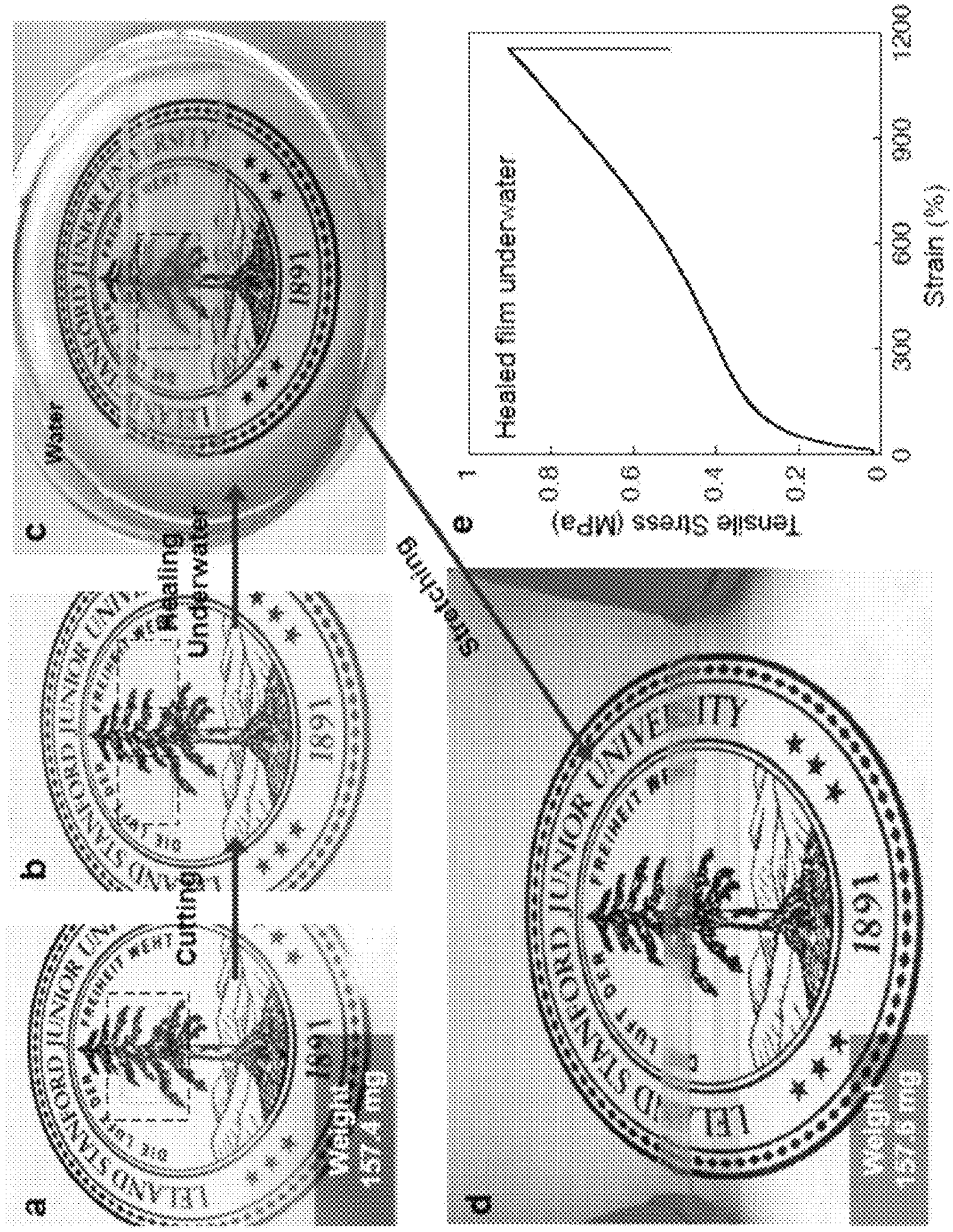
FIGS. 12A-12E illustrate an example of self-healing of a polymer film in the presence of water, in accordance with various embodiments.

FIGS. 12A-12E illustrates an example of self-healing of a polymer film in the presence of water, in accordance with various embodiments. As illustrated by FIGS. 12A and 12B, a PDMS-$MPU_{0.4}$-$IU_{0.6}$ polymer film is bisected to two pieces. FIG. 12C illustrates that the polymer film is in the presence of water and the two pieces are put together under water for self-healing. After 24 hours, as illustrated by FIG. 12D, the polymer film is stretched. FIG. 12E illustrates the example stress-strain curve of the self-healed polymer film underwater.

Figure 13A:
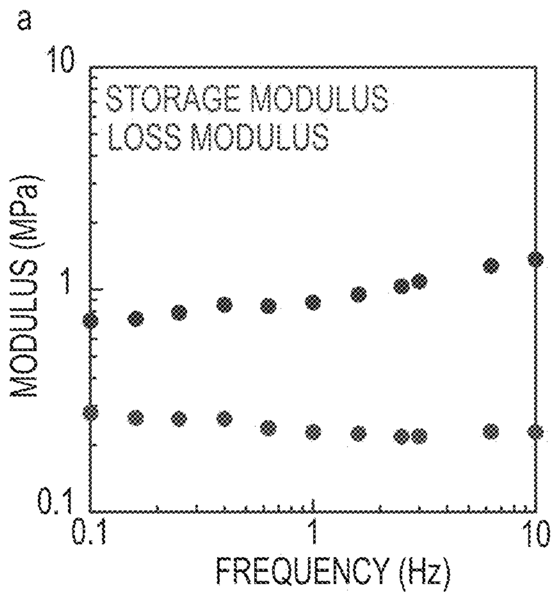
FIGS. 13A-13B illustrate an example dynamic mechanical analysis of PDMS-$MPU_{0.4}$-$IU_{0.6}$ polymer film, in accordance with various embodiments.
Figure 13B:
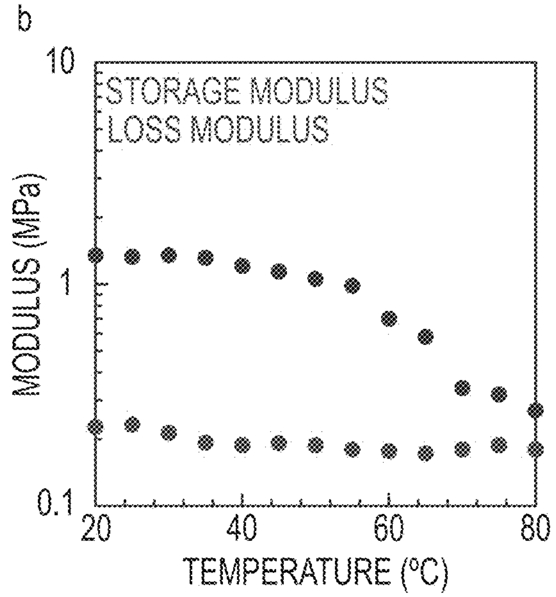

FIGS. 13A-13B illustrate an example dynamic mechanical analysis of PDMS-$MPU_{0.4}$-$IU_{0.6}$ polymer film, in accordance with various experimental embodiments. As illustrated by FIG. 13A, frequency sweeping shows that storage modulus is higher than loss modulus at most frequencies. FIG. 13B illustrates an example of temperature sweeping of the polymer film.

Figure 14A:
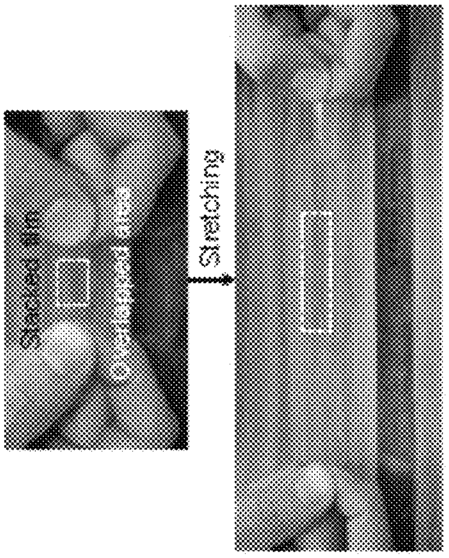
FIGS. 14A-14F illustrate various properties of example polymer films, in accordance with various embodiments.
Figure 14B:
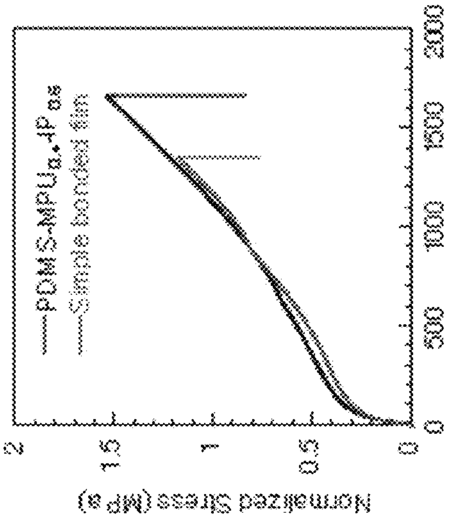
Figure 14C:
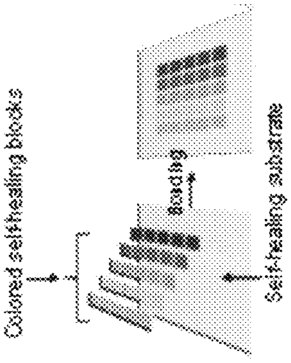
Figure 14D:
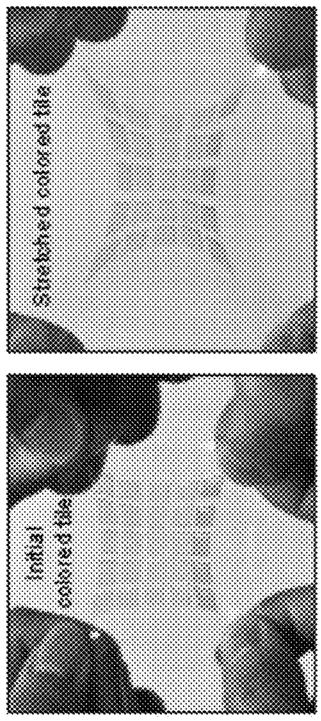
Figure 14E:
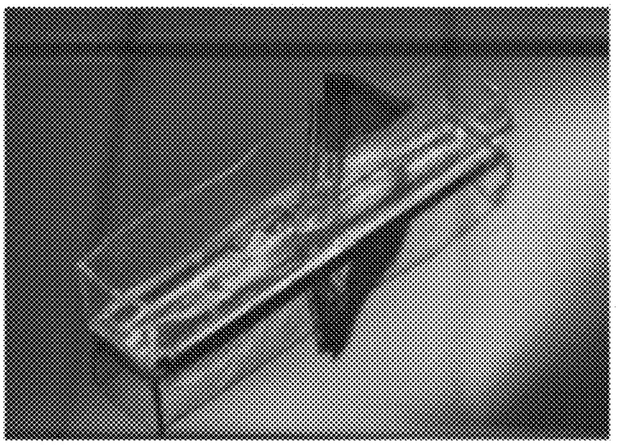
Figure 14F:
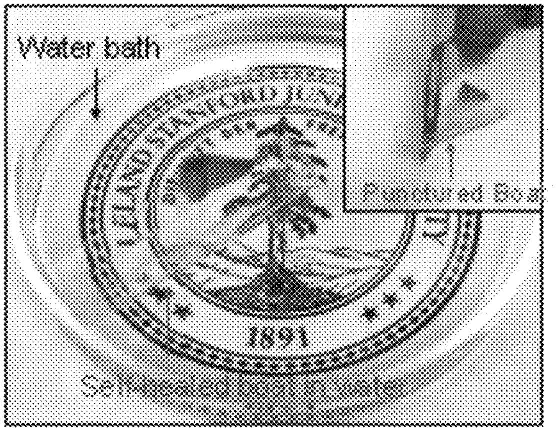

FIGS. 14A-14F illustrate various properties of example polymer films, in accordance with various embodiments. For example, FIG. 14A illustrates a room temperature bonding process of two polymer films. Two PDMS-$MPU_{0.4}$-$IU_{0.6}$ film pieces are prepared with different colors. One is stained by a pink color and the other is stained by a blue color for visualization. The two films are stacked to each other and form a stable interface by a simple bonding process (top). The simple bonding process involves annealing at room temperature for at least 6 hours after applying gently pressure to keep the two pieces in contact. The resultant polymer film is stretched without any break (bottom). FIG. 14B illustrates an example stress-strain curves of PDMS-$MPU_{0.4}$-$IU_{0.6}$ film (black) and simple bonded film (blue). FIG. 14C is a schematic illustration of room-temperature bonding process. As previous described in connection with FIG. 4D, twenty-five PDMS-$MPU_{0.4}$-$IU_{0.6}$ film blocks are prepared with five different colors (Pink, Orange, Green, Blue and Black). The blocks are stacked to a PDMS-$MPU_{0.4}$-$IU_{0.6}$ film substrate and formed stable interface by simple bonding process (e.g., annealing at room temperature for at least 6 hours after applying gentle pressure). As illustrated by FIG. 14D, the resultant patterned film (left) is stretched without any delamination (right). The simple bonding process, in specific embodiments, includes annealing at 50° C. for 10 minutes and subsequent annealing at room temperature for 12 hours before mechanical testing. FIG. 14E is an optical image of self-healing boat on blue plate and FIG. 14F is optical images of a self-healed boat in water bath and a punctured self-healing boat by sharp blade (inset).

Figure 15A:
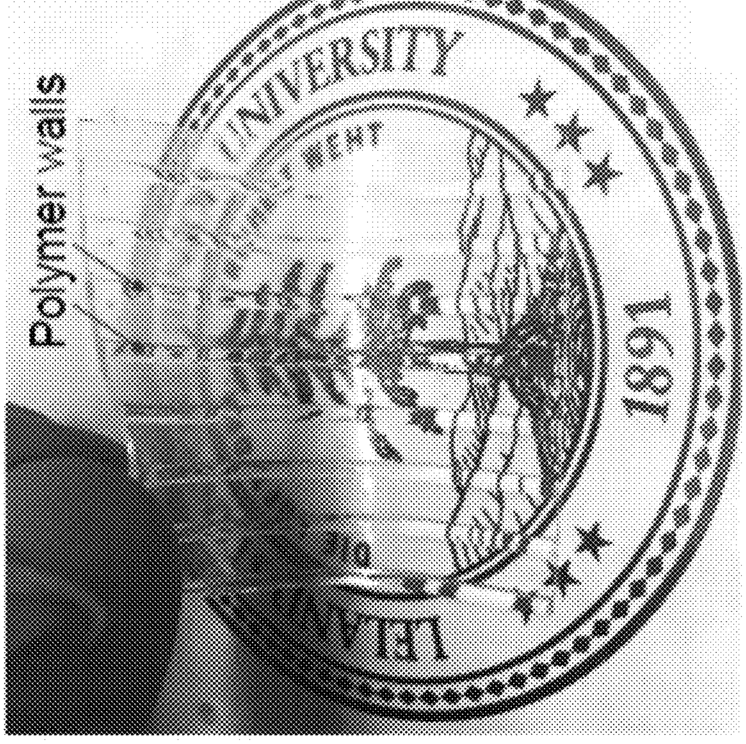
FIGS. 15A-15B illustrate an example of patterning the polymer film using a mold, in accordance with various embodiments.
Figure 15B:
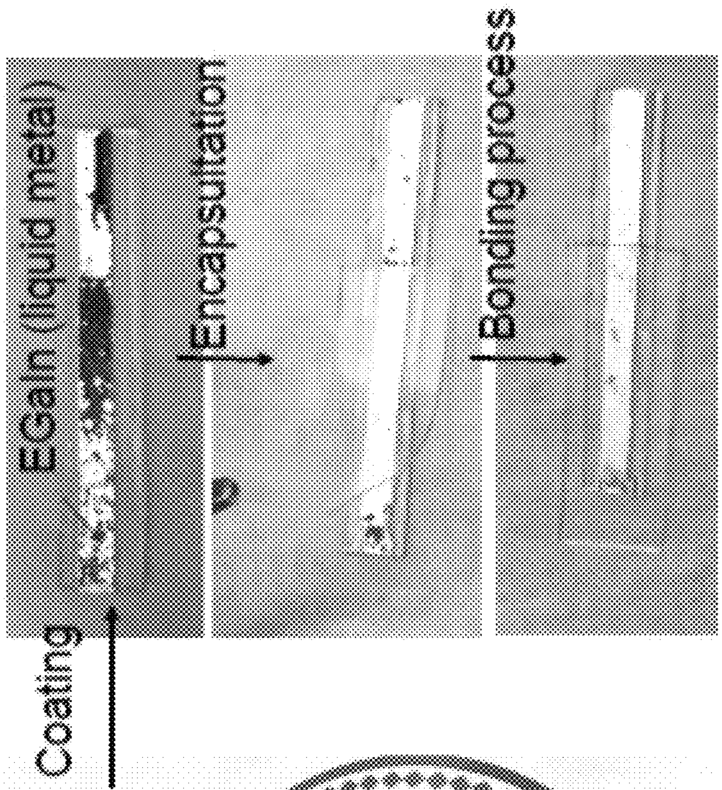

FIGS. 15A-15B illustrate an example of patterning the polymer film using a mold, in accordance with various embodiments. As illustrated by FIG. 15A, PDMS-$MPU_{0.4}$-$IU_{0.6}$ polymer film can be patterned by Teflon mold at 80° C. under pressure, in which polymer walls are periodically generated. In various embodiments, as illustrated by FIG. 15B, liquid metal (e.g., EGaIn) is bladed onto the film. Subsequently, it can be encapsulated with another PDMS-$MPU_{0.4}$-$IU_{0.6}$ polymer film by a simple bonding process (e.g., stacking the layers and heating at 50° C. for 10 min).

Figure 16:
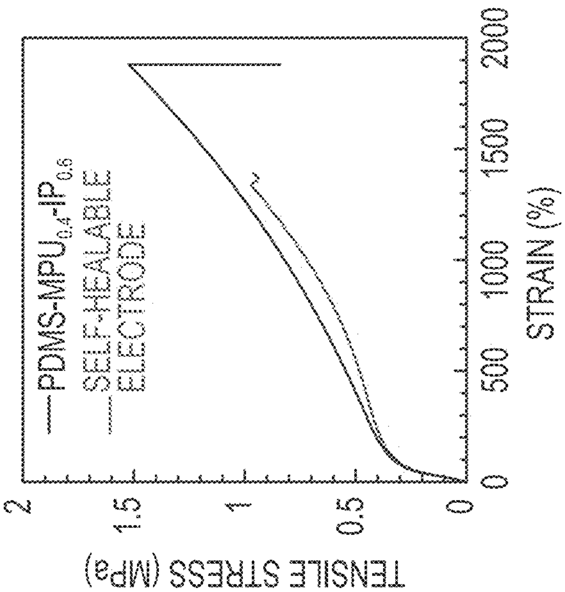
FIG. 16 illustrates an example stress cure of PDMS-$MPU_{0.4}$-$IU_{0.6}$ film and self-healing electrode, in accordance with various embodiments.

FIG. 16 illustrates an example stress cure of PDMS-$MPU_{0.4}$-$IU_{0.6}$ film (black) and self-healing electrode (blue), in accordance with various embodiments.

Figure 17A:
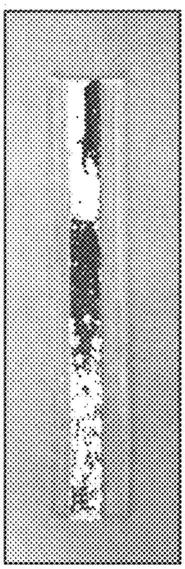
FIG. 17A-17B illustrate liquid metal exhibited good wetting on PDMS-$MPU_{0.4}$-$IU_{0.6}$
Figure 17B:
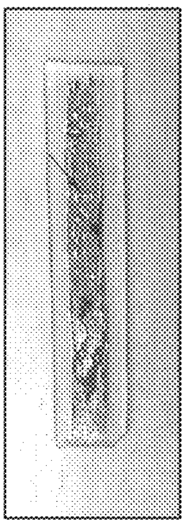

FIG. 17A illustrates liquid metal exhibited good wetting on PDMS-$MPU_{0.4}$-$IU_{0.6}$ and FIG. 17B illustrates that the liquid metal cannot be bladed uniformly onto conventional PDMS film because of bad wetting, in accordance with various embodiments.

Figures 18A, 18B, 18C, 18D:
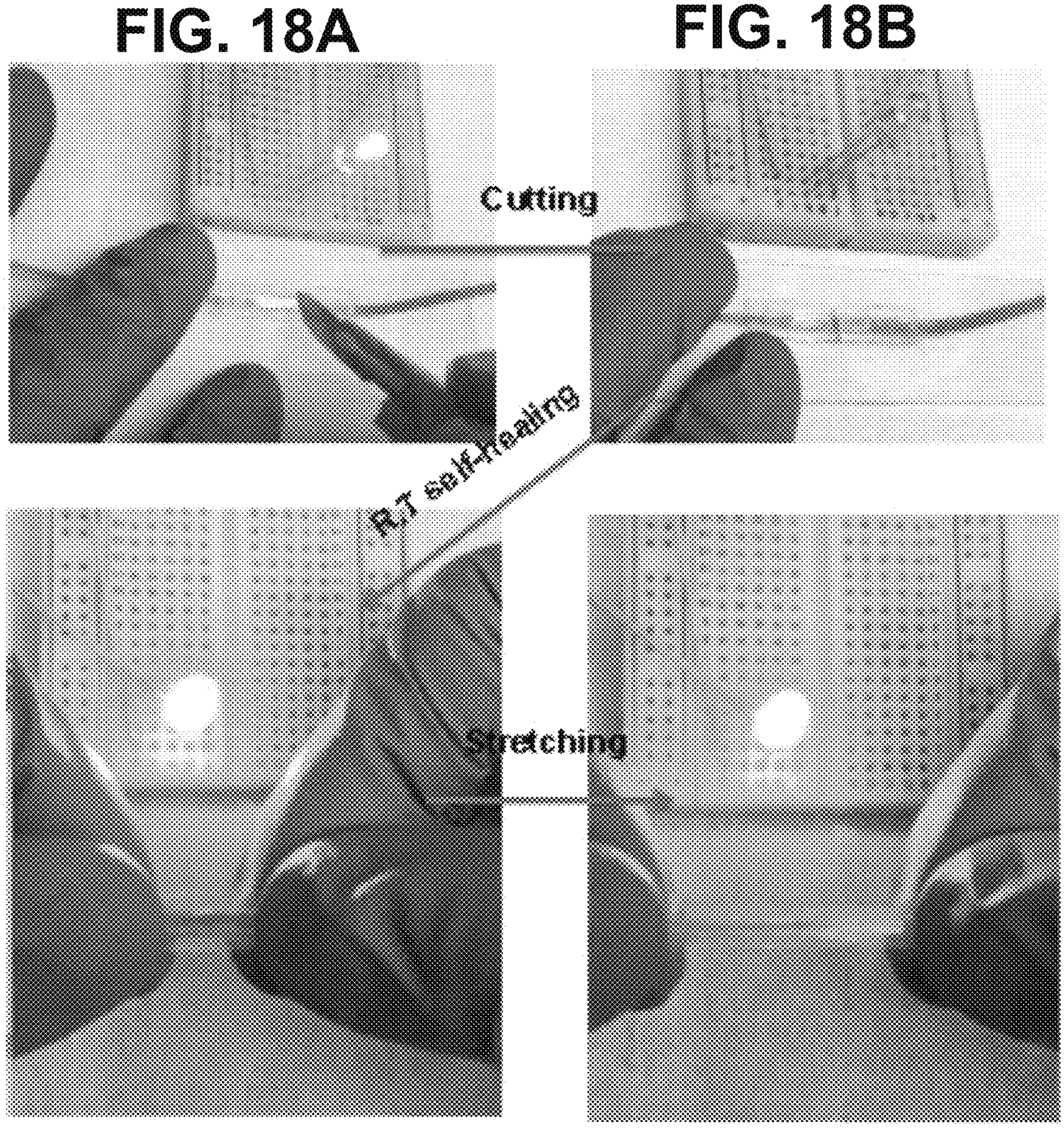
FIGS. 18A-18D illustrate an example experiment of connecting a self-healing electrode to an LED lamp, in accordance with various embodiments.

FIGS. 18A-18D illustrate an example experiment of connecting a self-healing electrode to an LED lamp, in accordance with various embodiments. As illustrated by FIGS. 18A and 18B, the electrode is cut, which results in the LED lamp turning off. After placing the pieces together and 9 hour self-healing process at room temperature, the electrode is successfully stretched and LED is on, as illustrated by FIGS. 18C and 18D. Accordingly, the electrode is capable of room-temperature mechanical and electrical self-healing.

Figure 19A:
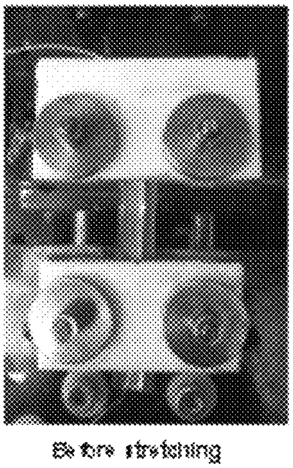
FIGS. 19A-19C illustrate example equipment that can be used to stretch the polymer film and test the resulting strain, in accordance with various embodiments.
Figure 19B:
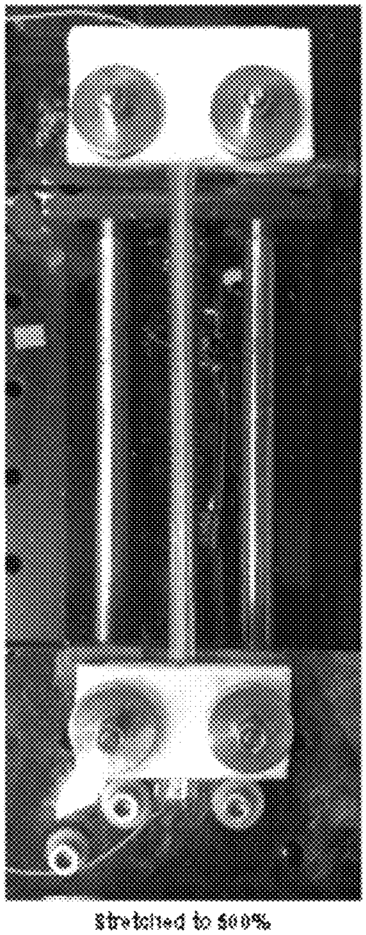
Figure 19C:
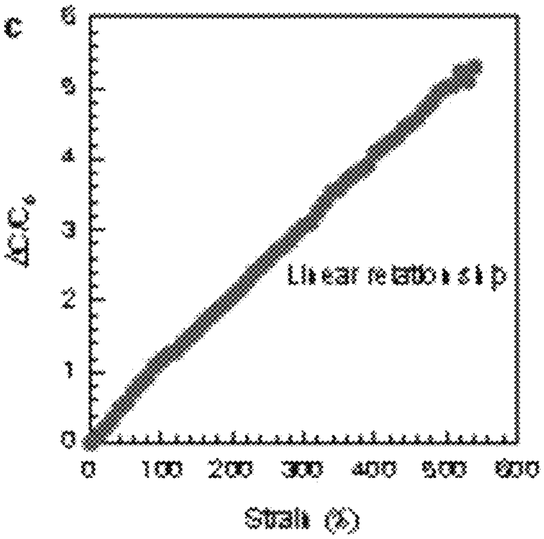

FIGS. 19A-C illustrate example equipment that can be used to stretch the polymer film and test the resulting strain, in accordance with various embodiments. FIG. 19A illustrate an optical image of a strain-sensor formed using the polymer film and as loaded on a stretching station (with zero percent strain). FIG. 19B illustrates an optical image of the strain-sensor after 500 percent stretching. FIG. 19C illustrates the capacitance change of the strain-sensor as a function of the strain.

Figure 20:
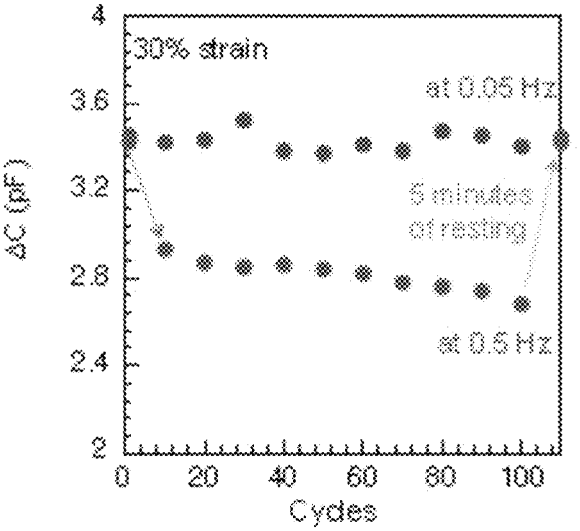
FIG. 20 illustrates an example capacitance change at different frequencies and over multiple cycles of stretching the polymer film, in accordance with various embodiments.

FIG. 20 illustrates an example capacitance change at different frequencies and over multiple cycles of stretching the polymer film, in accordance with various embodiments. More specifically, the capacitance change in each cycle is illustrated at a frequency of 0.05 Hz (low frequency, blue) and 0.5 Hz (high frequency, red) and a maximum 30 percent strain. At 0.5 Hz, the decrease of capacitance with stretching cycle is attributed to the viscoelastic behavior of the strain-sensor. After 100 strain/release cycles and 5 minutes of resting, the strain-sensor exhibits the same capacitance as the original value.

Figure 21A:
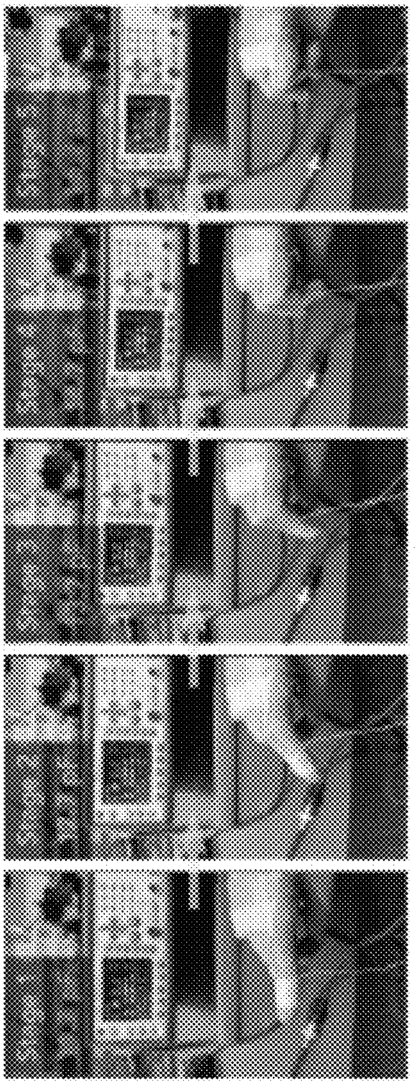
FIGS. 21A-21B illustrate example of strain-sensors, in accordance with various embodiments.
Figure 21B:
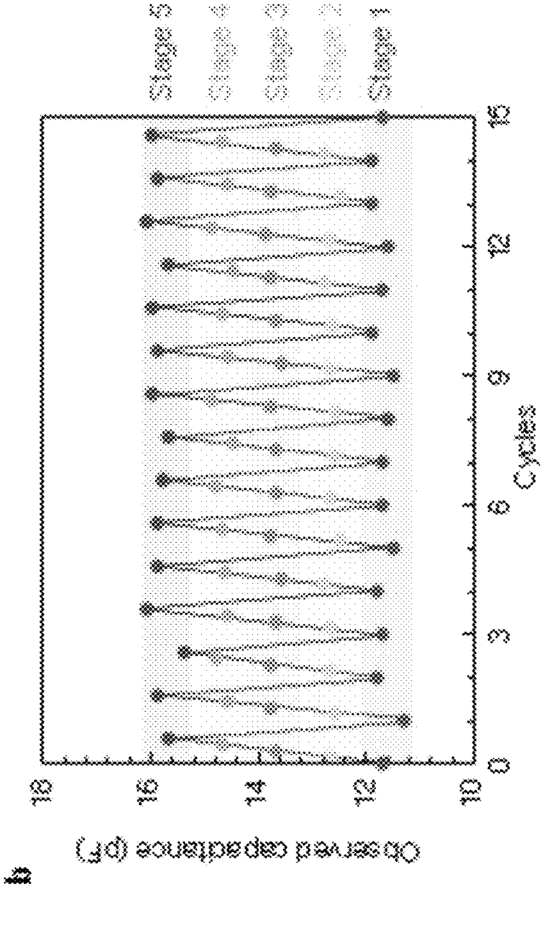

FIGS. 21A-21B illustrate example of strain-sensors, in accordance with various embodiments. For example, FIG. 21A illustrates optical images of multi-stage human motion detection by a strain-sensor mounted on human finger. The strain-sensor is able to detect human motion clearly and sensitively. FIG. 21B illustrates a cyclic test of human motion detection from stage 1 to stage 5 without any rest. The strain-sensor exhibits viscoelastic behavior derived from polymer part. Even though it shows 100 percent self-recovery after stretching, it can take at least a few seconds for complete recovery, such that strain-sensing can be limited at high frequency. However, when the sensor is conformally laminated onto human finger or elastic substrates, such as PDMS, the viscoelastic problem is not observed. To make conformal contact between sensor and glove, a small amount of ethanol can be utilized, which made surface of sensor sticky.

Figure 22A:
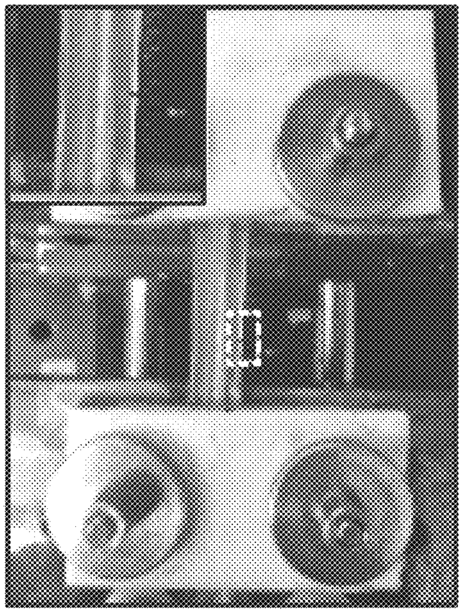
FIGS. 22A-22C illustrate example equipment that can be used to stretch the polymer film with a notch and test the resulting strain, in accordance with various embodiments.
Figure 22B:
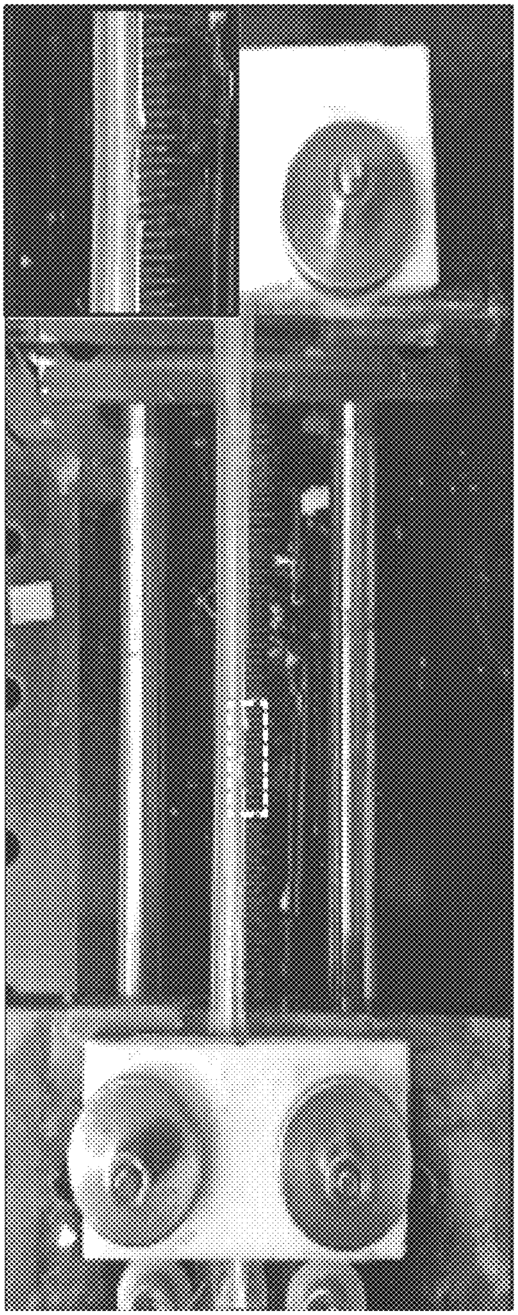
Figure 22C:
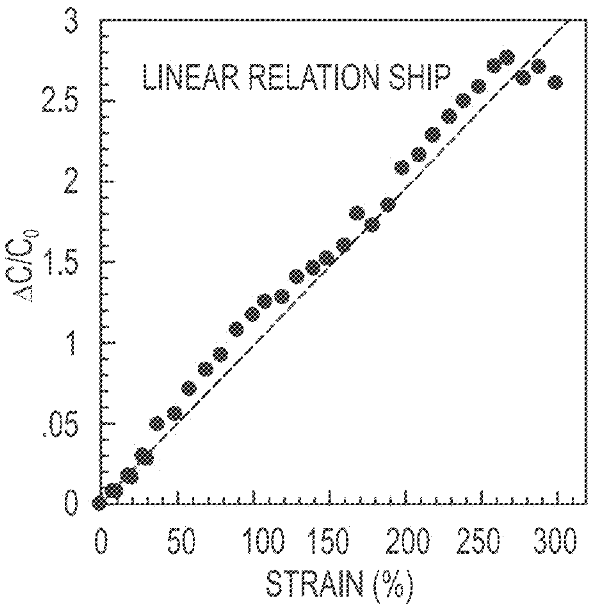

FIGS. 22A-C illustrate example equipment that can be used to stretch the polymer film with a notch and test the resulting strain, in accordance with various embodiments. FIG. 22A illustrates an optical image of a notched strain-sensor formed using the polymer film and as loaded on a stretching station (with zero percent strain). FIG. 22B illustrates an optical image of the notched strain-sensor after stretching. FIG. 22C illustrates the capacitance change of the notched strain-sensor as a function of the strain. The stain-sensor itself can be protected by tough material, so that when damage occurs or is applied, the protective layer (polymer layer) prevents the strain-sensor from propagation and allows for stable operation of the strain-sensor even under high strain. Additionally, because of its autonomous self-healing capability, the damage can completely disappear. In various embodiments, such strain-sensors can be utilized in electronic skin that is similar to human skin in mechanical properties and sensing capability.

Various embodiments are implemented in accordance with the underlying Provisional Application (Ser. No. 62/569,236), entitled “Stretchable, Tough, and Self-healing Elastomer and Applications Thereof” filed on Oct. 6, 2017, to which benefit is claimed and which is fully incorporated herein by reference. For instance, embodiments herein and/or in the provisional application may be combined in varying degrees including wholly combined. As an example, the embodiments herein can be combined and/or include the subject matter involving the example of stretchable, tough, and self-healing elastomers, methods of forming the elastomers, and experimental embodiments illustrating features of the elastomers. Reference may also be made to the experimental teachings and underlying references provided in the underlying provisional application. Embodiments discussed in the provisional applications are not intended, in any way, to be limiting to the overall technical disclosure, or to any part of the claimed invention unless specifically noted.

Terms to exemplify orientation, such as top view/side view, before or after, upper/lower, left/right, top/bottom, above/below, and x-direction/y-direction/z-direction, may be used herein to refer to relative positions of elements as shown in the figures. It should be understood that the terminology is used for notational convenience only and that in actual use the disclosed structures may be oriented different from the orientation shown in the figures. Thus, the terms should not be construed in a limiting manner.

As examples, the Specification describes and/or illustrates aspects useful for implementing the claimed disclosure by way of various circuits or circuitry which may be illustrated as or using terms such as blocks, modules, device, system, unit, controller, and/or other circuit-type depictions. Such circuits or circuitry are used together with other elements (robotics, electronic devices, prosthetics, processing circuitry and the like) to exemplify how certain embodiments may be carried out in the form or structures, steps, functions, operations, activities, etc. For example, in certain of the above-discussed embodiments, one or more illustrated items in this context represent circuits (e.g., discrete logic circuitry or (semi)-programmable circuits) configured and arranged for implementing these operations/activities, as may be carried out in the approaches shown in the figures. In certain embodiments, such illustrated items represent one or more circuitry and/or processing circuitry (e.g., microcomputer or other CPU) which is understood to include memory circuitry that stores code (program to be executed as a set/sets of instructions) for performing a basic algorithm (e.g., inputting, counting signals having certain signal strength or amplitude, classifying the type of force including a magnitude and direction using capacitance values output by the sensor circuitry, sampling), and/or involving sliding window averaging, and/or a more complex process/algorithm as would be appreciated from known literature describing such specific-parameter sensing. Such processes/algorithms would be specifically implemented to perform the related steps, functions, operations, activities, as appropriate for the specific application.

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. Such modifications do not depart from the true spirit and scope of various aspects of the disclosure, including aspects set forth in the claims.

What is claimed is:

1. An elastomer material comprising:

a flexible polymer backbone with a particular ratio of at least first moieties and second moieties, wherein the first moieties are configured to provide a first number of dynamic bonds resulting from interactions between the first moieties; and the second moieties are configured to provide a second number of dynamic bonds resulting from interactions between the second moieties, the second number of dynamic bonds having a weaker bonding strength than the first number of dynamic bonds, and wherein the elastomer material, at least in part based on the ratio of the first moieties and second moieties, exhibits autonomous self-healing, a particular toughness set as a function of the ratio, and exhibits notch-insensitive stretchability under a strain, wherein the strain is in a range from 150 percent strain to 1200 percent strain.

2. The elastomer material of claim 1, wherein the elastomer material exhibits a Young's modulus of between 0.1 and 3.0 megapascal (MPa) and stretching of between 1,200 and 3,000 percent without rupturing, and wherein the dynamic bonds include at least one selected from the group consisting of hydrogen bonding, metal-ligand bonding, guest-host interactions, and supramolecular interactions.

3. An elastomer material comprising:

a flexible polymer backbone with a particular ratio of at least first moieties and second moieties, wherein the first moieties are configured to provide a first number of dynamic bonds resulting from interactions between the first moieties; and the second moieties are configured to provide a second number of dynamic bonds resulting from interactions between the second moieties, the second number of dynamic bonds having a weaker bonding strength than the first number of dynamic bonds, and wherein the elastomer material, at least in part based on the ratio of the first moieties and second moieties, exhibits autonomous self-healing, a particular toughness set as a function of the ratio, and exhibits stretchability as characterized by one or a combination of-stretchability of at least 500 percent without rupturing and notch-insensitive stretchability under a strain, wherein the strain is in a range from 150 percent strain to 1200 percent strain, and wherein the flexible polymer backbone is selected from the group consisting of: polydimethylsiloxane (PDMS) polyethyleneoxide (PEO), Perfluoropolyether (PFPE), polybutylene (PB), poly(ethylene-co-1-butylene), poly(butadiene), hydrogenated poly(butadiene), polybutylene, poly(ethylene oxide)-poly(propylene oxide) block copolymer or random copolymer, and poly(hydroxyalkanoate) and the at least first and second moieties are randomly or equally spaced from one another.

4. The elastomer material of claim 1, wherein the first moieties include 4,4'-methylenebis(phenyl urea) (MPU) and the second moieties include isophorone bisurea (IU).

5. The elastomer material of claim 4, wherein the particular ratio of MPU moieties to IU moieties is selected from the group consisting of: 0.4 to 0.6, 0.3 to 0.7 and 0.2 to 0.8.

6. The elastomer material of claim 1, wherein the elastomer material is configured and arranged to stretch up to 3,000 percent and exhibits a Young's modulus of between 0.22 and 1.5 megapascal (MPa).

7. An elastomer material comprising:

a flexible polymer backbone with a particular ratio of at least first moieties and second moieties, wherein the first moieties are configured to provide a first number of dynamic bonds resulting from interactions between the first moieties; and the second moieties are configured to provide a second number of dynamic bonds resulting from interactions between the second moieties, the second number of dynamic bonds having a weaker bonding strength than the first number of dynamic bonds, and wherein the elastomer material, at least in part based on the ratio of the first moieties and second moieties, exhibits autonomous self-healing, a particular toughness, and is stretchable, and wherein the elastomer material is characterized in that: at least in part based on the ratio of the first moieties and second moieties, the elastomer material exhibits autonomous self-healing, a particular toughness, and notch insensitivity under a strain wherein the strain is in a range from 150 percent strain to 1200 percent strain; or when a strain is applied to the elastomer material, the dynamic bonds of the first number are characterized as being sufficient to block induced crack propagation while the bonds having a weaker bonding strength simultaneously break and dissipate strain energy.

8. The elastomer material of claim 1, wherein the elastomer material includes a supramolecular network formed as a polymer film configured and arranged to exhibit the autonomous self-healing and notch-insensitive stretchability in a range of 1,200-1,500 percent by self-recoverable energy dissipation in the polymer film.

9. An apparatus comprising:

a polymer film that includes a supramolecular network of elastomer material, the elastomer material having a flexible polymer backbone with a particular ratio of at least first moieties and second moieties, the first moieties being configured and arranged to provide a first number of dynamic bonds resulting from interactions between the first moieties and the second moieties being configured and arranged to provide a second number of dynamic bonds resulting from interactions between the second moieties, the second number of dynamic bonds having a weaker bonding strength than the first number of dynamic bonds, and wherein the polymer film exhibits autonomous self-healing, a Young's modulus of between 0.1 and 3.0 megapascal (MPa), and stretchability that is in a range from 1,200 to 3,000 percent without rupturing.

10. The apparatus of claim 9, wherein the polymer film is colorless and transparent, and the first moieties include 4,4'-methylenebis(phenyl urea) (MPU) and the second moieties include isophorone bisurea (IU), and the flexible polymer backbone is selected from the group consisting of: polydimethylsiloxane (PDMS) polyethyleneoxide (PEO), Perfluoropolyether (PFPE), polybutylene (PB), poly(ethylene-co-1-butylene), poly(butadiene), hydrogenated poly(butadiene), polybutylene, poly(ethylene oxide)-poly(propylene oxide) block copolymer or random copolymer, and poly(hydroxyalkanoate).

11. The apparatus of claim 9, wherein the polymer film exhibits a Young's modulus of between 0.22 and 1.5 MPa.

12. The apparatus of claim 9, wherein the polymer film exhibits mechanical properties including the autonomous self-healing, the Young's modulus and the stretchability due to different crosslink strength of the first and second numbers of dynamic bonds.

13. The apparatus of claim 9, wherein the polymer film exhibits notch-insensitive stretchability and a fracture energy of 15,000 Joule per meter squared (J/m2).

14. The apparatus of claim 9, wherein the polymer film is configured and arranged to exhibit the autonomous self-healing in a presence of liquid.

15. The apparatus of claim 9, wherein the polymer film forms part of one of the following: three-dimensional self-healable objects, wearable electronics, robotic applications, self-healable electrode, self-healable capacitive strain sensor, and an array of strain sensors.

16. A method comprising:

selecting a ratio of at least a first moiety and a second moiety based on one or more designated mechanical properties;

forming a viscous solution that includes a flexible polymer and the ratio of the at least first moiety and the second moiety; and from the viscous solution, forming a polymer film includes a supramolecular network of elastomer material, the elastomer material having a flexible polymer backbone that includes the flexible polymer with the selected ratio of the at least first moieties and second moieties, the first moieties being configured and arranged to provide a first number of dynamic bonds resulting from interactions between the first moieties and the second moieties being configured and arranged to provide a second number of dynamic bonds resulting from interactions between the second moieties, the second number of dynamic bonds having a weaker bonding strength than the first number of dynamic bonds, wherein the formed polymer film exhibits autonomous self-healing, a Young's modulus of between 0.1 and 3.0 megapascal (MPa), and stretchability in a range of 1,200 to 3,000 percent without rupturing.

17. The method of claim 16, wherein selecting the ratio of the at least first moieties and second moieties in the polymer film sets mechanical properties of the polymer film, wherein a decrease in the first moiety increases a fracture strain and decreases the Young's modulus and fracture energy.

18. The method of claim 16, wherein selecting the ratio of at least first moieties and second moieties in the polymer film sets mechanical properties of the polymer film, wherein an increase in the first moiety increases the Young's modulus and fracture energy of the polymer film.

19. The method of claim 16, wherein the first moieties include 4,4'-methylenebis(phenyl urea) (MPU) and the second moieties include isophorone bisurea (IU), and the flexible polymer backbone is selected from the group consisting of: polydimethylsiloxane (PDMS) polyethyleneoxide (PEO), Perfluoropolyether (PFPE), polybutylene (PB), poly(ethylene-co-1-butylene), poly(butadiene), hydrogenated poly(butadiene), polybutylene, poly(ethylene oxide)-poly(propylene oxide) block copolymer or random copolymer, and poly(hydroxyalkanoate).

20. The method of claim 16, wherein the polymer film is severed and the method further includes healing the severed polymer film in water, wherein the healed polymer film is configured and arranged to stretch up to 1,100 percent without rupturing.

21. An elastomer material comprising:

a flexible polymer backbone with a particular ratio of at least first moieties and second moieties, wherein the first moieties are configured to provide a first number of dynamic bonds resulting from interactions between the first moieties; and the second moieties are configured to provide a second number of dynamic bonds resulting from interactions between the second moieties, the second number of dynamic bonds having a weaker bonding strength than the first number of dynamic bonds, and wherein the elastomer material exhibits properties set as a function of the ratio, the properties including autonomous self-healing, a Young's modulus of at least 0.1 megapascals (MPa), a degree of stretchability without rupturing, and a particular toughness that is associated with a fracture energy and/or a fracture strain, wherein during use with the elastomer material under strain forces the dynamic bonds of the first number are characterized as being sufficient to block induced crack propagation while the weak bonds simultaneously break and dissipate strain energy.

22. The elastomer material of claim 7, wherein the first moieties are configured and arranged to form up to four dynamic bonds with another of the first moieties and the second moieties are configured and arranged to form less than four dynamic bonds with another of the second moieties.

* * * * *